(12) United States Patent
Shimizu et al.

(10) Patent No.: US 6,398,217 B1
(45) Date of Patent: Jun. 4, 2002

(54) GAMING MACHINE

(75) Inventors: Shingo Shimizu; Yoshikazu Ohnuki; Hideyuki Suzuki, all of Tokyo (JP)

(73) Assignee: Aruze Corporation, Tokyo (JP)

( * ) Notice: Subject to any disclaimer, the term of this patent is extended or adjusted under 35 U.S.C. 154(b) by 0 days.

(21) Appl. No.: 09/431,142

(22) Filed: Nov. 1, 1999

(30) Foreign Application Priority Data

| Nov. 2, 1998 | (JP) | ............................................. 10-312221 |
| Dec. 4, 1998 | (JP) | ............................................. 10-345060 |
| Feb. 19, 1999 | (JP) | ............................................. 11-040897 |

(51) Int. Cl.[7] ............................................... A63F 13/00
(52) U.S. Cl. .............................. 273/121 B; 273/143 R; 463/16; 463/20
(58) Field of Search .............................. 463/16, 20, 21, 463/30, 31, 23; 273/121 B, 143 R

(56) References Cited

U.S. PATENT DOCUMENTS

| 5,018,737 | A | * | 5/1991 | Okada | ..................... 273/143 R |
| 5,024,439 | A | * | 6/1991 | Okada | ..................... 273/143 R |
| 5,462,277 | A | * | 10/1995 | Takemoto | ............... 273/121 B |
| 5,603,659 | A | * | 2/1997 | Okada | ......................... 463/25 |
| 5,836,819 | A | * | 11/1998 | Ugawa | ......................... 463/30 |
| 6,142,874 | A | * | 11/2000 | Kodachi et al. | ............... 463/20 |
| 6,142,875 | A | * | 11/2000 | Kodachi et al. | ............... 463/20 |

FOREIGN PATENT DOCUMENTS

JP           10-263160      * 10/1998      ............. 273/121 B

* cited by examiner

Primary Examiner—Michael O'Neill
(74) Attorney, Agent, or Firm—Andrew C. Aitken; Venable Baetjer Howard & Civiletti, LLP

(57) ABSTRACT

A gaming machine has a display arrangement for displaying symbols that are related to a game, and a controller that determines in response to a predetermined input signal whether or not the game condition will be transferred to a specified game condition that is advantageous to the player and controls the display arrangement to display a display mode corresponding to the result of the determination. The display mode includes a special symbol for informing that the game condition is transferred to the specified game condition by showing a predetermined stop state when a symbol variation is stopped, and a predictive symbol for predicting the stop state of the special symbol. The predictive symbol is provided as plural kinds of symbols having respective relationship. The gaming machine can provide to a player an indication of the possibility to transfer to a special game condition depending on the meaning of the relationship of the symbols that are displayed.

26 Claims, 55 Drawing Sheets

FIG. 7

| KIND OF RANDOM NUMBER | RANGE OF RANDOM NUMBER |
|---|---|
| RANDOM NUMBER FOR JUDGEMENT OF "BIG HIT" | 0 ~ 255 |
| RANDOM NUMBER FOR "REACH" DEMO. SYMBOL DETERN. | 0 ~ 139 |
| RANDOM NUMBER FOR PREDICTIVE DEMO. SYMBOL DETERN. | 0 ~ 511 |

FIG. 8

"BIG HIT" JUDGEMENT TABLE

| JUDGEMENT OF "BIG HIT" | RANDOM NUMBER FOR JUDGEMENT OF "BIG HIT" |
|---|---|
| "BIG HIT" | 7 |
| "LOSS" | 0 ~ 6, 8 ~ 255 |

FIG. 9

TABLE FOR DETERN. OF "BIG HIT" SYMBOL

| RANDOM NUMBER FOR "BIG HIT" SYMBOL DETERN. | "BIG HIT" SYMBOL |
|---|---|
| 0 | 1 – 1 – 1 |
| 1 | 2 – 2 – 2 |
| 2 | 3 – 3 – 3 |
| 3 | 4 – 4 – 4 |
| 4 | 5 – 5 – 5 |
| 5 | 6 – 6 – 6 |
| 6 | 7 – 7 – 7 |
| 7 | 8 – 8 – 8 |
| 8 | 9 – 9 – 9 |
| 9 | 10 – 10 – 10 |
| 10 | 11 – 11 – 11 |
| 11 | 12 – 12 – 12 |
| 12 | 13 – 13 – 13 |
| 13 | 14 – 14 – 14 |
| 14 | 15 – 15 – 15 |

FIG. 10

TABLE FOR DETERN. OF STOP SYMBOL

| RANDOM NUMBER FOR LEFT, CENTER, RIGHT STOP SYMBOL DETERN. | STOP SYMBOL |
|---|---|
| 0 | 1 |
| 1 | 2 |
| 2 | 3 |
| 3 | 4 |
| 4 | 5 |
| 5 | 6 |
| 6 | 7 |
| 7 | 8 |
| 8 | 9 |
| 9 | 10 |
| 10 | 11 |
| 11 | 12 |
| 12 | 13 |
| 13 | 14 |
| 14 | 15 |

FIG. 11

TABLE FOR DETERN. OF "REACH" DEMO. SYMBOL FOR "BIG HIT"

| KIND OF "REACH" | RANDOM NUMBER FOR "REACH" DEMO. SYMBOL DETERN. |
|---|---|
| NORMAL REACH | 0 ~ 24 |
| CHINNING MAN REACH | 25 ~ 64 |
| JAM-PACKED TRAIN REACH | 65 ~ 139 |

FIG. 12

TABLE FOR DETERN. OF "REACH" DEMO. SYMBOL FOR "LOSS"

| KIND OF "REACH" | RANDOM NUMBER FOR "REACH" DEMO. SYMBOL DETERN. |
|---|---|
| NORMAL REACH | 0 ~ 4 |
| CHINNING MAN REACH | 5 ~ 8 |
| NO REACH | 9 ~ 139 |

FIG. 13

TABLE FOR DETERN. OF PREDICTIVE DEMO. PATTERN FOR "BIG HIT" 《NORMAL REACH, JAM-PACKED TRAIN REACH》

|  | RANGE OF RANDOM NUMBER |  | RANGE OF RANDOM NUMBER |  | RANGE OF RANDOM NUMBER |  | RANGE OF RANDOM NUMBER |
|---|---|---|---|---|---|---|---|
| PREDICTIVE DEMO. 1 | 0~11 | PREDICTIVE DEMO. 52 | 288~289 | PREDICTIVE DEMO. 103 | 411 | PREDICTIVE DEMO. 154 | 462 |
| PREDICTIVE DEMO. 2 | 12~23 | PREDICTIVE DEMO. 53 | 290~291 | PREDICTIVE DEMO. 104 | 412 | PREDICTIVE DEMO. 155 | 463 |
| PREDICTIVE DEMO. 3 | 24~36 | PREDICTIVE DEMO. 54 | 292~293 | PREDICTIVE DEMO. 105 | 413 | PREDICTIVE DEMO. 156 | 464 |
| PREDICTIVE DEMO. 4 | 37~47 | PREDICTIVE DEMO. 55 | 294~295 | PREDICTIVE DEMO. 106 | 414 | PREDICTIVE DEMO. 157 | 465 |
| PREDICTIVE DEMO. 5 | 48~57 | PREDICTIVE DEMO. 56 | 296~299 | PREDICTIVE DEMO. 107 | 415 | PREDICTIVE DEMO. 158 | 466 |
| PREDICTIVE DEMO. 6 | 58~67 | PREDICTIVE DEMO. 57 | 300~301 | PREDICTIVE DEMO. 108 | 416 | PREDICTIVE DEMO. 159 | 467 |
| PREDICTIVE DEMO. 7 | 68~79 | PREDICTIVE DEMO. 58 | 302~303 | PREDICTIVE DEMO. 109 | 417 | PREDICTIVE DEMO. 160 | 468 |
| PREDICTIVE DEMO. 8 | 80~89 | PREDICTIVE DEMO. 59 | 304~307 | PREDICTIVE DEMO. 110 | 418 | PREDICTIVE DEMO. 161 | 469 |
| PREDICTIVE DEMO. 9 | 90~97 | PREDICTIVE DEMO. 60 | 308~309 | PREDICTIVE DEMO. 111 | 419 | PREDICTIVE DEMO. 162 | 470 |
| PREDICTIVE DEMO. 10 | 98~105 | PREDICTIVE DEMO. 61 | 310~311 | PREDICTIVE DEMO. 112 | 420 | PREDICTIVE DEMO. 163 | 471 |
| PREDICTIVE DEMO. 11 | 106~113 | PREDICTIVE DEMO. 62 | 312~315 | PREDICTIVE DEMO. 113 | 421 | PREDICTIVE DEMO. 164 | 472 |
| PREDICTIVE DEMO. 12 | 114~121 | PREDICTIVE DEMO. 63 | 316~317 | PREDICTIVE DEMO. 114 | 422 | PREDICTIVE DEMO. 165 | 473 |
| PREDICTIVE DEMO. 13 | 122~126 | PREDICTIVE DEMO. 64 | 318~320 | PREDICTIVE DEMO. 115 | 423 | PREDICTIVE DEMO. 166 | 474 |
| PREDICTIVE DEMO. 14 | 127~134 | PREDICTIVE DEMO. 65 | 321~323 | PREDICTIVE DEMO. 116 | 424 | PREDICTIVE DEMO. 167 | 475 |
| PREDICTIVE DEMO. 15 | 135~139 | PREDICTIVE DEMO. 66 | 324~326 | PREDICTIVE DEMO. 117 | 425 | PREDICTIVE DEMO. 168 | 476 |
| PREDICTIVE DEMO. 16 | 140~147 | PREDICTIVE DEMO. 67 | 327~329 | PREDICTIVE DEMO. 118 | 426 | PREDICTIVE DEMO. 169 | 477 |
| PREDICTIVE DEMO. 17 | 148~151 | PREDICTIVE DEMO. 68 | 330~332 | PREDICTIVE DEMO. 119 | 427 | PREDICTIVE DEMO. 170 | 478 |
| PREDICTIVE DEMO. 18 | 152~155 | PREDICTIVE DEMO. 69 | 333~335 | PREDICTIVE DEMO. 120 | 428 | PREDICTIVE DEMO. 171 | 479 |
| PREDICTIVE DEMO. 19 | 156~159 | PREDICTIVE DEMO. 70 | 336~338 | PREDICTIVE DEMO. 121 | 429 | PREDICTIVE DEMO. 172 | 480 |
| PREDICTIVE DEMO. 20 | 160~163 | PREDICTIVE DEMO. 71 | 339~341 | PREDICTIVE DEMO. 122 | 430 | PREDICTIVE DEMO. 173 | 481 |
| PREDICTIVE DEMO. 21 | 164~167 | PREDICTIVE DEMO. 72 | 342~344 | PREDICTIVE DEMO. 123 | 431 | PREDICTIVE DEMO. 174 | 482 |
| PREDICTIVE DEMO. 22 | 168~171 | PREDICTIVE DEMO. 73 | 345~347 | PREDICTIVE DEMO. 124 | 432 | PREDICTIVE DEMO. 175 | 483 |
| PREDICTIVE DEMO. 23 | 172~175 | PREDICTIVE DEMO. 74 | 348~350 | PREDICTIVE DEMO. 125 | 433 | PREDICTIVE DEMO. 176 | 484 |
| PREDICTIVE DEMO. 24 | 176~179 | PREDICTIVE DEMO. 75 | 351~353 | PREDICTIVE DEMO. 126 | 434 | PREDICTIVE DEMO. 177 | 485 |
| PREDICTIVE DEMO. 25 | 180~183 | PREDICTIVE DEMO. 76 | 354~356 | PREDICTIVE DEMO. 127 | 435 | PREDICTIVE DEMO. 178 | 486 |
| PREDICTIVE DEMO. 26 | 184~187 | PREDICTIVE DEMO. 77 | 357~359 | PREDICTIVE DEMO. 128 | 436 | PREDICTIVE DEMO. 179 | 487 |
| PREDICTIVE DEMO. 27 | 188~191 | PREDICTIVE DEMO. 78 | 360~362 | PREDICTIVE DEMO. 129 | 437 | PREDICTIVE DEMO. 180 | 488 |
| PREDICTIVE DEMO. 28 | 192~195 | PREDICTIVE DEMO. 79 | 363~365 | PREDICTIVE DEMO. 130 | 438 | PREDICTIVE DEMO. 181 | 489 |
| PREDICTIVE DEMO. 29 | 196~199 | PREDICTIVE DEMO. 80 | 366~368 | PREDICTIVE DEMO. 131 | 439 | PREDICTIVE DEMO. 182 | 490 |
| PREDICTIVE DEMO. 30 | 200~203 | PREDICTIVE DEMO. 81 | 369~371 | PREDICTIVE DEMO. 132 | 440 | PREDICTIVE DEMO. 183 | 491 |
| PREDICTIVE DEMO. 31 | 204~207 | PREDICTIVE DEMO. 82 | 372~374 | PREDICTIVE DEMO. 133 | 441 | PREDICTIVE DEMO. 184 | 492 |
| PREDICTIVE DEMO. 32 | 208~211 | PREDICTIVE DEMO. 83 | 375~377 | PREDICTIVE DEMO. 134 | 442 | PREDICTIVE DEMO. 185 | 493 |
| PREDICTIVE DEMO. 33 | 212~215 | PREDICTIVE DEMO. 84 | 378~380 | PREDICTIVE DEMO. 135 | 443 | PREDICTIVE DEMO. 186 | 494 |
| PREDICTIVE DEMO. 34 | 216~219 | PREDICTIVE DEMO. 85 | 381~383 | PREDICTIVE DEMO. 136 | 444 | PREDICTIVE DEMO. 187 | 495 |
| PREDICTIVE DEMO. 35 | 220~223 | PREDICTIVE DEMO. 86 | 384~386 | PREDICTIVE DEMO. 137 | 445 | PREDICTIVE DEMO. 188 | 496 |
| PREDICTIVE DEMO. 36 | 224~227 | PREDICTIVE DEMO. 87 | 387~389 | PREDICTIVE DEMO. 138 | 446 | PREDICTIVE DEMO. 189 | 497 |
| PREDICTIVE DEMO. 37 | 228~231 | PREDICTIVE DEMO. 88 | 390~392 | PREDICTIVE DEMO. 139 | 447 | PREDICTIVE DEMO. 190 | 498 |
| PREDICTIVE DEMO. 38 | 232~235 | PREDICTIVE DEMO. 89 | 393~395 | PREDICTIVE DEMO. 140 | 448 | PREDICTIVE DEMO. 191 | 499 |
| PREDICTIVE DEMO. 39 | 236~239 | PREDICTIVE DEMO. 90 | 396~398 | PREDICTIVE DEMO. 141 | 449 | PREDICTIVE DEMO. 192 | 500 |
| PREDICTIVE DEMO. 40 | 240~243 | PREDICTIVE DEMO. 91 | 399 | PREDICTIVE DEMO. 142 | 450 | PREDICTIVE DEMO. 193 | 501 |
| PREDICTIVE DEMO. 41 | 244~247 | PREDICTIVE DEMO. 92 | 400 | PREDICTIVE DEMO. 143 | 451 | PREDICTIVE DEMO. 194 | 502 |
| PREDICTIVE DEMO. 42 | 248~251 | PREDICTIVE DEMO. 93 | 401 | PREDICTIVE DEMO. 144 | 452 | PREDICTIVE DEMO. 195 | 503 |
| PREDICTIVE DEMO. 43 | 252~255 | PREDICTIVE DEMO. 94 | 402 | PREDICTIVE DEMO. 145 | 453 | PREDICTIVE DEMO. 196 | 504 |
| PREDICTIVE DEMO. 44 | 256~259 | PREDICTIVE DEMO. 95 | 403 | PREDICTIVE DEMO. 146 | 454 | PREDICTIVE DEMO. 197 | 505 |
| PREDICTIVE DEMO. 45 | 260~263 | PREDICTIVE DEMO. 96 | 404 | PREDICTIVE DEMO. 147 | 455 | PREDICTIVE DEMO. 198 | 506 |
| PREDICTIVE DEMO. 46 | 264~267 | PREDICTIVE DEMO. 97 | 405 | PREDICTIVE DEMO. 148 | 456 | PREDICTIVE DEMO. 199 | 507 |
| PREDICTIVE DEMO. 47 | 268~271 | PREDICTIVE DEMO. 98 | 406 | PREDICTIVE DEMO. 149 | 457 | PREDICTIVE DEMO. 200 | 508 |
| PREDICTIVE DEMO. 48 | 272~275 | PREDICTIVE DEMO. 99 | 407 | PREDICTIVE DEMO. 150 | 458 | PREDICTIVE DEMO. 201 | 509 |
| PREDICTIVE DEMO. 49 | 276~279 | PREDICTIVE DEMO. 100 | 408 | PREDICTIVE DEMO. 151 | 459 | PREDICTIVE DEMO. 202 | 510 |
| PREDICTIVE DEMO. 50 | 280~283 | PREDICTIVE DEMO. 101 | 409 | PREDICTIVE DEMO. 152 | 460 | PREDICTIVE DEMO. 203 | 511 |
| PREDICTIVE DEMO. 51 | 284~287 | PREDICTIVE DEMO. 102 | 410 | PREDICTIVE DEMO. 153 | 461 |  |  |

FIG. 14

TABLE FOR DETERN. OF PREDICTIVE DEMO. PATTERN FOR "BIG HIT" 《CHINNING MAN REACH》

| | RANGE OF RANDOM NUMBER | | RANGE OF RANDOM NUMBER | | RANGE OF RANDOM NUMBER | | RANGE OF RANDOM NUMBER |
|---|---|---|---|---|---|---|---|
| PREDICTIVE DEMO. 1 | 0~7 | PREDICTIVE DEMO. 52 | 243~249 | PREDICTIVE DEMO. 103 | 403 | PREDICTIVE DEMO. 154 | 462 |
| PREDICTIVE DEMO. 2 | 8~15 | PREDICTIVE DEMO. 53 | 250~257 | PREDICTIVE DEMO. 104 | 404 | PREDICTIVE DEMO. 155 | 463 |
| PREDICTIVE DEMO. 3 | 16~23 | PREDICTIVE DEMO. 54 | 258~261 | PREDICTIVE DEMO. 105 | 405 | PREDICTIVE DEMO. 156 | 464 |
| PREDICTIVE DEMO. 4 | 24~31 | PREDICTIVE DEMO. 55 | 262~265 | PREDICTIVE DEMO. 106 | 406 | PREDICTIVE DEMO. 157 | 465 |
| PREDICTIVE DEMO. 5 | 32~39 | PREDICTIVE DEMO. 56 | 266~273 | PREDICTIVE DEMO. 107 | 407 | PREDICTIVE DEMO. 158 | 466 |
| PREDICTIVE DEMO. 6 | 40~67 | PREDICTIVE DEMO. 57 | 274~277 | PREDICTIVE DEMO. 108 | 408 | PREDICTIVE DEMO. 159 | 467 |
| PREDICTIVE DEMO. 7 | 68~75 | PREDICTIVE DEMO. 58 | 278~281 | PREDICTIVE DEMO. 109 | 409 | PREDICTIVE DEMO. 160 | 468 |
| PREDICTIVE DEMO. 8 | 76~83 | PREDICTIVE DEMO. 59 | 282~289 | PREDICTIVE DEMO. 110 | 410 | PREDICTIVE DEMO. 161 | 469 |
| PREDICTIVE DEMO. 9 | 84~88 | PREDICTIVE DEMO. 60 | 290~293 | PREDICTIVE DEMO. 111 | 411 | PREDICTIVE DEMO. 162 | 470 |
| PREDICTIVE DEMO. 10 | 89~93 | PREDICTIVE DEMO. 61 | 294~297 | PREDICTIVE DEMO. 112 | 412 | PREDICTIVE DEMO. 163 | 471 |
| PREDICTIVE DEMO. 11 | 94~98 | PREDICTIVE DEMO. 62 | 298~305 | PREDICTIVE DEMO. 113 | 413 | PREDICTIVE DEMO. 164 | 472 |
| PREDICTIVE DEMO. 12 | 99~103 | PREDICTIVE DEMO. 63 | 306~309 | PREDICTIVE DEMO. 114 | 414 | PREDICTIVE DEMO. 165 | 473 |
| PREDICTIVE DEMO. 13 | 104~108 | PREDICTIVE DEMO. 64 | 310~312 | PREDICTIVE DEMO. 115 | 415 | PREDICTIVE DEMO. 166 | 474 |
| PREDICTIVE DEMO. 14 | 109~113 | PREDICTIVE DEMO. 65 | 313~315 | PREDICTIVE DEMO. 116 | 416 | PREDICTIVE DEMO. 167 | 475 |
| PREDICTIVE DEMO. 15 | 114~118 | PREDICTIVE DEMO. 66 | 316~318 | PREDICTIVE DEMO. 117 | 417 | PREDICTIVE DEMO. 168 | 476 |
| PREDICTIVE DEMO. 16 | 119~126 | PREDICTIVE DEMO. 67 | 319~321 | PREDICTIVE DEMO. 118 | 418 | PREDICTIVE DEMO. 169 | 477 |
| PREDICTIVE DEMO. 17 | 127~128 | PREDICTIVE DEMO. 68 | 322~324 | PREDICTIVE DEMO. 119 | 419 | PREDICTIVE DEMO. 170 | 478 |
| PREDICTIVE DEMO. 18 | 129~130 | PREDICTIVE DEMO. 69 | 325~327 | PREDICTIVE DEMO. 120 | 420 | PREDICTIVE DEMO. 171 | 479 |
| PREDICTIVE DEMO. 19 | 131~132 | PREDICTIVE DEMO. 70 | 328~330 | PREDICTIVE DEMO. 121 | 421 | PREDICTIVE DEMO. 172 | 480 |
| PREDICTIVE DEMO. 20 | 133~134 | PREDICTIVE DEMO. 71 | 331~333 | PREDICTIVE DEMO. 122 | 422 | PREDICTIVE DEMO. 173 | 481 |
| PREDICTIVE DEMO. 21 | 135~136 | PREDICTIVE DEMO. 72 | 334~336 | PREDICTIVE DEMO. 123 | 423 | PREDICTIVE DEMO. 174 | 482 |
| PREDICTIVE DEMO. 22 | 137~138 | PREDICTIVE DEMO. 73 | 337~339 | PREDICTIVE DEMO. 124 | 424 | PREDICTIVE DEMO. 175 | 483 |
| PREDICTIVE DEMO. 23 | 139~140 | PREDICTIVE DEMO. 74 | 340~342 | PREDICTIVE DEMO. 125 | 425 | PREDICTIVE DEMO. 176 | 484 |
| PREDICTIVE DEMO. 24 | 141~142 | PREDICTIVE DEMO. 75 | 343~345 | PREDICTIVE DEMO. 126 | 426 | PREDICTIVE DEMO. 177 | 485 |
| PREDICTIVE DEMO. 25 | 143~144 | PREDICTIVE DEMO. 76 | 346~348 | PREDICTIVE DEMO. 127 | 427 | PREDICTIVE DEMO. 178 | 486 |
| PREDICTIVE DEMO. 26 | 145~146 | PREDICTIVE DEMO. 77 | 349~351 | PREDICTIVE DEMO. 128 | 428 | PREDICTIVE DEMO. 179 | 487 |
| PREDICTIVE DEMO. 27 | 147~148 | PREDICTIVE DEMO. 78 | 352~354 | PREDICTIVE DEMO. 129 | 429 | PREDICTIVE DEMO. 180 | 488 |
| PREDICTIVE DEMO. 28 | 149~150 | PREDICTIVE DEMO. 79 | 355~357 | PREDICTIVE DEMO. 130 | 430 | PREDICTIVE DEMO. 181 | 489 |
| PREDICTIVE DEMO. 29 | 151~152 | PREDICTIVE DEMO. 80 | 358~360 | PREDICTIVE DEMO. 131 | 431 | PREDICTIVE DEMO. 182 | 490 |
| PREDICTIVE DEMO. 30 | 153~154 | PREDICTIVE DEMO. 81 | 361~363 | PREDICTIVE DEMO. 132 | 432 | PREDICTIVE DEMO. 183 | 491 |
| PREDICTIVE DEMO. 31 | 155~156 | PREDICTIVE DEMO. 82 | 364~366 | PREDICTIVE DEMO. 133 | 433 | PREDICTIVE DEMO. 184 | 492 |
| PREDICTIVE DEMO. 32 | 157~158 | PREDICTIVE DEMO. 83 | 367~369 | PREDICTIVE DEMO. 134 | 434 | PREDICTIVE DEMO. 185 | 493 |
| PREDICTIVE DEMO. 33 | 159~160 | PREDICTIVE DEMO. 84 | 370~372 | PREDICTIVE DEMO. 135 | 435 | PREDICTIVE DEMO. 186 | 494 |
| PREDICTIVE DEMO. 34 | 161~162 | PREDICTIVE DEMO. 85 | 373~375 | PREDICTIVE DEMO. 136 | 436 | PREDICTIVE DEMO. 187 | 495 |
| PREDICTIVE DEMO. 35 | 163~164 | PREDICTIVE DEMO. 86 | 376~378 | PREDICTIVE DEMO. 137 | 437 | PREDICTIVE DEMO. 188 | 496 |
| PREDICTIVE DEMO. 36 | 165~166 | PREDICTIVE DEMO. 87 | 379~381 | PREDICTIVE DEMO. 138 | 438 | PREDICTIVE DEMO. 189 | 497 |
| PREDICTIVE DEMO. 37 | 167~168 | PREDICTIVE DEMO. 88 | 382~384 | PREDICTIVE DEMO. 139 | 439 | PREDICTIVE DEMO. 190 | 498 |
| PREDICTIVE DEMO. 38 | 169~170 | PREDICTIVE DEMO. 89 | 385~387 | PREDICTIVE DEMO. 140 | 440 | PREDICTIVE DEMO. 191 | 499 |
| PREDICTIVE DEMO. 39 | 171~172 | PREDICTIVE DEMO. 90 | 388~390 | PREDICTIVE DEMO. 141 | 441~442 | PREDICTIVE DEMO. 192 | 500 |
| PREDICTIVE DEMO. 40 | 173~174 | PREDICTIVE DEMO. 91 | 391 | PREDICTIVE DEMO. 142 | 443~444 | PREDICTIVE DEMO. 193 | 501 |
| PREDICTIVE DEMO. 41 | 175~176 | PREDICTIVE DEMO. 92 | 392 | PREDICTIVE DEMO. 143 | 445~446 | PREDICTIVE DEMO. 194 | 502 |
| PREDICTIVE DEMO. 42 | 177~178 | PREDICTIVE DEMO. 93 | 393 | PREDICTIVE DEMO. 144 | 447~448 | PREDICTIVE DEMO. 195 | 503 |
| PREDICTIVE DEMO. 43 | 179~180 | PREDICTIVE DEMO. 94 | 394 | PREDICTIVE DEMO. 145 | 449~450 | PREDICTIVE DEMO. 196 | 504 |
| PREDICTIVE DEMO. 44 | 181~205 | PREDICTIVE DEMO. 95 | 395 | PREDICTIVE DEMO. 146 | 451~452 | PREDICTIVE DEMO. 197 | 505 |
| PREDICTIVE DEMO. 45 | 206~230 | PREDICTIVE DEMO. 96 | 396 | PREDICTIVE DEMO. 147 | 453~454 | PREDICTIVE DEMO. 198 | 506 |
| PREDICTIVE DEMO. 46 | 231~232 | PREDICTIVE DEMO. 97 | 397 | PREDICTIVE DEMO. 148 | 455~456 | PREDICTIVE DEMO. 199 | 507 |
| PREDICTIVE DEMO. 47 | 233~234 | PREDICTIVE DEMO. 98 | 398 | PREDICTIVE DEMO. 149 | 457 | PREDICTIVE DEMO. 200 | 508 |
| PREDICTIVE DEMO. 48 | 235~236 | PREDICTIVE DEMO. 99 | 399 | PREDICTIVE DEMO. 150 | 458 | PREDICTIVE DEMO. 201 | 509 |
| PREDICTIVE DEMO. 49 | 237~238 | PREDICTIVE DEMO. 100 | 400 | PREDICTIVE DEMO. 151 | 459 | PREDICTIVE DEMO. 202 | 510 |
| PREDICTIVE DEMO. 50 | 239~240 | PREDICTIVE DEMO. 101 | 401 | PREDICTIVE DEMO. 152 | 460 | PREDICTIVE DEMO. 203 | 511 |
| PREDICTIVE DEMO. 51 | 241~242 | PREDICTIVE DEMO. 102 | 402 | PREDICTIVE DEMO. 153 | 461 | | |

FIG. 15

TABLE FOR DETERM. OF PREDICTIVE DEMO. PATTERN FOR "LOSS" 《NORMAL REACH》

| | RANGE OF RANDOM NUMBER | | RANGE OF RANDOM NUMBER | | RANGE OF RANDOM NUMBER | | RANGE OF RANDOM NUMBER |
|---|---|---|---|---|---|---|---|
| PREDICTIVE DEMO. 1 | — | PREDICTIVE DEMO. 52 | 245~246 | PREDICTIVE DEMO. 103 | 310~311 | PREDICTIVE DEMO. 154 | 412~413 |
| PREDICTIVE DEMO. 2 | — | PREDICTIVE DEMO. 53 | 247~250 | PREDICTIVE DEMO. 104 | 312~313 | PREDICTIVE DEMO. 155 | 414~415 |
| PREDICTIVE DEMO. 3 | — | PREDICTIVE DEMO. 54 | 251~254 | PREDICTIVE DEMO. 105 | 314~315 | PREDICTIVE DEMO. 156 | 416~417 |
| PREDICTIVE DEMO. 4 | — | PREDICTIVE DEMO. 55 | 255~258 | PREDICTIVE DEMO. 106 | 316~317 | PREDICTIVE DEMO. 157 | 418~419 |
| PREDICTIVE DEMO. 5 | — | PREDICTIVE DEMO. 56 | 259~260 | PREDICTIVE DEMO. 107 | 318~319 | PREDICTIVE DEMO. 158 | 420~421 |
| PREDICTIVE DEMO. 6 | — | PREDICTIVE DEMO. 57 | 261~264 | PREDICTIVE DEMO. 108 | 320~321 | PREDICTIVE DEMO. 159 | 422~423 |
| PREDICTIVE DEMO. 7 | — | PREDICTIVE DEMO. 58 | 265~268 | PREDICTIVE DEMO. 109 | 322~323 | PREDICTIVE DEMO. 160 | 424~425 |
| PREDICTIVE DEMO. 8 | — | PREDICTIVE DEMO. 59 | 269~271 | PREDICTIVE DEMO. 110 | 324~325 | PREDICTIVE DEMO. 161 | 426~427 |
| PREDICTIVE DEMO. 9 | — | PREDICTIVE DEMO. 60 | 272~275 | PREDICTIVE DEMO. 111 | 326~327 | PREDICTIVE DEMO. 162 | 428~429 |
| PREDICTIVE DEMO. 10 | — | PREDICTIVE DEMO. 61 | 276~278 | PREDICTIVE DEMO. 112 | 328~329 | PREDICTIVE DEMO. 163 | 430~431 |
| PREDICTIVE DEMO. 11 | — | PREDICTIVE DEMO. 62 | 279~282 | PREDICTIVE DEMO. 113 | 330~331 | PREDICTIVE DEMO. 164 | 432~433 |
| PREDICTIVE DEMO. 12 | — | PREDICTIVE DEMO. 63 | 283~285 | PREDICTIVE DEMO. 114 | 332~333 | PREDICTIVE DEMO. 165 | 434~435 |
| PREDICTIVE DEMO. 13 | — | PREDICTIVE DEMO. 64 | — | PREDICTIVE DEMO. 115 | 334~335 | PREDICTIVE DEMO. 166 | 436~437 |
| PREDICTIVE DEMO. 14 | — | PREDICTIVE DEMO. 65 | — | PREDICTIVE DEMO. 116 | 336~337 | PREDICTIVE DEMO. 167 | 438~439 |
| PREDICTIVE DEMO. 15 | — | PREDICTIVE DEMO. 66 | — | PREDICTIVE DEMO. 117 | 338~339 | PREDICTIVE DEMO. 168 | 440~441 |
| PREDICTIVE DEMO. 16 | — | PREDICTIVE DEMO. 67 | — | PREDICTIVE DEMO. 118 | 340~341 | PREDICTIVE DEMO. 169 | 442~443 |
| PREDICTIVE DEMO. 17 | 0~6 | PREDICTIVE DEMO. 68 | — | PREDICTIVE DEMO. 119 | 342~343 | PREDICTIVE DEMO. 170 | 444~445 |
| PREDICTIVE DEMO. 18 | 7~13 | PREDICTIVE DEMO. 69 | — | PREDICTIVE DEMO. 120 | 344~345 | PREDICTIVE DEMO. 171 | 446~447 |
| PREDICTIVE DEMO. 19 | 14~20 | PREDICTIVE DEMO. 70 | — | PREDICTIVE DEMO. 121 | 346~347 | PREDICTIVE DEMO. 172 | 448~449 |
| PREDICTIVE DEMO. 20 | 21~27 | PREDICTIVE DEMO. 71 | — | PREDICTIVE DEMO. 122 | 348~349 | PREDICTIVE DEMO. 173 | 450~451 |
| PREDICTIVE DEMO. 21 | 28~34 | PREDICTIVE DEMO. 72 | — | PREDICTIVE DEMO. 123 | 350~351 | PREDICTIVE DEMO. 174 | 452~453 |
| PREDICTIVE DEMO. 22 | 35~41 | PREDICTIVE DEMO. 73 | — | PREDICTIVE DEMO. 124 | 352~353 | PREDICTIVE DEMO. 175 | 454~455 |
| PREDICTIVE DEMO. 23 | 42~48 | PREDICTIVE DEMO. 74 | — | PREDICTIVE DEMO. 125 | 354~355 | PREDICTIVE DEMO. 176 | 456~457 |
| PREDICTIVE DEMO. 24 | 49~55 | PREDICTIVE DEMO. 75 | — | PREDICTIVE DEMO. 126 | 356~357 | PREDICTIVE DEMO. 177 | 458~459 |
| PREDICTIVE DEMO. 25 | 56~62 | PREDICTIVE DEMO. 76 | — | PREDICTIVE DEMO. 127 | 358~359 | PREDICTIVE DEMO. 178 | 460~461 |
| PREDICTIVE DEMO. 26 | 63~69 | PREDICTIVE DEMO. 77 | — | PREDICTIVE DEMO. 128 | 360~361 | PREDICTIVE DEMO. 179 | 462~463 |
| PREDICTIVE DEMO. 27 | 70~76 | PREDICTIVE DEMO. 78 | — | PREDICTIVE DEMO. 129 | 362~363 | PREDICTIVE DEMO. 180 | 464~465 |
| PREDICTIVE DEMO. 28 | 77~83 | PREDICTIVE DEMO. 79 | — | PREDICTIVE DEMO. 130 | 364~365 | PREDICTIVE DEMO. 181 | 466~467 |
| PREDICTIVE DEMO. 29 | 84~90 | PREDICTIVE DEMO. 80 | — | PREDICTIVE DEMO. 131 | 366~367 | PREDICTIVE DEMO. 182 | 468~469 |
| PREDICTIVE DEMO. 30 | 91~97 | PREDICTIVE DEMO. 81 | — | PREDICTIVE DEMO. 132 | 368~369 | PREDICTIVE DEMO. 183 | 470~471 |
| PREDICTIVE DEMO. 31 | 98~104 | PREDICTIVE DEMO. 82 | — | PREDICTIVE DEMO. 133 | 370~371 | PREDICTIVE DEMO. 184 | 472~473 |
| PREDICTIVE DEMO. 32 | 105~111 | PREDICTIVE DEMO. 83 | — | PREDICTIVE DEMO. 134 | 372~373 | PREDICTIVE DEMO. 185 | 474~475 |
| PREDICTIVE DEMO. 33 | 112~118 | PREDICTIVE DEMO. 84 | — | PREDICTIVE DEMO. 135 | 374~375 | PREDICTIVE DEMO. 186 | 476~477 |
| PREDICTIVE DEMO. 34 | 119~125 | PREDICTIVE DEMO. 85 | — | PREDICTIVE DEMO. 136 | 376~377 | PREDICTIVE DEMO. 187 | 478~479 |
| PREDICTIVE DEMO. 35 | 126~132 | PREDICTIVE DEMO. 86 | — | PREDICTIVE DEMO. 137 | 378~379 | PREDICTIVE DEMO. 188 | 480~481 |
| PREDICTIVE DEMO. 36 | 133~139 | PREDICTIVE DEMO. 87 | — | PREDICTIVE DEMO. 138 | 380~381 | PREDICTIVE DEMO. 189 | 482~483 |
| PREDICTIVE DEMO. 37 | 140~146 | PREDICTIVE DEMO. 88 | — | PREDICTIVE DEMO. 139 | 382~383 | PREDICTIVE DEMO. 190 | 484~485 |
| PREDICTIVE DEMO. 38 | 147~153 | PREDICTIVE DEMO. 89 | — | PREDICTIVE DEMO. 140 | 384~385 | PREDICTIVE DEMO. 191 | 486~487 |
| PREDICTIVE DEMO. 39 | 154~160 | PREDICTIVE DEMO. 90 | — | PREDICTIVE DEMO. 141 | 386~387 | PREDICTIVE DEMO. 192 | 488~489 |
| PREDICTIVE DEMO. 40 | 161~167 | PREDICTIVE DEMO. 91 | 286~287 | PREDICTIVE DEMO. 142 | 388~389 | PREDICTIVE DEMO. 193 | 490~491 |
| PREDICTIVE DEMO. 41 | 168~174 | PREDICTIVE DEMO. 92 | 288~289 | PREDICTIVE DEMO. 143 | 390~391 | PREDICTIVE DEMO. 194 | 492~493 |
| PREDICTIVE DEMO. 42 | 175~181 | PREDICTIVE DEMO. 93 | 290~291 | PREDICTIVE DEMO. 144 | 392~393 | PREDICTIVE DEMO. 195 | 494~495 |
| PREDICTIVE DEMO. 43 | 182~188 | PREDICTIVE DEMO. 94 | 292~293 | PREDICTIVE DEMO. 145 | 394~395 | PREDICTIVE DEMO. 196 | 496~497 |
| PREDICTIVE DEMO. 44 | 189~195 | PREDICTIVE DEMO. 95 | 294~295 | PREDICTIVE DEMO. 146 | 396~397 | PREDICTIVE DEMO. 197 | 498~499 |
| PREDICTIVE DEMO. 45 | 196~202 | PREDICTIVE DEMO. 96 | 296~297 | PREDICTIVE DEMO. 147 | 398~399 | PREDICTIVE DEMO. 198 | 500~501 |
| PREDICTIVE DEMO. 46 | 203~209 | PREDICTIVE DEMO. 97 | 298~299 | PREDICTIVE DEMO. 148 | 400~401 | PREDICTIVE DEMO. 199 | 502~503 |
| PREDICTIVE DEMO. 47 | 210~216 | PREDICTIVE DEMO. 98 | 300~301 | PREDICTIVE DEMO. 149 | 402~403 | PREDICTIVE DEMO. 200 | 504~505 |
| PREDICTIVE DEMO. 48 | 217~223 | PREDICTIVE DEMO. 99 | 302~303 | PREDICTIVE DEMO. 150 | 404~405 | PREDICTIVE DEMO. 201 | 506~507 |
| PREDICTIVE DEMO. 49 | 224~230 | PREDICTIVE DEMO. 100 | 304~305 | PREDICTIVE DEMO. 151 | 406~407 | PREDICTIVE DEMO. 202 | 508~509 |
| PREDICTIVE DEMO. 50 | 231~237 | PREDICTIVE DEMO. 101 | 306~307 | PREDICTIVE DEMO. 152 | 408~409 | PREDICTIVE DEMO. 203 | 510~511 |
| PREDICTIVE DEMO. 51 | 238~244 | PREDICTIVE DEMO. 102 | 308~309 | PREDICTIVE DEMO. 153 | 410~411 | | |

FIG. 16

TABLE FOR DETERN. OF PREDICTIVE DEMO. PATTERN FOR "LOSS" 《CHINNING MAN REACH》

| | RANGE OF RANDOM NUMBER | | RANGE OF RANDOM NUMBER | | RANGE OF RANDOM NUMBER | | RANGE OF RANDOM NUMBER |
|---|---|---|---|---|---|---|---|
| PREDICTIVE DEMO. 1 | — | PREDICTIVE DEMO. 52 | — | PREDICTIVE DEMO. 103 | 251~256 | PREDICTIVE DEMO. 154 | 387~392 |
| PREDICTIVE DEMO. 2 | — | PREDICTIVE DEMO. 53 | — | PREDICTIVE DEMO. 104 | 257 | PREDICTIVE DEMO. 155 | 393~398 |
| PREDICTIVE DEMO. 3 | — | PREDICTIVE DEMO. 54 | — | PREDICTIVE DEMO. 105 | 258 | PREDICTIVE DEMO. 156 | 399~404 |
| PREDICTIVE DEMO. 4 | — | PREDICTIVE DEMO. 55 | — | PREDICTIVE DEMO. 106 | 259 | PREDICTIVE DEMO. 157 | 405~410 |
| PREDICTIVE DEMO. 5 | — | PREDICTIVE DEMO. 56 | — | PREDICTIVE DEMO. 107 | 260 | PREDICTIVE DEMO. 158 | 411~416 |
| PREDICTIVE DEMO. 6 | — | PREDICTIVE DEMO. 57 | — | PREDICTIVE DEMO. 108 | 261 | PREDICTIVE DEMO. 159 | 417~422 |
| PREDICTIVE DEMO. 7 | — | PREDICTIVE DEMO. 58 | — | PREDICTIVE DEMO. 109 | 262~267 | PREDICTIVE DEMO. 160 | 423~428 |
| PREDICTIVE DEMO. 8 | — | PREDICTIVE DEMO. 59 | — | PREDICTIVE DEMO. 110 | 268 | PREDICTIVE DEMO. 161 | 429~434 |
| PREDICTIVE DEMO. 9 | — | PREDICTIVE DEMO. 60 | — | PREDICTIVE DEMO. 111 | 269 | PREDICTIVE DEMO. 162 | 435~440 |
| PREDICTIVE DEMO. 10 | — | PREDICTIVE DEMO. 61 | — | PREDICTIVE DEMO. 112 | 270 | PREDICTIVE DEMO. 163 | 441~446 |
| PREDICTIVE DEMO. 11 | — | PREDICTIVE DEMO. 62 | — | PREDICTIVE DEMO. 113 | 271 | PREDICTIVE DEMO. 164 | 447~452 |
| PREDICTIVE DEMO. 12 | — | PREDICTIVE DEMO. 63 | — | PREDICTIVE DEMO. 114 | 272~277 | PREDICTIVE DEMO. 165 | 453 |
| PREDICTIVE DEMO. 13 | — | PREDICTIVE DEMO. 64 | — | PREDICTIVE DEMO. 115 | 278 | PREDICTIVE DEMO. 166 | 454 |
| PREDICTIVE DEMO. 14 | — | PREDICTIVE DEMO. 65 | — | PREDICTIVE DEMO. 116 | 279 | PREDICTIVE DEMO. 167 | 455 |
| PREDICTIVE DEMO. 15 | — | PREDICTIVE DEMO. 66 | — | PREDICTIVE DEMO. 117 | 280 | PREDICTIVE DEMO. 168 | 456 |
| PREDICTIVE DEMO. 16 | — | PREDICTIVE DEMO. 67 | — | PREDICTIVE DEMO. 118 | 281 | PREDICTIVE DEMO. 169 | 457 |
| PREDICTIVE DEMO. 17 | 0~9 | PREDICTIVE DEMO. 68 | — | PREDICTIVE DEMO. 119 | 282 | PREDICTIVE DEMO. 170 | 458 |
| PREDICTIVE DEMO. 18 | 10~16 | PREDICTIVE DEMO. 69 | — | PREDICTIVE DEMO. 120 | 283 | PREDICTIVE DEMO. 171 | 459 |
| PREDICTIVE DEMO. 19 | 17~23 | PREDICTIVE DEMO. 70 | — | PREDICTIVE DEMO. 121 | 284~289 | PREDICTIVE DEMO. 172 | 460~465 |
| PREDICTIVE DEMO. 20 | 24~30 | PREDICTIVE DEMO. 71 | — | PREDICTIVE DEMO. 122 | 290 | PREDICTIVE DEMO. 173 | 466 |
| PREDICTIVE DEMO. 21 | 31~37 | PREDICTIVE DEMO. 72 | — | PREDICTIVE DEMO. 123 | 291 | PREDICTIVE DEMO. 174 | 467 |
| PREDICTIVE DEMO. 22 | 38~44 | PREDICTIVE DEMO. 73 | — | PREDICTIVE DEMO. 124 | 292 | PREDICTIVE DEMO. 175 | 468 |
| PREDICTIVE DEMO. 23 | 45~51 | PREDICTIVE DEMO. 74 | — | PREDICTIVE DEMO. 125 | 293 | PREDICTIVE DEMO. 176 | 469 |
| PREDICTIVE DEMO. 24 | 52~58 | PREDICTIVE DEMO. 75 | — | PREDICTIVE DEMO. 126 | 294 | PREDICTIVE DEMO. 177 | 470 |
| PREDICTIVE DEMO. 25 | 59~65 | PREDICTIVE DEMO. 76 | — | PREDICTIVE DEMO. 127 | 295 | PREDICTIVE DEMO. 178 | 471 |
| PREDICTIVE DEMO. 26 | 66~72 | PREDICTIVE DEMO. 77 | — | PREDICTIVE DEMO. 128 | 296 | PREDICTIVE DEMO. 179 | 472 |
| PREDICTIVE DEMO. 27 | 73~79 | PREDICTIVE DEMO. 78 | — | PREDICTIVE DEMO. 129 | 297 | PREDICTIVE DEMO. 180 | 473 |
| PREDICTIVE DEMO. 28 | 80~86 | PREDICTIVE DEMO. 79 | — | PREDICTIVE DEMO. 130 | 298~303 | PREDICTIVE DEMO. 181 | 474 |
| PREDICTIVE DEMO. 29 | 87~93 | PREDICTIVE DEMO. 80 | — | PREDICTIVE DEMO. 131 | 304 | PREDICTIVE DEMO. 182 | 475~480 |
| PREDICTIVE DEMO. 30 | 94~100 | PREDICTIVE DEMO. 81 | — | PREDICTIVE DEMO. 132 | 305 | PREDICTIVE DEMO. 183 | 481 |
| PREDICTIVE DEMO. 31 | 101~107 | PREDICTIVE DEMO. 82 | — | PREDICTIVE DEMO. 133 | 306 | PREDICTIVE DEMO. 184 | 482 |
| PREDICTIVE DEMO. 32 | 108~114 | PREDICTIVE DEMO. 83 | — | PREDICTIVE DEMO. 134 | 307 | PREDICTIVE DEMO. 185 | 483 |
| PREDICTIVE DEMO. 33 | 115~121 | PREDICTIVE DEMO. 84 | — | PREDICTIVE DEMO. 135 | 308 | PREDICTIVE DEMO. 186 | 484 |
| PREDICTIVE DEMO. 34 | 122~128 | PREDICTIVE DEMO. 85 | — | PREDICTIVE DEMO. 136 | 309 | PREDICTIVE DEMO. 187 | 485 |
| PREDICTIVE DEMO. 35 | 129~135 | PREDICTIVE DEMO. 86 | — | PREDICTIVE DEMO. 137 | 310 | PREDICTIVE DEMO. 188 | 486 |
| PREDICTIVE DEMO. 36 | 136~142 | PREDICTIVE DEMO. 87 | — | PREDICTIVE DEMO. 138 | 311~316 | PREDICTIVE DEMO. 189 | 487 |
| PREDICTIVE DEMO. 37 | 143~149 | PREDICTIVE DEMO. 88 | — | PREDICTIVE DEMO. 139 | 317 | PREDICTIVE DEMO. 190 | 488 |
| PREDICTIVE DEMO. 38 | 150~156 | PREDICTIVE DEMO. 89 | — | PREDICTIVE DEMO. 140 | 318 | PREDICTIVE DEMO. 191 | 489 |
| PREDICTIVE DEMO. 39 | 157~163 | PREDICTIVE DEMO. 90 | — | PREDICTIVE DEMO. 141 | 319~324 | PREDICTIVE DEMO. 192 | 490~495 |
| PREDICTIVE DEMO. 40 | 164~170 | PREDICTIVE DEMO. 91 | 234 | PREDICTIVE DEMO. 142 | 325~330 | PREDICTIVE DEMO. 193 | 496 |
| PREDICTIVE DEMO. 41 | 171~177 | PREDICTIVE DEMO. 92 | 235 | PREDICTIVE DEMO. 143 | 331~336 | PREDICTIVE DEMO. 194 | 497 |
| PREDICTIVE DEMO. 42 | 178~184 | PREDICTIVE DEMO. 93 | 236 | PREDICTIVE DEMO. 144 | 337~342 | PREDICTIVE DEMO. 195 | 498 |
| PREDICTIVE DEMO. 43 | 185~191 | PREDICTIVE DEMO. 94 | 237 | PREDICTIVE DEMO. 145 | 343~348 | PREDICTIVE DEMO. 196 | 499 |
| PREDICTIVE DEMO. 44 | — | PREDICTIVE DEMO. 95 | 238 | PREDICTIVE DEMO. 146 | 349~354 | PREDICTIVE DEMO. 197 | 500 |
| PREDICTIVE DEMO. 45 | — | PREDICTIVE DEMO. 96 | 239~244 | PREDICTIVE DEMO. 147 | 355~360 | PREDICTIVE DEMO. 198 | 501 |
| PREDICTIVE DEMO. 46 | 192~198 | PREDICTIVE DEMO. 97 | 245 | PREDICTIVE DEMO. 148 | 361~366 | PREDICTIVE DEMO. 199 | 502 |
| PREDICTIVE DEMO. 47 | 199~205 | PREDICTIVE DEMO. 98 | 246 | PREDICTIVE DEMO. 149 | 367 | PREDICTIVE DEMO. 200 | 503 |
| PREDICTIVE DEMO. 48 | 206~212 | PREDICTIVE DEMO. 99 | 247 | PREDICTIVE DEMO. 150 | 368 | PREDICTIVE DEMO. 201 | 504 |
| PREDICTIVE DEMO. 49 | 213~219 | PREDICTIVE DEMO. 100 | 248 | PREDICTIVE DEMO. 151 | 369~374 | PREDICTIVE DEMO. 202 | 505~510 |
| PREDICTIVE DEMO. 50 | 220~226 | PREDICTIVE DEMO. 101 | 249 | PREDICTIVE DEMO. 152 | 375~380 | PREDICTIVE DEMO. 203 | 511 |
| PREDICTIVE DEMO. 51 | 227~233 | PREDICTIVE DEMO. 102 | 250 | PREDICTIVE DEMO. 153 | 381~386 | | |

FIG. 17

TABLE FOR DETERN. OF PREDICTIVE DEMO. PATTERN FOR "LOSS" 《NO REACH》

| | RANGE OF RANDOM NUMBER | | RANGE OF RANDOM NUMBER | | RANGE OF RANDOM NUMBER | | RANGE OF RANDOM NUMBER |
|---|---|---|---|---|---|---|---|
| PREDICTIVE DEMO. 1 | — | PREDICTIVE DEMO. 52 | — | PREDICTIVE DEMO. 103 | 156~159 | PREDICTIVE DEMO. 154 | 354~356 |
| PREDICTIVE DEMO. 2 | — | PREDICTIVE DEMO. 53 | — | PREDICTIVE DEMO. 104 | 160~163 | PREDICTIVE DEMO. 155 | 357~359 |
| PREDICTIVE DEMO. 3 | — | PREDICTIVE DEMO. 54 | — | PREDICTIVE DEMO. 105 | 164~167 | PREDICTIVE DEMO. 156 | 360~362 |
| PREDICTIVE DEMO. 4 | — | PREDICTIVE DEMO. 55 | — | PREDICTIVE DEMO. 106 | 168~171 | PREDICTIVE DEMO. 157 | 363~365 |
| PREDICTIVE DEMO. 5 | — | PREDICTIVE DEMO. 56 | — | PREDICTIVE DEMO. 107 | 172~175 | PREDICTIVE DEMO. 158 | 366~368 |
| PREDICTIVE DEMO. 6 | — | PREDICTIVE DEMO. 57 | — | PREDICTIVE DEMO. 108 | 176~179 | PREDICTIVE DEMO. 159 | 369~371 |
| PREDICTIVE DEMO. 7 | — | PREDICTIVE DEMO. 58 | — | PREDICTIVE DEMO. 109 | 180~183 | PREDICTIVE DEMO. 160 | 372~374 |
| PREDICTIVE DEMO. 8 | — | PREDICTIVE DEMO. 59 | — | PREDICTIVE DEMO. 110 | 184~187 | PREDICTIVE DEMO. 161 | 375~377 |
| PREDICTIVE DEMO. 9 | — | PREDICTIVE DEMO. 60 | — | PREDICTIVE DEMO. 111 | 188~191 | PREDICTIVE DEMO. 162 | 378~380 |
| PREDICTIVE DEMO. 10 | — | PREDICTIVE DEMO. 61 | — | PREDICTIVE DEMO. 112 | 192~195 | PREDICTIVE DEMO. 163 | 381~383 |
| PREDICTIVE DEMO. 11 | — | PREDICTIVE DEMO. 62 | — | PREDICTIVE DEMO. 113 | 196~199 | PREDICTIVE DEMO. 164 | 384~386 |
| PREDICTIVE DEMO. 12 | — | PREDICTIVE DEMO. 63 | — | PREDICTIVE DEMO. 114 | 200~203 | PREDICTIVE DEMO. 165 | 387~389 |
| PREDICTIVE DEMO. 13 | — | PREDICTIVE DEMO. 64 | 0~3 | PREDICTIVE DEMO. 115 | 204~207 | PREDICTIVE DEMO. 166 | 390~392 |
| PREDICTIVE DEMO. 14 | — | PREDICTIVE DEMO. 65 | 4~7 | PREDICTIVE DEMO. 116 | 208~211 | PREDICTIVE DEMO. 167 | 393~395 |
| PREDICTIVE DEMO. 15 | — | PREDICTIVE DEMO. 66 | 8~11 | PREDICTIVE DEMO. 117 | 212~215 | PREDICTIVE DEMO. 168 | 396~399 |
| PREDICTIVE DEMO. 16 | — | PREDICTIVE DEMO. 67 | 10~15 | PREDICTIVE DEMO. 118 | 216~219 | PREDICTIVE DEMO. 169 | 400~403 |
| PREDICTIVE DEMO. 17 | — | PREDICTIVE DEMO. 68 | 16~19 | PREDICTIVE DEMO. 119 | 220~223 | PREDICTIVE DEMO. 170 | 404~407 |
| PREDICTIVE DEMO. 18 | — | PREDICTIVE DEMO. 69 | 20~23 | PREDICTIVE DEMO. 120 | 224~227 | PREDICTIVE DEMO. 171 | 408~411 |
| PREDICTIVE DEMO. 19 | — | PREDICTIVE DEMO. 70 | 24~27 | PREDICTIVE DEMO. 121 | 228~231 | PREDICTIVE DEMO. 172 | 412~415 |
| PREDICTIVE DEMO. 20 | — | PREDICTIVE DEMO. 71 | 28~31 | PREDICTIVE DEMO. 122 | 232~233 | PREDICTIVE DEMO. 173 | 416~419 |
| PREDICTIVE DEMO. 21 | — | PREDICTIVE DEMO. 72 | 32~35 | PREDICTIVE DEMO. 123 | 234~237 | PREDICTIVE DEMO. 174 | 420~423 |
| PREDICTIVE DEMO. 22 | — | PREDICTIVE DEMO. 73 | 36~39 | PREDICTIVE DEMO. 124 | 238~241 | PREDICTIVE DEMO. 175 | 424~427 |
| PREDICTIVE DEMO. 23 | — | PREDICTIVE DEMO. 74 | 40~43 | PREDICTIVE DEMO. 125 | 242~245 | PREDICTIVE DEMO. 176 | 428~430 |
| PREDICTIVE DEMO. 24 | — | PREDICTIVE DEMO. 75 | 44~47 | PREDICTIVE DEMO. 126 | 246~249 | PREDICTIVE DEMO. 177 | 431~433 |
| PREDICTIVE DEMO. 25 | — | PREDICTIVE DEMO. 76 | 48~51 | PREDICTIVE DEMO. 127 | 250~253 | PREDICTIVE DEMO. 178 | 434~436 |
| PREDICTIVE DEMO. 26 | — | PREDICTIVE DEMO. 77 | 52~55 | PREDICTIVE DEMO. 128 | 254~257 | PREDICTIVE DEMO. 179 | 437~439 |
| PREDICTIVE DEMO. 27 | — | PREDICTIVE DEMO. 78 | 56~59 | PREDICTIVE DEMO. 129 | 258~261 | PREDICTIVE DEMO. 180 | 440~442 |
| PREDICTIVE DEMO. 28 | — | PREDICTIVE DEMO. 79 | 60~63 | PREDICTIVE DEMO. 130 | 262~265 | PREDICTIVE DEMO. 181 | 443~445 |
| PREDICTIVE DEMO. 29 | — | PREDICTIVE DEMO. 80 | 64~67 | PREDICTIVE DEMO. 131 | 266~269 | PREDICTIVE DEMO. 182 | 446~448 |
| PREDICTIVE DEMO. 30 | — | PREDICTIVE DEMO. 81 | 68~71 | PREDICTIVE DEMO. 132 | 270~273 | PREDICTIVE DEMO. 183 | 449~451 |
| PREDICTIVE DEMO. 31 | — | PREDICTIVE DEMO. 82 | 72~75 | PREDICTIVE DEMO. 133 | 274~277 | PREDICTIVE DEMO. 184 | 452~454 |
| PREDICTIVE DEMO. 32 | — | PREDICTIVE DEMO. 83 | 76~79 | PREDICTIVE DEMO. 134 | 278~281 | PREDICTIVE DEMO. 185 | 455~457 |
| PREDICTIVE DEMO. 33 | — | PREDICTIVE DEMO. 84 | 80~83 | PREDICTIVE DEMO. 135 | 282~285 | PREDICTIVE DEMO. 186 | 458~460 |
| PREDICTIVE DEMO. 34 | — | PREDICTIVE DEMO. 85 | 84~87 | PREDICTIVE DEMO. 136 | 286~289 | PREDICTIVE DEMO. 187 | 461~463 |
| PREDICTIVE DEMO. 35 | — | PREDICTIVE DEMO. 86 | 88~91 | PREDICTIVE DEMO. 137 | 290~293 | PREDICTIVE DEMO. 188 | 464~466 |
| PREDICTIVE DEMO. 36 | — | PREDICTIVE DEMO. 87 | 92~95 | PREDICTIVE DEMO. 138 | 294~297 | PREDICTIVE DEMO. 189 | 467~469 |
| PREDICTIVE DEMO. 37 | — | PREDICTIVE DEMO. 88 | 96~99 | PREDICTIVE DEMO. 139 | 298~301 | PREDICTIVE DEMO. 190 | 470~472 |
| PREDICTIVE DEMO. 38 | — | PREDICTIVE DEMO. 89 | 100~103 | PREDICTIVE DEMO. 140 | 302~305 | PREDICTIVE DEMO. 191 | 473~475 |
| PREDICTIVE DEMO. 39 | — | PREDICTIVE DEMO. 90 | 104~107 | PREDICTIVE DEMO. 141 | 306~307 | PREDICTIVE DEMO. 192 | 476~478 |
| PREDICTIVE DEMO. 40 | — | PREDICTIVE DEMO. 91 | 108~111 | PREDICTIVE DEMO. 142 | 308~311 | PREDICTIVE DEMO. 193 | 479~481 |
| PREDICTIVE DEMO. 41 | — | PREDICTIVE DEMO. 92 | 110~115 | PREDICTIVE DEMO. 143 | 312~315 | PREDICTIVE DEMO. 194 | 482~484 |
| PREDICTIVE DEMO. 42 | — | PREDICTIVE DEMO. 93 | 116~119 | PREDICTIVE DEMO. 144 | 316~319 | PREDICTIVE DEMO. 195 | 485~487 |
| PREDICTIVE DEMO. 43 | — | PREDICTIVE DEMO. 94 | 120~123 | PREDICTIVE DEMO. 145 | 320~323 | PREDICTIVE DEMO. 196 | 488~490 |
| PREDICTIVE DEMO. 44 | — | PREDICTIVE DEMO. 95 | 124~127 | PREDICTIVE DEMO. 146 | 324~327 | PREDICTIVE DEMO. 197 | 491~493 |
| PREDICTIVE DEMO. 45 | — | PREDICTIVE DEMO. 96 | 128~131 | PREDICTIVE DEMO. 147 | 328~331 | PREDICTIVE DEMO. 198 | 494~496 |
| PREDICTIVE DEMO. 46 | — | PREDICTIVE DEMO. 97 | 132~135 | PREDICTIVE DEMO. 148 | 332~335 | PREDICTIVE DEMO. 199 | 497~499 |
| PREDICTIVE DEMO. 47 | — | PREDICTIVE DEMO. 98 | 136~139 | PREDICTIVE DEMO. 149 | 336~339 | PREDICTIVE DEMO. 200 | 500~502 |
| PREDICTIVE DEMO. 48 | — | PREDICTIVE DEMO. 99 | 140~143 | PREDICTIVE DEMO. 150 | 340~343 | PREDICTIVE DEMO. 201 | 503~505 |
| PREDICTIVE DEMO. 49 | — | PREDICTIVE DEMO. 100 | 144~147 | PREDICTIVE DEMO. 151 | 344~347 | PREDICTIVE DEMO. 202 | 506~508 |
| PREDICTIVE DEMO. 50 | — | PREDICTIVE DEMO. 101 | 148~151 | PREDICTIVE DEMO. 152 | 348~351 | PREDICTIVE DEMO. 203 | 509~511 |
| PREDICTIVE DEMO. 51 | — | PREDICTIVE DEMO. 102 | 152~155 | PREDICTIVE DEMO. 153 | 352~353 | | |

FIG. 18

TABLE 1 FOR COMBINATION OF PREDICTIVE DEMO. PATTERNS

| CHARACTER'S NAME<br>PREDICTIVE DEMO. | WORD PREDICTIVE PATTERN | | | ACTION PREDICTIVE PATTERN | | |
|---|---|---|---|---|---|---|
| | KUMI | YUMI | AMI | KUMI | YUMI | AMI |
| PREDICTIVE DEMO. 1 | CHANCE♥ | — | DOKIDOKI♥ | E 2 | — | G |
| PREDICTIVE DEMO. 2 | DOKIDOKI♥ | — | DOKIDOKI♥ | A | — | F |
| PREDICTIVE DEMO. 3 | ATATTYAU | — | DOKIDOKI♥ | E 2 | — | I 2 |
| PREDICTIVE DEMO. 4 | IYATT★ | — | IYAHN♥ | A | — | H 1 |
| PREDICTIVE DEMO. 5 | GETT★ | — | GEGETT★ | C 2 | — | I 2 |
| PREDICTIVE DEMO. 6 | A"♥ | — | 1 0 0 % ? | C 2 | — | J |
| PREDICTIVE DEMO. 7 | MOSHIKASHITE | — | 1 0 0 % ? | E 2 | — | H 2 |
| PREDICTIVE DEMO. 8 | ☆○+? | — | !△♂♀ | A | — | F |
| PREDICTIVE DEMO. 9 | CHANCE♥ | GO! | — | D | K | — |
| PREDICTIVE DEMO. 10 | LUCKY♥ | GO! | — | C 2 | K | — |
| PREDICTIVE DEMO. 11 | DOKIDOKI♥ | GO! | — | B | K | — |
| PREDICTIVE DEMO. 12 | GO! | GO! | — | E 2 | K | — |
| PREDICTIVE DEMO. 13 | ATATTYAU | KURUYO! | — | E 2 | K | — |
| PREDICTIVE DEMO. 14 | ATATTYAU | GO! | — | C 2 | K | — |
| PREDICTIVE DEMO. 15 | MOSHIKASHITE | KURUYO! | — | C 2 | K | — |
| PREDICTIVE DEMO. 16 | MOSHIKASHITE | GO! | — | D | K | — |
| PREDICTIVE DEMO. 17 | LUCKY♥ | — | DOKIDOKI♥ | D | — | J |
| PREDICTIVE DEMO. 18 | CHANCE♥ | — | IYAHN♥ | E 1 | — | J |
| PREDICTIVE DEMO. 19 | LUCKY♥ | — | IYAHN♥ | E 2 | — | H 2 |
| PREDICTIVE DEMO. 20 | DOKIDOKI♥ | — | IYAHN♥ | C 2 | — | I 2 |
| PREDICTIVE DEMO. 21 | GO! | — | DOKIDOKI♥ | A | — | H 2 |
| PREDICTIVE DEMO. 22 | IKEH! | — | DOKIDOKI♥ | C 1 | — | I 2 |
| PREDICTIVE DEMO. 23 | MOSHIKASHITE | — | DOKIDOKI♥ | B | — | I 2 |
| PREDICTIVE DEMO. 24 | ☆○+? | — | DOKIDOKI♥ | E 1 | — | H 2 |
| PREDICTIVE DEMO. 25 | MOSHIKASHITE | — | YAHHOH! | E 2 | — | J |
| PREDICTIVE DEMO. 26 | EI! | — | YAHHOH! | E 1 | — | J |
| PREDICTIVE DEMO. 27 | EI! | — | URYA! | E 2 | — | H 2 |
| PREDICTIVE DEMO. 28 | ORAH! | — | YAHHOH! | E 1 | — | H 1 |
| PREDICTIVE DEMO. 29 | ORAH! | — | URYA! | E 2 | — | I 2 |
| PREDICTIVE DEMO. 30 | ORYA! | — | YAHHOH! | C 2 | — | H 2 |
| PREDICTIVE DEMO. 31 | ORYA! | — | URYA! | E 1 | — | I 1 |
| PREDICTIVE DEMO. 32 | GO! | — | YAHHOH! | E 1 | — | H 2 |
| PREDICTIVE DEMO. 33 | GO! | — | URYA! | E 2 | — | J |
| PREDICTIVE DEMO. 34 | IKEH! | — | YAHHOH! | E 2 | — | J |
| PREDICTIVE DEMO. 35 | IKEH! | — | URYA! | D | — | J |
| PREDICTIVE DEMO. 36 | IYATT★ | — | WAHI★ | E 2 | — | J |
| PREDICTIVE DEMO. 37 | IYATT★ | — | GEGETT★ | C 2 | — | H 2 |
| PREDICTIVE DEMO. 38 | GETT★ | — | WAHI★ | E 2 | — | I 2 |
| PREDICTIVE DEMO. 39 | ATATTYAU | — | WAHI★ | E 1 | — | H 1 |
| PREDICTIVE DEMO. 40 | MOSHIKASHITE | — | WAHI★ | A | — | I 2 |
| PREDICTIVE DEMO. 41 | CHANCE♥ | — | 1 0 0 % ? | C 1 | — | H 1 |
| PREDICTIVE DEMO. 42 | DOKIDOKI♥ | — | 1 0 0 % ? | C 2 | — | I 1 |
| PREDICTIVE DEMO. 43 | ☆○+? | — | 1 0 0 % ? | D | — | I 2 |
| PREDICTIVE DEMO. 44 | A"♥ | — | DAMETT♥ | C 2 | — | G |
| PREDICTIVE DEMO. 45 | A"♥ | — | YADA♥ | C 2 | — | I 2 |
| PREDICTIVE DEMO. 46 | DOKIDOKI♥ | — | URIURI | C 2 | — | J |
| PREDICTIVE DEMO. 47 | DOKIDOKI♥ | — | PURIPURI | C 1 | — | H 1 |
| PREDICTIVE DEMO. 48 | DOKIDOKI♥ | — | PEROPERO | C 1 | — | I 1 |
| PREDICTIVE DEMO. 49 | DOKIDOKI♥ | — | IKUIKU | E 1 | — | I 2 |
| PREDICTIVE DEMO. 50 | CHANCE♥ | — | !△♂♀ | C 2 | — | I 1 |
| PREDICTIVE DEMO. 51 | DOKIDOKI♥ | — | !△♂♀ | C 1 | — | H 2 |
| PREDICTIVE DEMO. 52 | CHANCE♥ | KURUYO! | — | E 1 | K | — |
| PREDICTIVE DEMO. 53 | LUCKY♥ | KURUYO! | — | D | K | — |

FIG. 19

TABLE 2 FOR COMBINATION OF PREDICTIVE DEMO. PATTERNS

| PREDICTIVE DEMO. \ CHARACTER'S NAME | WORD PREDICTIVE PATTERN | | | ACTION PREDICTIVE PATTERN | | |
|---|---|---|---|---|---|---|
| | KUMI | YUMI | AMI | KUMI | YUMI | AMI |
| PREDICTIVE DEMO. 54 | DOKIDOKI♥ | KURUYO! | — | C 1 | K | — |
| PREDICTIVE DEMO. 55 | ORYA ! | KURUYO! | — | C 2 | K | — |
| PREDICTIVE DEMO. 56 | ORYA ! | GO! | — | E 2 | K | — |
| PREDICTIVE DEMO. 57 | GO! | KURUYO! | — | C 1 | K | — |
| PREDICTIVE DEMO. 58 | IKEH ! | KURUYO! | — | B | K | — |
| PREDICTIVE DEMO. 59 | IKEH ! | GO! | — | C 2 | K | — |
| PREDICTIVE DEMO. 60 | IYATT★ | KURUYO! | — | C 1 | K | — |
| PREDICTIVE DEMO. 61 | IYATT★ | GO! | — | D | K | — |
| PREDICTIVE DEMO. 62 | GETT★ | KURUYO! | — | E 2 | K | — |
| PREDICTIVE DEMO. 63 | GETT★ | GO! | — | E 1 | K | — |
| PREDICTIVE DEMO. 64 | CHANCE♥ | — | ARE ? | A | — | F |
| PREDICTIVE DEMO. 65 | LUCKY♥ | — | ARE ? | B | — | G |
| PREDICTIVE DEMO. 66 | DOKIDOKI♥ | — | ARE ? | C 1 | — | H 1 |
| PREDICTIVE DEMO. 67 | GO! | — | ARE ? | D | — | I 1 |
| PREDICTIVE DEMO. 68 | IKEH ! | — | ARE ? | B | — | G |
| PREDICTIVE DEMO. 69 | ☆○+? | — | IYAHN♥ | C 1 | — | F |
| PREDICTIVE DEMO. 70 | ☆○+? | — | YAHHOH ! | C 1 | — | F |
| PREDICTIVE DEMO. 71 | ☆○+? | — | URYA ! | C 1 | — | G |
| PREDICTIVE DEMO. 72 | ☆○+? | — | WAHI★ | B | — | F |
| PREDICTIVE DEMO. 73 | ☆○+? | — | GEGETT★ | E 1 | — | F |
| PREDICTIVE DEMO. 74 | ☆○+? | — | ARE ? | E 1 | — | G |
| PREDICTIVE DEMO. 75 | ☆○+? | — | DAMETT♥ | B | — | G |
| PREDICTIVE DEMO. 76 | ☆○+? | — | YADA♥ | C 1 | — | H 1 |
| PREDICTIVE DEMO. 77 | ☆○+? | — | URIURI | D | — | H 1 |
| PREDICTIVE DEMO. 78 | ☆○+? | — | PURIPURI | A | — | H 1 |
| PREDICTIVE DEMO. 79 | ☆○+? | — | PEROPERO | E 1 | — | G |
| PREDICTIVE DEMO. 80 | ☆○+? | — | IKUIKU | B | — | F |
| PREDICTIVE DEMO. 81 | EI ! | — | !△♂♀ | C 2 | — | I 1 |
| PREDICTIVE DEMO. 82 | ORAH ! | — | !△♂♀ | B | — | J |
| PREDICTIVE DEMO. 83 | ORYA ! | — | !△♂♀ | B | — | G |
| PREDICTIVE DEMO. 84 | GO! | — | !△♂♀ | A | — | F |
| PREDICTIVE DEMO. 85 | IKEH ! | — | !△♂♀ | C 1 | — | H 1 |
| PREDICTIVE DEMO. 86 | IYATT★ | — | !△♂♀ | E 1 | — | I 1 |
| PREDICTIVE DEMO. 87 | GETT★ | — | !△♂♀ | D | — | G |
| PREDICTIVE DEMO. 88 | A" ♥ | — | !△♂♀ | B | — | F |
| PREDICTIVE DEMO. 89 | ATATTYAU | — | !△♂♀ | A | — | G |
| PREDICTIVE DEMO. 90 | MOSHIKASHITE | — | !△♂♀ | A | — | I 1 |
| PREDICTIVE DEMO. 91 | EI ! | — | DOKIDOKI♥ | A | — | G |
| PREDICTIVE DEMO. 92 | ORAH ! | — | DOKIDOKI♥ | C 1 | — | G |
| PREDICTIVE DEMO. 93 | ORYA ! | — | DOKIDOKI♥ | C 1 | — | H 1 |
| PREDICTIVE DEMO. 94 | IYATT★ | — | DOKIDOKI♥ | B | — | I 1 |
| PREDICTIVE DEMO. 95 | GETT★ | — | DOKIDOKI♥ | C 2 | — | F |
| PREDICTIVE DEMO. 96 | A" ♥ | — | DOKIDOKI♥ | A | — | G |
| PREDICTIVE DEMO. 97 | EI ! | — | IYAHN♥ | C 1 | — | F |
| PREDICTIVE DEMO. 98 | ORAH ! | — | IYAHN♥ | B | — | F |
| PREDICTIVE DEMO. 99 | ORYA ! | — | IYAHN♥ | D | — | I 1 |
| PREDICTIVE DEMO. 100 | GO! | — | IYAHN♥ | A | — | G |
| PREDICTIVE DEMO. 101 | IKEH ! | — | IYAHN♥ | D | — | G |
| PREDICTIVE DEMO. 102 | GETT★ | — | IYAHN♥ | D | — | F |
| PREDICTIVE DEMO. 103 | A" ♥ | — | IYAHN♥ | B | — | H 1 |
| PREDICTIVE DEMO. 104 | ATATTYAU | — | IYAHN♥ | C 2 | — | H 1 |
| PREDICTIVE DEMO. 105 | MOSHIKASHITE | — | IYAHN♥ | C 1 | — | H 1 |
| PREDICTIVE DEMO. 106 | DOKIDOKI♥ | — | YAHHOH ! | B | — | F |

FIG. 20

TABLE 3 FOR COMBINATION OF PREDICTIVE DEMO. PATTERNS

| PREDICTIVE DEMO. / CHARACTER'S NAME | WORD PREDICTIVE PATTERN | | | ACTION PREDICTIVE PATTERN | | |
|---|---|---|---|---|---|---|
| | KUMI | YUMI | AMI | KUMI | YUMI | AMI |
| PREDICTIVE DEMO. 107 | IYATT★ | — | YAHHOH! | C 1 | — | H 1 |
| PREDICTIVE DEMO. 108 | GETT★ | — | YAHHOH! | C 1 | — | G |
| PREDICTIVE DEMO. 109 | A" ♥ | — | YAHHOH! | D | — | F |
| PREDICTIVE DEMO. 110 | LUCKY♥ | — | URYA! | B | — | I 1 |
| PREDICTIVE DEMO. 111 | DOKIDOKI♥ | — | URYA! | C 1 | — | H 1 |
| PREDICTIVE DEMO. 112 | IYATT★ | — | URYA! | B | — | F |
| PREDICTIVE DEMO. 113 | GETT★ | — | URYA! | A | — | G |
| PREDICTIVE DEMO. 114 | A" ♥ | — | URYA! | A | — | F |
| PREDICTIVE DEMO. 115 | ATATTYAU | — | URYA! | B | — | H 1 |
| PREDICTIVE DEMO. 116 | MOSHIKASHITE | — | URYA! | A | — | F |
| PREDICTIVE DEMO. 117 | LUCKY♥ | — | WAHI★ | A | — | F |
| PREDICTIVE DEMO. 118 | EI! | — | WAHI★ | B | — | G |
| PREDICTIVE DEMO. 119 | ORAH! | — | WAHI★ | A | — | F |
| PREDICTIVE DEMO. 120 | ORYA! | — | WAHI★ | D | — | G |
| PREDICTIVE DEMO. 121 | A" ♥ | — | WAHI★ | E 1 | — | G |
| PREDICTIVE DEMO. 122 | CHANCE♥ | — | GEGETT★ | D | — | G |
| PREDICTIVE DEMO. 123 | LUCKY♥ | — | GEGETT★ | A | — | G |
| PREDICTIVE DEMO. 124 | DOKIDOKI♥ | — | GEGETT★ | E 1 | — | G |
| PREDICTIVE DEMO. 125 | EI! | — | GEGETT★ | B | — | F |
| PREDICTIVE DEMO. 126 | ORAH! | — | GEGETT★ | D | — | H 1 |
| PREDICTIVE DEMO. 127 | ORYA! | — | GEGETT★ | E 1 | — | G |
| PREDICTIVE DEMO. 128 | GO! | — | GEGETT★ | A | — | F |
| PREDICTIVE DEMO. 129 | IKEH! | — | GEGETT★ | A | — | H 1 |
| PREDICTIVE DEMO. 130 | A" ♥ | — | GEGETT★ | A | — | H 1 |
| PREDICTIVE DEMO. 131 | ATATTYAU | — | GEGETT★ | C 2 | — | F |
| PREDICTIVE DEMO. 132 | MOSHIKASHITE | — | GEGETT★ | A | — | G |
| PREDICTIVE DEMO. 133 | EI! | — | 100%? | A | — | H 1 |
| PREDICTIVE DEMO. 134 | ORAH! | — | 100%? | B | — | H 1 |
| PREDICTIVE DEMO. 135 | ORYA! | — | 100%? | E 1 | — | F |
| PREDICTIVE DEMO. 136 | IYATT★ | — | 100%? | B | — | H 1 |
| PREDICTIVE DEMO. 137 | GETT★ | — | 100%? | C 1 | — | I 1 |
| PREDICTIVE DEMO. 138 | A" ♥ | — | ARE? | C 2 | — | H 1 |
| PREDICTIVE DEMO. 139 | ATATTYAU | — | ARE? | C 1 | — | F |
| PREDICTIVE DEMO. 140 | MOSHIKASHITE | — | ARE? | E 1 | — | G |
| PREDICTIVE DEMO. 141 | CHANCE♥ | — | DAMETT♥ | E 1 | — | F |
| PREDICTIVE DEMO. 142 | LUCKY♥ | — | DAMETT♥ | D | — | G |
| PREDICTIVE DEMO. 143 | DOKIDOKI♥ | — | DAMETT♥ | B | — | F |
| PREDICTIVE DEMO. 144 | EI! | — | DAMETT♥ | A | — | F |
| PREDICTIVE DEMO. 145 | ORAH! | — | DAMETT♥ | E 1 | — | H 1 |
| PREDICTIVE DEMO. 146 | ORYA! | — | DAMETT♥ | C 1 | — | G |
| PREDICTIVE DEMO. 147 | GO! | — | DAMETT♥ | D | — | F |
| PREDICTIVE DEMO. 148 | IKEH! | — | DAMETT♥ | D | — | H 1 |
| PREDICTIVE DEMO. 149 | IYATT★ | — | DAMETT♥ | B | — | G |
| PREDICTIVE DEMO. 150 | GETT★ | — | DAMETT♥ | A | — | F |
| PREDICTIVE DEMO. 151 | ATATTYAU | — | DAMETT♥ | C 2 | — | F |
| PREDICTIVE DEMO. 152 | MOSHIKASHITE | — | DAMETT♥ | D | — | H 1 |
| PREDICTIVE DEMO. 153 | CHANCE♥ | — | YADA♥ | B | — | G |
| PREDICTIVE DEMO. 154 | LUCKY♥ | — | YADA♥ | C 1 | — | G |
| PREDICTIVE DEMO. 155 | DOKIDOKI♥ | — | YADA♥ | E 1 | — | F |
| PREDICTIVE DEMO. 156 | EI! | — | YADA♥ | C 1 | — | F |
| PREDICTIVE DEMO. 157 | ORAH! | — | YADA♥ | A | — | F |
| PREDICTIVE DEMO. 158 | ORYA! | — | YADA♥ | B | — | F |
| PREDICTIVE DEMO. 159 | GO! | — | YADA♥ | D | — | F |

FIG. 21

TABLE 4 FOR COMBINATION OF PREDICTIVE DEMO. PATTERNS

| PREDICTIVE DEMO. / CHARACTER'S NAME | WORD PREDICTIVE PATTERN | | | ACTION PREDICTIVE PATTERN | | |
|---|---|---|---|---|---|---|
| | KUMI | YUMI | AMI | KUMI | YUMI | AMI |
| PREDICTIVE DEMO. 160 | IKEH! | — | YADA♥ | C 1 | — | I 1 |
| PREDICTIVE DEMO. 161 | IYATT★ | — | YADA♥ | A | — | I 1 |
| PREDICTIVE DEMO. 162 | GETT★ | — | YADA♥ | B | — | I 1 |
| PREDICTIVE DEMO. 163 | ATATTYAU | — | YADA♥ | B | — | H 1 |
| PREDICTIVE DEMO. 164 | MOSHIKASHITE | — | YADA♥ | A | — | H 1 |
| PREDICTIVE DEMO. 165 | EI! | — | URIURI | D | — | H 1 |
| PREDICTIVE DEMO. 166 | ORAH! | — | URIURI | D | — | I 1 |
| PREDICTIVE DEMO. 167 | ORYA! | — | URIURI | C 1 | — | F |
| PREDICTIVE DEMO. 168 | GO! | — | URIURI | C 1 | — | G |
| PREDICTIVE DEMO. 169 | IKEH! | — | URIURI | B | — | I 1 |
| PREDICTIVE DEMO. 170 | IYATT★ | — | URIURI | D | — | F |
| PREDICTIVE DEMO. 171 | GETT★ | — | URIURI | C 1 | — | I 1 |
| PREDICTIVE DEMO. 172 | A"♥ | — | URIURI | D | — | F |
| PREDICTIVE DEMO. 173 | ATATTYAU | — | URIURI | D | — | G |
| PREDICTIVE DEMO. 174 | MOSHIKASHITE | — | URIURI | C 1 | — | F |
| PREDICTIVE DEMO. 175 | EI! | — | PURIPURI | A | — | H 1 |
| PREDICTIVE DEMO. 176 | ORAH! | — | PURIPURI | D | — | I 1 |
| PREDICTIVE DEMO. 177 | ORYA! | — | PURIPURI | A | — | H 1 |
| PREDICTIVE DEMO. 178 | GO! | — | PURIPURI | C 2 | — | G |
| PREDICTIVE DEMO. 179 | IKEH! | — | PURIPURI | E 1 | — | F |
| PREDICTIVE DEMO. 180 | IYATT★ | — | PURIPURI | A | — | F |
| PREDICTIVE DEMO. 181 | GETT★ | — | PURIPURI | E 1 | — | G |
| PREDICTIVE DEMO. 182 | A"♥ | — | PURIPURI | B | — | F |
| PREDICTIVE DEMO. 183 | ATATTYAU | — | PURIPURI | B | — | H 1 |
| PREDICTIVE DEMO. 184 | MOSHIKASHITE | — | PURIPURI | A | — | F |
| PREDICTIVE DEMO. 185 | EI! | — | PEROPERO | B | — | G |
| PREDICTIVE DEMO. 186 | ORAH! | — | PEROPERO | D | — | G |
| PREDICTIVE DEMO. 187 | ORYA! | — | PEROPERO | C 1 | — | H 1 |
| PREDICTIVE DEMO. 188 | GO! | — | PEROPERO | A | — | G |
| PREDICTIVE DEMO. 189 | IKEH! | — | PEROPERO | A | — | F |
| PREDICTIVE DEMO. 190 | IYATT★ | — | PEROPERO | B | — | F |
| PREDICTIVE DEMO. 191 | GETT★ | — | PEROPERO | D | — | F |
| PREDICTIVE DEMO. 192 | A"♥ | — | PEROPERO | A | — | H 1 |
| PREDICTIVE DEMO. 193 | ATATTYAU | — | PEROPERO | B | — | H 1 |
| PREDICTIVE DEMO. 194 | MOSHIKASHITE | — | PEROPERO | D | — | H 1 |
| PREDICTIVE DEMO. 195 | EI! | — | IKUIKU | A | — | I 1 |
| PREDICTIVE DEMO. 196 | ORAH! | — | IKUIKU | B | — | I 1 |
| PREDICTIVE DEMO. 197 | ORYA! | — | IKUIKU | C 1 | — | I 1 |
| PREDICTIVE DEMO. 198 | GO! | — | IKUIKU | D | — | I 1 |
| PREDICTIVE DEMO. 199 | IKEH! | — | IKUIKU | E 1 | — | F |
| PREDICTIVE DEMO. 200 | IYATT★ | — | IKUIKU | E 1 | — | G |
| PREDICTIVE DEMO. 201 | GETT★ | — | IKUIKU | E 1 | — | H 1 |
| PREDICTIVE DEMO. 202 | A"♥ | — | IKUIKU | E 1 | — | I 1 |
| PREDICTIVE DEMO. 203 | MOSHIKASHITE | — | IKUIKU | A | — | H 1 |

FIG. 22
ACTION PREDICTIVE PATTERN (KUMI)
PATTERN A
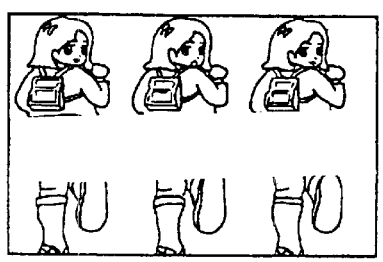
PATTERN D
PATTERN B
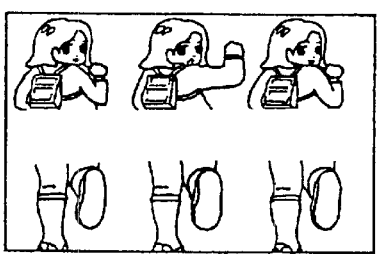
PATTERN E1
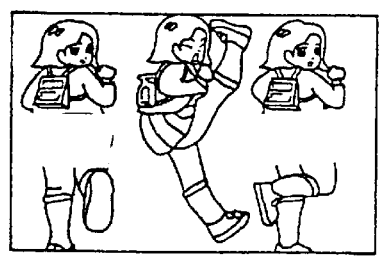
PATTERN C1
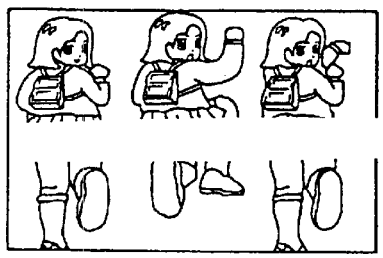
PATTERN E2
PATTERN C2
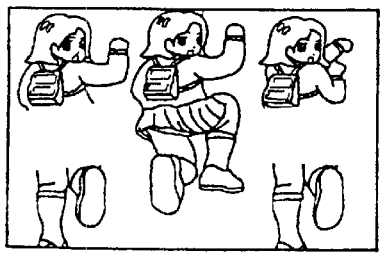

FIG. 23
ACTION PREDICTIVE PATTERN (AMI)
PATTERN F
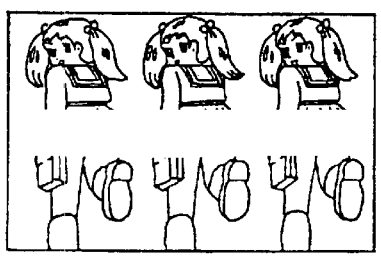
PATTERN I1
PATTERN G
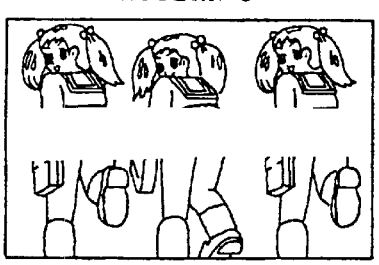
PATTERN I2
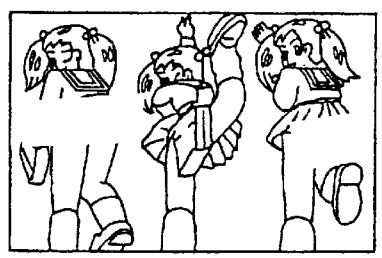
PATTERN H1
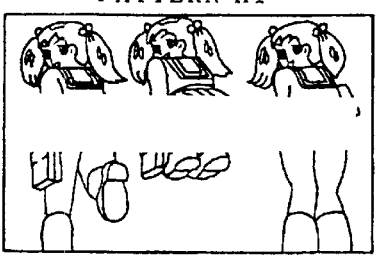
PATTERN J
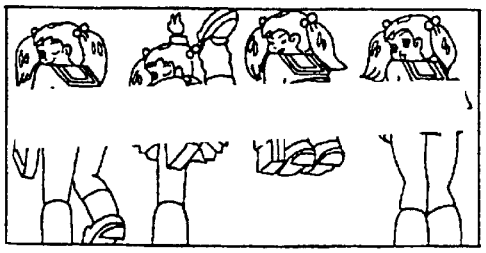
PATTERN H2
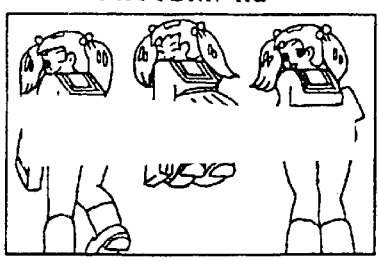
PATTERN K (YUMI)

REALTIONAL DELUSIVE ITEMS
PUDDING
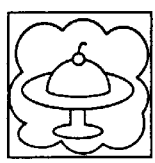 ↔ SYMBOL A
DUCK
 ↔ SYMBOL C
PEACH
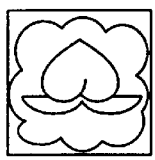 ↔ SYMBOL B
MUSHROOM
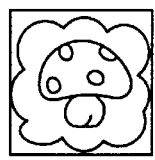 ↔ 
KOKESHI DOLL
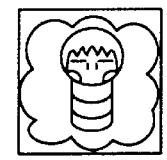
RABBIT
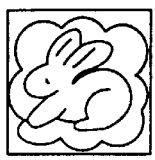 ↔ 
HEAD DECORATION "BUNNY" GIRL
BREAD (PAN IN JAPANESE) AND TEA
 ↔ SYMBOL D
LILY
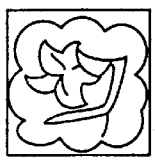 ↔ 
ROSE
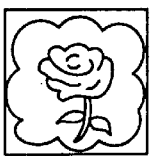
FIG. 45

CHARACTERS
| | PITHECAN | BRAIN |
|---|---|---|
| MALE CHARACTER | 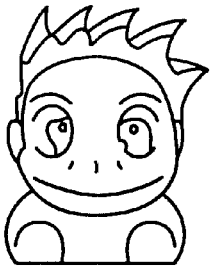 | 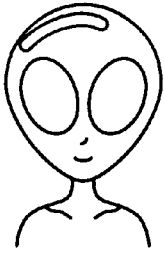 |
| | PINE | KIRI |
| FEMALE CHARACTER |  |  |
FIG. 46

MALE-MALE
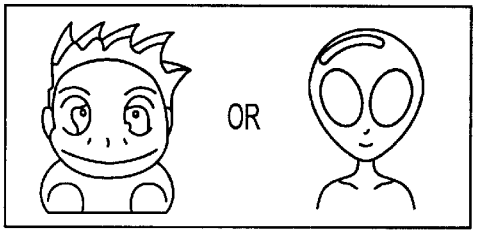 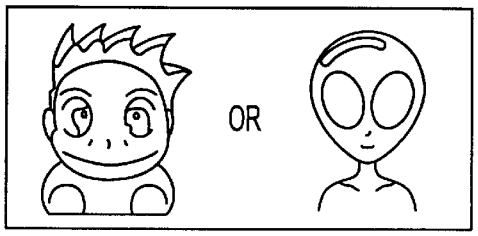
FEMALE-FEMALE
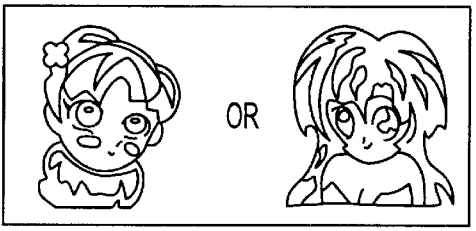 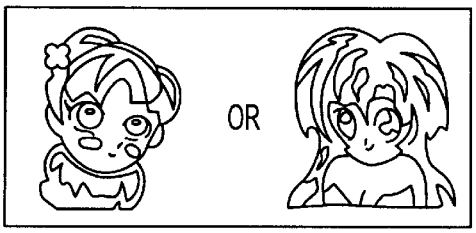
MALE-FEMALE
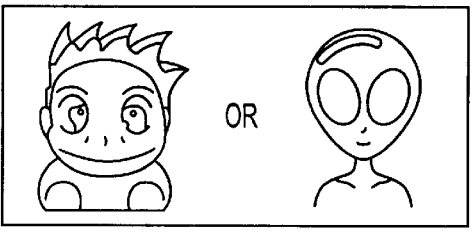 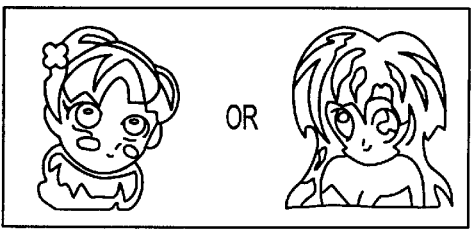
FEMALE-MALE
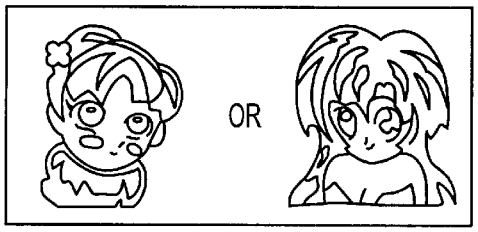 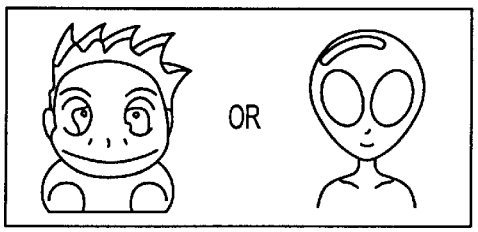
FIG. 47

FIG. 51

| KIND OF RANDOM NUMBER | RANGE OF RANDOM NUMBER |
|---|---|
| RANDOM NUMBER FOR JUDGEMENT OF "BIG HIT" | 0 ~ 255 |
| RANDOM NUMBER FOR STOP SYMBOL DETERN. | 0 ~ 14 |
| RANDOM NUMBER FOR "BIG HIT" SYMBOL DETERN. | 0 ~ 14 |
| RANDOM NUMBER FOR "REACH" DEMO. DETERN. | 0 ~ 139 |
| RANDOM NUMBER "a" FOR PREDICTIVE DEMO. PATTERN DETERN. | 0 ~ 63 |
| RANDOM NUMBER "b" FOR PREDICTIVE DEMO. PATTERN DETERN. | 0 ~ 15 |

FIG. 52

"BIG HIT" JUDGEMENT TABLE

| JUDGEMENT OF "BIG HIT" | RANDOM NUMBER FOR JUDGEMENT OF "BIG HIT" |
|---|---|
| "BIG HIT" | 7 |
| "LOSS" | 0 ~ 6, 8 ~ 255 |

FIG. 5 3

TABLE FOR DETERN. OF "REACH" DEMO. FOR "BIG HIT"

| KIND OF "REACH" | RANDOM NUMBER FOR "REACH" DEMO. DETERN. |
|---|---|
| UFO REACH | 0 ~ 24 |
| PRESENT REACH | 25 ~ 64 |
| SPORT REACH | 65 ~ 139 |

FIG. 5 4

TABLE FOR DETERN. OF "REACH" DEMO. FOR "LOSS"

| KIND OF "REACH" | RANDOM NUMBER FOR "REACH" DEMO. DETERN. |
|---|---|
| UFO REACH | 0 ~ 4 |
| PRESENT REACH | 5 ~ 8 |
| SPORT REACH | 9 ~ 11 |
| NO REACH DEMO. | 12 ~ 139 |

FIG. 55

TABLE 1(A) FOR DETERN. OF PREDICTIVE DEMO. PATTERN

| JUDGEMENT OF "BIG HIT" | KIND OF "REACH" DEMO. | RANDOM NUMBER "a" FOR PREDICTIVE DEMO. PATTERN DETERN. | LEFT CHARACTER | RIGHT CHARACTER | LEFT AND RIGHT CHARACTERS (SEX) | RELATION BETWEEN DELUSIVE ITEMS OF LEFT AND RIGHT CHARACTERS |
|---|---|---|---|---|---|---|
| "BIG HIT" | UFO REACH | 0 | BRAIN | PITHECAN | MALE-MALE | RELATIONAL |
| | | 1 | BRAIN | PITHECAN | MALE-MALE | RELATIONAL |
| | | 2 | BRAIN | PITHECAN | MALE-MALE | RELATIONAL |
| | | 3 | BRAIN | PITHECAN | MALE-MALE | RELATIONAL |
| | | 4 | BRAIN | PITHECAN | MALE-MALE | RELATIONAL |
| | | 5 | BRAIN | PINE | MALE-FEMALE | RELATIONAL |
| | | 6 | BRAIN | KIRI | MALE-FEMALE | RELATIONAL |
| | | 7 | PITHECAN | BRAIN | MALE-MALE | RELATIONAL |
| | | 8 | PINE | BRAIN | FEMALE-MALE | RELATIONAL |
| | | 9 | KIRI | BRAIN | FEMALE-MALE | RELATIONAL |
| | | 10 | PITHECAN | PINE | MALE-FEMALE | RELATIONAL |
| | | 11 | PITHECAN | PINE | MALE-FEMALE | RELATIONAL |
| | | 12 | PITHECAN | KIRI | MALE-FEMALE | RELATIONAL |
| | | 13 | PITHECAN | KIRI | MALE-FEMALE | RELATIONAL |
| | | 14 | PINE | PITHECAN | FEMALE-MALE | RELATIONAL |
| | | 15 | PINE | PITHECAN | FEMALE-MALE | RELATIONAL |
| | | 16 | PINE | KIRI | FEMALE-FEMALE | RELATIONAL |
| | | 17 | PINE | KIRI | FEMALE-FEMALE | RELATIONAL |
| | | 18 | KIRI | PITHECAN | FEMALE-MALE | RELATIONAL |
| | | 19 | KIRI | PITHECAN | FEMALE-MALE | RELATIONAL |
| | | 20 | KIRI | PINE | FEMALE-FEMALE | RELATIONAL |
| | | 21 | KIRI | PINE | FEMALE-FEMALE | RELATIONAL |
| | | 22 | BRAIN | PITHECAN | MALE-MALE | RELATIONAL |
| | | 23 | BRAIN | PITHECAN | MALE-MALE | RELATIONAL |
| | | 24 | BRAIN | PITHECAN | MALE-MALE | RELATIONAL |
| | | 25 | BRAIN | PINE | MALE-FEMALE | RELATIONAL |
| | | 26 | BRAIN | PINE | MALE-FEMALE | RELATIONAL |
| | | 27 | BRAIN | PINE | MALE-FEMALE | RELATIONAL |
| | | 28 | BRAIN | KIRI | MALE-FEMALE | RELATIONAL |
| | | 29 | BRAIN | KIRI | MALE-FEMALE | RELATIONAL |
| | | 30 | BRAIN | KIRI | MALE-FEMALE | RELATIONAL |
| | | 31 | PITHECAN | BRAIN | MALE-MALE | RELATIONAL |
| | | 32 | PITHECAN | BRAIN | MALE-MALE | RELATIONAL |
| | | 33 | PITHECAN | BRAIN | MALE-MALE | RELATIONAL |
| | | 34 | PINE | BRAIN | FEMALE-MALE | RELATIONAL |
| | | 35 | PINE | BRAIN | FEMALE-MALE | RELATIONAL |
| | | 36 | PINE | BRAIN | FEMALE-MALE | RELATIONAL |
| | | 37 | KIRI | BRAIN | FEMALE-MALE | RELATIONAL |
| | | 38 | KIRI | BRAIN | FEMALE-MALE | RELATIONAL |
| | | 39 | KIRI | BRAIN | FEMALE-MALE | RELATIONAL |
| | | 40 | PITHECAN | PINE | MALE-FEMALE | IDENTICAL |
| | | 41 | PITHECAN | PINE | MALE-FEMALE | IDENTICAL |
| | | 42 | PITHECAN | KIRI | MALE-FEMALE | IDENTICAL |
| | | 43 | PITHECAN | KIRI | MALE-FEMALE | IDENTICAL |
| | | 44 | PINE | PITHECAN | FEMALE-MALE | IDENTICAL |
| | | 45 | PINE | PITHECAN | FEMALE-MALE | IDENTICAL |
| | | 46 | PINE | KIRI | FEMALE-FEMALE | IDENTICAL |
| | | 47 | PINE | KIRI | FEMALE-FEMALE | IDENTICAL |
| | | 48 | KIRI | PINE | FEMALE-FEMALE | IDENTICAL |
| | | 49 | KIRI | PINE | FEMALE-FEMALE | IDENTICAL |
| | | 50 | KIRI | BRAIN | FEMALE-MALE | IDENTICAL |
| | | 51 | KIRI | BRAIN | FEMALE-MALE | IDENTICAL |
| | | 52 | PITHECAN | PINE | MALE-FEMALE | RELATIONAL |
| | | 53 | PITHECAN | KIRI | MALE-FEMALE | RELATIONAL |
| | | 54 | PINE | PITHECAN | FEMALE-MALE | RELATIONAL |
| | | 55 | PINE | KIRI | FEMALE-FEMALE | RELATIONAL |
| | | 56 | KIRI | PITHECAN | FEMALE-MALE | RELATIONAL |
| | | 57 | KIRI | PINE | FEMALE-FEMALE | RELATIONAL |
| | | 58 | PITHECAN | PINE | MALE-FEMALE | IDENTICAL |
| | | 59 | PITHECAN | KIRI | MALE-FEMALE | IDENTICAL |
| | | 60 | PINE | PITHECAN | FEMALE-MALE | IDENTICAL |
| | | 61 | PINE | KIRI | FEMALE-FEMALE | IDENTICAL |
| | | 62 | KIRI | PITHECAN | FEMALE-MALE | IDENTICAL |
| | | 63 | KIRI | PINE | FEMALE-FEMALE | IDENTICAL |

FIG. 56

TABLE 1(B) FOR DETERN. OF PREDICTIVE DEMO. PATTERN

| JUDGEMENT OF "BIG HIT" | KIND OF "REACH" DEMO. | RANDOM NUMBER "a" FOR PREDICTIVE DEMO. PATTERN DETERN. | LEFT CHARACTER | RIGHT CHARACTER | LEFT AND RIGHT CHARACTERS (SEX) | RELATION BETWEEN DELUSIVE ITEMS OF LEFT AND RIGHT CHARACTERS |
|---|---|---|---|---|---|---|
| "BIG HIT" | RESENT REACH | 0 | PITHECAN | PINE | MALE-FEMALE | RELATIONAL |
| | | 1 | PITHECAN | PINE | MALE-FEMALE | RELATIONAL |
| | | 2 | PITHECAN | PINE | MALE-FEMALE | RELATIONAL |
| | | 3 | PITHECAN | PINE | MALE-FEMALE | RELATIONAL |
| | | 4 | PINE | PITHECAN | FEMALE-MALE | RELATIONAL |
| | | 5 | PINE | BRAIN | FEMALE-MALE | RELATIONAL |
| | | 6 | PINE | KIRI | FEMALE-FEMALE | RELATIONAL |
| | | 7 | PITHECAN | PINE | MALE-FEMALE | RELATIONAL |
| | | 8 | BRAIN | PINE | MALE-FEMALE | RELATIONAL |
| | | 9 | KIRI | PINE | FEMALE-FEMALE | RELATIONAL |
| | | 10 | PITHECAN | BRAIN | MALE-MALE | RELATIONAL |
| | | 11 | PITHECAN | BRAIN | MALE-MALE | RELATIONAL |
| | | 12 | PITHECAN | KIRI | MALE-FEMALE | RELATIONAL |
| | | 13 | PITHECAN | KIRI | MALE-FEMALE | RELATIONAL |
| | | 14 | BRAIN | PITHECAN | MALE-MALE | RELATIONAL |
| | | 15 | BRAIN | PITHECAN | MALE-MALE | RELATIONAL |
| | | 16 | BRAIN | KIRI | MALE-FEMALE | RELATIONAL |
| | | 17 | BRAIN | KIRI | MALE-FEMALE | RELATIONAL |
| | | 18 | KIRI | PITHECAN | FEMALE-MALE | RELATIONAL |
| | | 19 | KIRI | PITHECAN | FEMALE-MALE | RELATIONAL |
| | | 20 | KIRI | BRAIN | FEMALE-MALE | RELATIONAL |
| | | 21 | KIRI | BRAIN | FEMALE-MALE | RELATIONAL |
| | | 22 | PINE | PITHECAN | FEMALE-MALE | RELATIONAL |
| | | 23 | PINE | PITHECAN | FEMALE-MALE | RELATIONAL |
| | | 24 | PINE | PITHECAN | FEMALE-MALE | RELATIONAL |
| | | 25 | PINE | BRAIN | FEMALE-MALE | RELATIONAL |
| | | 26 | PINE | BRAIN | FEMALE-MALE | RELATIONAL |
| | | 27 | PINE | BRAIN | FEMALE-MALE | RELATIONAL |
| | | 28 | PINE | KIRI | FEMALE-FEMALE | RELATIONAL |
| | | 29 | PINE | KIRI | FEMALE-FEMALE | RELATIONAL |
| | | 30 | PINE | KIRI | FEMALE-FEMALE | RELATIONAL |
| | | 31 | PITHECAN | PINE | MALE-FEMALE | RELATIONAL |
| | | 32 | PITHECAN | PINE | MALE-FEMALE | RELATIONAL |
| | | 33 | PITHECAN | PINE | MALE-FEMALE | RELATIONAL |
| | | 34 | BRAIN | PINE | MALE-FEMALE | RELATIONAL |
| | | 35 | BRAIN | PINE | MALE-FEMALE | RELATIONAL |
| | | 36 | BRAIN | PINE | MALE-FEMALE | RELATIONAL |
| | | 37 | KIRI | PINE | FEMALE-FEMALE | RELATIONAL |
| | | 38 | KIRI | PINE | FEMALE-FEMALE | RELATIONAL |
| | | 39 | KIRI | PINE | FEMALE-FEMALE | RELATIONAL |
| | | 40 | PITHECAN | BRAIN | MALE-MALE | IDENTICAL |
| | | 41 | PITHECAN | BRAIN | MALE-MALE | IDENTICAL |
| | | 42 | PITHECAN | KIRI | MALE-FEMALE | IDENTICAL |
| | | 43 | PITHECAN | KIRI | MALE-FEMALE | IDENTICAL |
| | | 44 | BRAIN | PITHECAN | MALE-MALE | IDENTICAL |
| | | 45 | BRAIN | PITHECAN | MALE-MALE | IDENTICAL |
| | | 46 | BRAIN | KIRI | MALE-FEMALE | IDENTICAL |
| | | 47 | BRAIN | KIRI | MALE-FEMALE | IDENTICAL |
| | | 48 | KIRI | PITHECAN | FEMALE-MALE | IDENTICAL |
| | | 49 | KIRI | PITHECAN | FEMALE-MALE | IDENTICAL |
| | | 50 | KIRI | BRAIN | FEMALE-MALE | IDENTICAL |
| | | 51 | KIRI | BRAIN | FEMALE-MALE | IDENTICAL |
| | | 52 | PITHECAN | BRAIN | MALE-MALE | RELATIONAL |
| | | 53 | PITHECAN | KIRI | MALE-FEMALE | RELATIONAL |
| | | 54 | BRAIN | PITHECAN | MALE-MALE | RELATIONAL |
| | | 55 | BRAIN | KIRI | MALE-FEMALE | RELATIONAL |
| | | 56 | KIRI | PITHECAN | FEMALE-MALE | RELATIONAL |
| | | 57 | KIRI | BRAIN | FEMALE-MALE | RELATIONAL |
| | | 58 | PITHECAN | BRAIN | MALE-MALE | IDENTICAL |
| | | 59 | PITHECAN | KIRI | MALE-FEMALE | IDENTICAL |
| | | 60 | BRAIN | PITHECAN | MALE-MALE | IDENTICAL |
| | | 61 | BRAIN | KIRI | MALE-FEMALE | IDENTICAL |
| | | 62 | KIRI | PITHECAN | FEMALE-MALE | IDENTICAL |
| | | 63 | KIRI | BRAIN | FEMALE-MALE | IDENTICAL |

FIG. 57

TABLE 1(C) FOR DETERM. OF PREDICTIVE DEMO. PATTERN

| JUDGEMENT OF "BIG HIT" | KIND OF "REACH" DEMO. | RANDOM NUMBER "a" FOR PREDICTIVE DEMO. PATTERN DETERN. | LEFT CHARACTER | RIGHT CHARACTER | LEFT AND RIGHT CHARACTERS (SEX) | RELATION BETWEEN DELUSIVE ITEMS OF LEFT AND RIGHT CHARACTERS |
|---|---|---|---|---|---|---|
| "BIG HIT" | SPORT REACH | 0 | KIRI | PITHECAN | FEMALE-MALE | RELATIONAL |
| | | 1 | KIRI | PITHECAN | FEMALE-MALE | RELATIONAL |
| | | 2 | KIRI | PITHECAN | FEMALE-MALE | RELATIONAL |
| | | 3 | KIRI | PITHECAN | FEMALE-MALE | RELATIONAL |
| | | 4 | KIRI | PITHECAN | FEMALE-MALE | RELATIONAL |
| | | 5 | KIRI | PINE | FEMALE-FEMALE | RELATIONAL |
| | | 6 | KIRI | BRAIN | FEMALE-MALE | RELATIONAL |
| | | 7 | PITHECAN | KIRI | MALE-FEMALE | RELATIONAL |
| | | 8 | BRAIN | KIRI | MALE-FEMALE | RELATIONAL |
| | | 9 | PINE | KIRI | FEMALE-FEMALE | RELATIONAL |
| | | 10 | PITHECAN | BRAIN | MALE-MALE | RELATIONAL |
| | | 11 | PITHECAN | BRAIN | MALE-MALE | RELATIONAL |
| | | 12 | PITHECAN | PINE | MALE-FEMALE | RELATIONAL |
| | | 13 | PITHECAN | PINE | MALE-FEMALE | RELATIONAL |
| | | 14 | BRAIN | PITHECAN | MALE-MALE | RELATIONAL |
| | | 15 | BRAIN | PITHECAN | MALE-MALE | RELATIONAL |
| | | 16 | BRAIN | PINE | MALE-FEMALE | RELATIONAL |
| | | 17 | BRAIN | PINE | MALE-FEMALE | RELATIONAL |
| | | 18 | PINE | PITHECAN | FEMALE-MALE | RELATIONAL |
| | | 19 | PINE | PITHECAN | FEMALE-MALE | RELATIONAL |
| | | 20 | PINE | BRAIN | FEMALE-MALE | RELATIONAL |
| | | 21 | PINE | BRAIN | FEMALE-MALE | RELATIONAL |
| | | 22 | KIRI | PITHECAN | FEMALE-MALE | RELATIONAL |
| | | 23 | KIRI | PITHECAN | FEMALE-MALE | RELATIONAL |
| | | 24 | KIRI | PITHECAN | FEMALE-MALE | RELATIONAL |
| | | 25 | KIRI | BRAIN | FEMALE-MALE | RELATIONAL |
| | | 26 | KIRI | BRAIN | FEMALE-MALE | RELATIONAL |
| | | 27 | KIRI | BRAIN | FEMALE-MALE | RELATIONAL |
| | | 28 | KIRI | PINE | FEMALE-FEMALE | RELATIONAL |
| | | 29 | KIRI | PINE | FEMALE-FEMALE | RELATIONAL |
| | | 30 | KIRI | PINE | FEMALE-FEMALE | RELATIONAL |
| | | 31 | PITHECAN | KIRI | MALE-FEMALE | RELATIONAL |
| | | 32 | PITHECAN | KIRI | MALE-FEMALE | RELATIONAL |
| | | 33 | PITHECAN | KIRI | MALE-FEMALE | RELATIONAL |
| | | 34 | BRAIN | KIRI | MALE-FEMALE | RELATIONAL |
| | | 35 | BRAIN | KIRI | MALE-FEMALE | RELATIONAL |
| | | 36 | BRAIN | KIRI | MALE-FEMALE | RELATIONAL |
| | | 37 | PINE | KIRI | FEMALE-FEMALE | RELATIONAL |
| | | 38 | PINE | KIRI | FEMALE-FEMALE | RELATIONAL |
| | | 39 | PINE | KIRI | FEMALE-FEMALE | RELATIONAL |
| | | 40 | PITHECAN | BRAIN | MALE-MALE | IDENTICAL |
| | | 41 | PITHECAN | BRAIN | MALE-MALE | IDENTICAL |
| | | 42 | PITHECAN | PINE | MALE-FEMALE | IDENTICAL |
| | | 43 | PITHECAN | PINE | MALE-FEMALE | IDENTICAL |
| | | 44 | BRAIN | PITHECAN | MALE-MALE | IDENTICAL |
| | | 45 | BRAIN | PITHECAN | MALE-MALE | IDENTICAL |
| | | 46 | BRAIN | PINE | MALE-FEMALE | IDENTICAL |
| | | 47 | BRAIN | PINE | MALE-FEMALE | IDENTICAL |
| | | 48 | PINE | PITHECAN | FEMALE-MALE | IDENTICAL |
| | | 49 | PINE | PITHECAN | FEMALE-MALE | IDENTICAL |
| | | 50 | PINE | BRAIN | FEMALE-MALE | IDENTICAL |
| | | 51 | PINE | BRAIN | FEMALE-MALE | IDENTICAL |
| | | 52 | PITHECAN | BRAIN | MALE-MALE | RELATIONAL |
| | | 53 | PITHECAN | PINE | MALE-FEMALE | RELATIONAL |
| | | 54 | BRAIN | PITHECAN | MALE-MALE | RELATIONAL |
| | | 55 | BRAIN | PINE | MALE-FEMALE | RELATIONAL |
| | | 56 | PINE | PITHECAN | FEMALE-MALE | RELATIONAL |
| | | 57 | PINE | BRAIN | FEMALE-MALE | RELATIONAL |
| | | 58 | PITHECAN | BRAIN | MALE-MALE | IDENTICAL |
| | | 59 | PITHECAN | PINE | MALE-FEMALE | IDENTICAL |
| | | 60 | BRAIN | PITHECAN | MALE-MALE | IDENTICAL |
| | | 61 | BRAIN | PINE | MALE-FEMALE | IDENTICAL |
| | | 62 | PINE | PITHECAN | FEMALE-MALE | IDENTICAL |
| | | 63 | PINE | BRAIN | FEMALE-MALE | IDENTICAL |

FIG. 58

TABLE 1(D) FOR DETERN. OF PREDICTIVE DEMO. PATTERN

| JUDGEMENT OF "BIG HIT" | KIND OF "REACH" DEMO. | RANDOM NUMBER "a" FOR PREDICTIVE DEMO. PATTERN DETERN. | LEFT CHARACTER | RIGHT CHARACTER | LEFT AND RIGHT CHARACTERS (SEX) | RELATION BETWEEN DELUSIVE ITEMS OF LEFT AND RIGHT CHARACTERS |
|---|---|---|---|---|---|---|
| "LOSS" | UFO REACH | 0 | PITHECAN | PINE | MALE-FEMALE | RELATIONAL |
| | | 1 | PITHECAN | KIRI | MALE-FEMALE | RELATIONAL |
| | | 2 | PINE | PITHECAN | FEMALE-MALE | RELATIONAL |
| | | 3 | PINE | KIRI | FEMALE-FEMALE | RELATIONAL |
| | | 4 | KIRI | PITHECAN | FEMALE-MALE | RELATIONAL |
| | | 5 | KIRI | PINE | FEMALE-FEMALE | RELATIONAL |
| | | 6 | BRAIN | PITHECAN | MALE-MALE | RELATIONAL |
| | | 7 | BRAIN | PITHECAN | MALE-MALE | RELATIONAL |
| | | 8 | BRAIN | PITHECAN | MALE-MALE | RELATIONAL |
| | | 9 | BRAIN | PINE | MALE-FEMALE | RELATIONAL |
| | | 10 | BRAIN | PINE | MALE-FEMALE | RELATIONAL |
| | | 11 | BRAIN | PINE | MALE-FEMALE | RELATIONAL |
| | | 12 | BRAIN | KIRI | MALE-FEMALE | RELATIONAL |
| | | 13 | BRAIN | KIRI | MALE-FEMALE | RELATIONAL |
| | | 14 | BRAIN | KIRI | MALE-FEMALE | RELATIONAL |
| | | 15 | PITHECAN | BRAIN | MALE-MALE | RELATIONAL |
| | | 16 | PITHECAN | BRAIN | MALE-MALE | RELATIONAL |
| | | 17 | PITHECAN | BRAIN | MALE-MALE | RELATIONAL |
| | | 18 | PINE | BRAIN | FEMALE-MALE | RELATIONAL |
| | | 19 | PINE | BRAIN | FEMALE-MALE | RELATIONAL |
| | | 20 | PINE | BRAIN | FEMALE-MALE | RELATIONAL |
| | | 21 | KIRI | BRAIN | FEMALE-MALE | RELATIONAL |
| | | 22 | KIRI | BRAIN | FEMALE-MALE | RELATIONAL |
| | | 23 | KIRI | BRAIN | FEMALE-MALE | RELATIONAL |
| | | 24 | PITHECAN | PINE | MALE-FEMALE | RELATIONAL |
| | | 25 | PITHECAN | PINE | MALE-FEMALE | RELATIONAL |
| | | 26 | PITHECAN | KIRI | MALE-FEMALE | RELATIONAL |
| | | 27 | PITHECAN | KIRI | MALE-FEMALE | RELATIONAL |
| | | 28 | PINE | PITHECAN | FEMALE-MALE | RELATIONAL |
| | | 29 | PINE | PITHECAN | FEMALE-MALE | RELATIONAL |
| | | 30 | PINE | KIRI | FEMALE-FEMALE | RELATIONAL |
| | | 31 | PINE | KIRI | FEMALE-FEMALE | RELATIONAL |
| | | 32 | KIRI | PITHECAN | FEMALE-MALE | RELATIONAL |
| | | 33 | KIRI | PITHECAN | FEMALE-MALE | RELATIONAL |
| | | 34 | KIRI | PINE | FEMALE-FEMALE | RELATIONAL |
| | | 35 | KIRI | PINE | FEMALE-FEMALE | RELATIONAL |
| | | 36 | PITHECAN | PINE | MALE-FEMALE | RELATIONAL |
| | | 37 | PITHECAN | PINE | MALE-FEMALE | RELATIONAL |
| | | 38 | PITHECAN | KIRI | MALE-FEMALE | RELATIONAL |
| | | 39 | PITHECAN | KIRI | MALE-FEMALE | RELATIONAL |
| | | 40 | PITHECAN | PINE | MALE-FEMALE | IDENTICAL |
| | | 41 | PITHECAN | KIRI | MALE-FEMALE | IDENTICAL |
| | | 42 | PINE | PITHECAN | FEMALE-MALE | IDENTICAL |
| | | 43 | PINE | KIRI | FEMALE-FEMALE | IDENTICAL |
| | | 44 | KIRI | PITHECAN | FEMALE-MALE | IDENTICAL |
| | | 45 | KIRI | PINE | FEMALE-FEMALE | IDENTICAL |
| | | 46 | PITHECAN | PINE | MALE-FEMALE | IDENTICAL |
| | | 47 | PITHECAN | KIRI | MALE-FEMALE | IDENTICAL |
| | | 48 | PINE | PITHECAN | FEMALE-MALE | IDENTICAL |
| | | 49 | PINE | KIRI | FEMALE-FEMALE | IDENTICAL |
| | | 50 | KIRI | PITHECAN | FEMALE-MALE | IDENTICAL |
| | | 51 | KIRI | PINE | FEMALE-FEMALE | IDENTICAL |
| | | 52 | PITHECAN | PINE | MALE-FEMALE | IDENTICAL |
| | | 53 | PITHECAN | KIRI | MALE-FEMALE | IDENTICAL |
| | | 54 | PINE | PITHECAN | FEMALE-MALE | IDENTICAL |
| | | 55 | PINE | KIRI | FEMALE-FEMALE | IDENTICAL |
| | | 56 | KIRI | PITHECAN | FEMALE-MALE | IDENTICAL |
| | | 57 | KIRI | PINE | FEMALE-FEMALE | IDENTICAL |
| | | 58 | PITHECAN | PINE | MALE-FEMALE | IDENTICAL |
| | | 59 | PITHECAN | KIRI | MALE-FEMALE | IDENTICAL |
| | | 60 | PINE | PITHECAN | FEMALE-MALE | IDENTICAL |
| | | 61 | PINE | KIRI | FEMALE-FEMALE | IDENTICAL |
| | | 62 | KIRI | PITHECAN | FEMALE-MALE | IDENTICAL |
| | | 63 | KIRI | PINE | FEMALE-FEMALE | IDENTICAL |

FIG. 59

TABLE 1(E) FOR DETERN. OF PREDICTIVE DEMO. PATTERN

| JUDGEMENT OF "BIG HIT" | KIND OF "REACH" DEMO. | RANDOM NUMBER "a" FOR PREDICTIVE DEMO. PATTERN DETERN. | LEFT CHARACTER | RIGHT CHARACTER | LEFT AND RIGHT CHARACTERS (SEX) | RELATION BETWEEN DELUSIVE ITEMS OF LEFT AND RIGHT CHARACTERS |
|---|---|---|---|---|---|---|
| "LOSS" | RESENT REACH | 0 | PITHECAN | BRAIN | MALE-MALE | RELATIONAL |
| | | 1 | PITHECAN | KIRI | MALE-FEMALE | RELATIONAL |
| | | 2 | BRAIN | PITHECAN | MALE-MALE | RELATIONAL |
| | | 3 | BRAIN | KIRI | MALE-FEMALE | RELATIONAL |
| | | 4 | KIRI | PITHECAN | FEMALE-MALE | RELATIONAL |
| | | 5 | KIRI | BRAIN | FEMALE-MALE | RELATIONAL |
| | | 6 | PINE | PITHECAN | FEMALE-MALE | RELATIONAL |
| | | 7 | PINE | PITHECAN | FEMALE-MALE | RELATIONAL |
| | | 8 | PINE | PITHECAN | FEMALE-MALE | RELATIONAL |
| | | 9 | PINE | BRAIN | FEMALE-MALE | RELATIONAL |
| | | 10 | PINE | BRAIN | FEMALE-MALE | RELATIONAL |
| | | 11 | PINE | BRAIN | FEMALE-MALE | RELATIONAL |
| | | 12 | PINE | KIRI | FEMALE-FEMALE | RELATIONAL |
| | | 13 | PINE | KIRI | FEMALE-FEMALE | RELATIONAL |
| | | 14 | PINE | KIRI | FEMALE-FEMALE | RELATIONAL |
| | | 15 | PITHECAN | PINE | MALE-FEMALE | RELATIONAL |
| | | 16 | PITHECAN | PINE | MALE-FEMALE | RELATIONAL |
| | | 17 | PITHECAN | PINE | MALE-FEMALE | RELATIONAL |
| | | 18 | BRAIN | PINE | MALE-FEMALE | RELATIONAL |
| | | 19 | BRAIN | PINE | MALE-FEMALE | RELATIONAL |
| | | 20 | BRAIN | PINE | MALE-FEMALE | RELATIONAL |
| | | 21 | KIRI | PINE | FEMALE-FEMALE | RELATIONAL |
| | | 22 | KIRI | PINE | FEMALE-FEMALE | RELATIONAL |
| | | 23 | KIRI | PINE | FEMALE-FEMALE | RELATIONAL |
| | | 24 | PITHECAN | BRAIN | MALE-MALE | RELATIONAL |
| | | 25 | PITHECAN | BRAIN | MALE-MALE | RELATIONAL |
| | | 26 | PITHECAN | KIRI | MALE-FEMALE | RELATIONAL |
| | | 27 | PITHECAN | KIRI | MALE-FEMALE | RELATIONAL |
| | | 28 | BRAIN | PITHECAN | MALE-MALE | RELATIONAL |
| | | 29 | BRAIN | PITHECAN | MALE-MALE | RELATIONAL |
| | | 30 | BRAIN | KIRI | MALE-FEMALE | RELATIONAL |
| | | 31 | BRAIN | KIRI | MALE-FEMALE | RELATIONAL |
| | | 32 | KIRI | PITHECAN | FEMALE-MALE | RELATIONAL |
| | | 33 | KIRI | PITHECAN | FEMALE-MALE | RELATIONAL |
| | | 34 | KIRI | BRAIN | FEMALE-MALE | RELATIONAL |
| | | 35 | KIRI | BRAIN | FEMALE-MALE | RELATIONAL |
| | | 36 | PITHECAN | BRAIN | MALE-MALE | RELATIONAL |
| | | 37 | PITHECAN | BRAIN | MALE-MALE | RELATIONAL |
| | | 38 | PITHECAN | KIRI | MALE-FEMALE | RELATIONAL |
| | | 39 | PITHECAN | KIRI | MALE-FEMALE | RELATIONAL |
| | | 40 | PITHECAN | BRAIN | MALE-MALE | IDENTICAL |
| | | 41 | PITHECAN | KIRI | MALE-FEMALE | IDENTICAL |
| | | 42 | BRAIN | PITHECAN | MALE-MALE | IDENTICAL |
| | | 43 | BRAIN | KIRI | MALE-FEMALE | IDENTICAL |
| | | 44 | KIRI | PITHECAN | FEMALE-MALE | IDENTICAL |
| | | 45 | KIRI | BRAIN | FEMALE-MALE | IDENTICAL |
| | | 46 | PITHECAN | BRAIN | MALE-MALE | IDENTICAL |
| | | 47 | PITHECAN | KIRI | MALE-FEMALE | IDENTICAL |
| | | 48 | BRAIN | PITHECAN | MALE-MALE | IDENTICAL |
| | | 49 | BRAIN | KIRI | MALE-FEMALE | IDENTICAL |
| | | 50 | KIRI | PITHECAN | FEMALE-MALE | IDENTICAL |
| | | 51 | KIRI | BRAIN | FEMALE-MALE | IDENTICAL |
| | | 52 | PITHECAN | BRAIN | MALE-MALE | IDENTICAL |
| | | 53 | PITHECAN | KIRI | MALE-FEMALE | IDENTICAL |
| | | 54 | BRAIN | PITHECAN | MALE-MALE | IDENTICAL |
| | | 55 | BRAIN | KIRI | MALE-FEMALE | IDENTICAL |
| | | 56 | KIRI | PITHECAN | FEMALE-MALE | IDENTICAL |
| | | 57 | KIRI | BRAIN | FEMALE-MALE | IDENTICAL |
| | | 58 | PITHECAN | BRAIN | MALE-MALE | IDENTICAL |
| | | 59 | PITHECAN | KIRI | MALE-FEMALE | IDENTICAL |
| | | 60 | BRAIN | PITHECAN | MALE-MALE | IDENTICAL |
| | | 61 | BRAIN | KIRI | MALE-FEMALE | IDENTICAL |
| | | 62 | KIRI | PITHECAN | FEMALE-MALE | IDENTICAL |
| | | 63 | KIRI | BRAIN | FEMALE-MALE | IDENTICAL |

FIG. 60

TABLE 1(F) FOR DETERN. OF PREDICTIVE DEMO. PATTERN

| JUDGEMENT OF "BIG HIT" | KIND OF "REACH" DEMO. | RANDOM NUMBER "a" FOR PREDICTIVE DEMO. PATTERN DETERN. | LEFT CHARACTER | RIGHT CHARACTER | LEFT AND RIGHT CHARACTERS (SEX) | RELATION BETWEEN DELUSIVE ITEMS OF LEFT AND RIGHT CHARACTERS |
|---|---|---|---|---|---|---|
| "LOSS" | SPORT REACH | 0 | PITHECAN | BRAIN | MALE-MALE | RELATIONAL |
| | | 1 | PITHECAN | PINE | MALE-FEMALE | RELATIONAL |
| | | 2 | BRAIN | PITHECAN | MALE-MALE | RELATIONAL |
| | | 3 | BRAIN | PINE | MALE-FEMALE | RELATIONAL |
| | | 4 | PINE | PITHECAN | FEMALE-MALE | RELATIONAL |
| | | 5 | PINE | BRAIN | FEMALE-MALE | RELATIONAL |
| | | 6 | KIRI | PITHECAN | FEMALE-MALE | RELATIONAL |
| | | 7 | KIRI | PITHECAN | FEMALE-MALE | RELATIONAL |
| | | 8 | KIRI | PITHECAN | FEMALE-MALE | RELATIONAL |
| | | 9 | KIRI | BRAIN | FEMALE-MALE | RELATIONAL |
| | | 10 | KIRI | BRAIN | FEMALE-MALE | RELATIONAL |
| | | 11 | KIRI | BRAIN | FEMALE-MALE | RELATIONAL |
| | | 12 | KIRI | PINE | FEMALE-FEMALE | RELATIONAL |
| | | 13 | KIRI | PINE | FEMALE-FEMALE | RELATIONAL |
| | | 14 | KIRI | PINE | FEMALE-FEMALE | RELATIONAL |
| | | 15 | PITHECAN | KIRI | MALE-FEMALE | RELATIONAL |
| | | 16 | PITHECAN | KIRI | MALE-FEMALE | RELATIONAL |
| | | 17 | PITHECAN | KIRI | MALE-FEMALE | RELATIONAL |
| | | 18 | BRAIN | KIRI | MALE-FEMALE | RELATIONAL |
| | | 19 | BRAIN | KIRI | MALE-FEMALE | RELATIONAL |
| | | 20 | BRAIN | KIRI | MALE-FEMALE | RELATIONAL |
| | | 21 | PINE | KIRI | FEMALE-FEMALE | RELATIONAL |
| | | 22 | PINE | KIRI | FEMALE-FEMALE | RELATIONAL |
| | | 23 | PINE | KIRI | FEMALE-FEMALE | RELATIONAL |
| | | 24 | PITHECAN | BRAIN | MALE-MALE | RELATIONAL |
| | | 25 | PITHECAN | BRAIN | MALE-MALE | RELATIONAL |
| | | 26 | PITHECAN | PINE | MALE-FEMALE | RELATIONAL |
| | | 27 | PITHECAN | PINE | MALE-FEMALE | RELATIONAL |
| | | 28 | BRAIN | PITHECAN | MALE-MALE | RELATIONAL |
| | | 29 | BRAIN | PITHECAN | MALE-MALE | RELATIONAL |
| | | 30 | BRAIN | PINE | MALE-FEMALE | RELATIONAL |
| | | 31 | BRAIN | PINE | MALE-FEMALE | RELATIONAL |
| | | 32 | PINE | PITHECAN | FEMALE-MALE | RELATIONAL |
| | | 33 | PINE | PITHECAN | FEMALE-MALE | RELATIONAL |
| | | 34 | PINE | BRAIN | FEMALE-MALE | RELATIONAL |
| | | 35 | PINE | BRAIN | FEMALE-MALE | RELATIONAL |
| | | 36 | PITHECAN | BRAIN | MALE-MALE | RELATIONAL |
| | | 37 | PITHECAN | BRAIN | MALE-MALE | RELATIONAL |
| | | 38 | PITHECAN | PINE | MALE-FEMALE | RELATIONAL |
| | | 39 | PITHECAN | PINE | MALE-FEMALE | RELATIONAL |
| | | 40 | PITHECAN | BRAIN | MALE-MALE | IDENTICAL |
| | | 41 | PITHECAN | PINE | MALE-FEMALE | IDENTICAL |
| | | 42 | BRAIN | PITHECAN | MALE-MALE | IDENTICAL |
| | | 43 | BRAIN | PINE | MALE-FEMALE | IDENTICAL |
| | | 44 | PINE | PITHECAN | FEMALE-MALE | IDENTICAL |
| | | 45 | PINE | BRAIN | FEMALE-MALE | IDENTICAL |
| | | 46 | PITHECAN | BRAIN | MALE-MALE | IDENTICAL |
| | | 47 | PITHECAN | PINE | MALE-FEMALE | IDENTICAL |
| | | 48 | BRAIN | PITHECAN | MALE-MALE | IDENTICAL |
| | | 49 | BRAIN | PINE | MALE-FEMALE | IDENTICAL |
| | | 50 | PINE | PITHECAN | FEMALE-MALE | IDENTICAL |
| | | 51 | PINE | BRAIN | FEMALE-MALE | IDENTICAL |
| | | 52 | PITHECAN | BRAIN | MALE-MALE | IDENTICAL |
| | | 53 | PITHECAN | PINE | MALE-FEMALE | IDENTICAL |
| | | 54 | BRAIN | PITHECAN | MALE-MALE | IDENTICAL |
| | | 55 | BRAIN | PINE | MALE-FEMALE | IDENTICAL |
| | | 56 | PINE | PITHECAN | FEMALE-MALE | IDENTICAL |
| | | 57 | PINE | BRAIN | FEMALE-MALE | IDENTICAL |
| | | 58 | PITHECAN | BRAIN | MALE-MALE | IDENTICAL |
| | | 59 | PITHECAN | PINE | MALE-FEMALE | IDENTICAL |
| | | 60 | BRAIN | PITHECAN | MALE-MALE | IDENTICAL |
| | | 61 | BRAIN | PINE | MALE-FEMALE | IDENTICAL |
| | | 62 | PINE | PITHECAN | FEMALE-MALE | IDENTICAL |
| | | 63 | PINE | BRAIN | FEMALE-MALE | IDENTICAL |

FIG. 61

TABLE 1(G) FOR DETERN. OF PREDICTIVE DEMO. PATTERN

| JUDGEMENT OF "BIG HIT" | KIND OF "REACH" DEMO. | RANDOM NUMBER "a" FOR PREDICTIVE DEMO. PATTERN DETERN. | LEFT CHARACTER | RIGHT CHARACTER | LEFT AND RIGHT CHARACTERS (SEX) | RELATION BETWEEN DELUSIVE ITEMS OF LEFT AND RIGHT CHARACTERS |
|---|---|---|---|---|---|---|
| "LOSS" | NO REACH | 0 | PITHECAN | BRAIN | MALE-MALE | IDENTICAL |
| | | 1 | PITHECAN | PINE | MALE-FEMALE | IDENTICAL |
| | | 2 | PITHECAN | KIRI | MALE-FEMALE | IDENTICAL |
| | | 3 | BRAIN | PITHECAN | MALE-MALE | NO RELATION |
| | | 4 | BRAIN | PINE | MALE-FEMALE | NO RELATION |
| | | 5 | BRAIN | KIRI | MALE-FEMALE | NO RELATION |
| | | 6 | PINE | PITHECAN | FEMALE-MALE | NO RELATION |
| | | 7 | PINE | BRAIN | FEMALE-MALE | NO RELATION |
| | | 8 | PINE | KIRI | FEMALE-FEMALE | NO RELATION |
| | | 9 | KIRI | PITHECAN | FEMALE-MALE | NO RELATION |
| | | 10 | KIRI | BRAIN | FEMALE-MALE | NO RELATION |
| | | 11 | KIRI | PINE | FEMALE-FEMALE | NO RELATION |
| | | 12 | PITHECAN | BRAIN | MALE-MALE | NO RELATION |
| | | 13 | PITHECAN | PINE | MALE-FEMALE | NO RELATION |
| | | 14 | PITHECAN | KIRI | MALE-FEMALE | NO RELATION |
| | | 15 | PITHECAN | BRAIN | MALE-MALE | NO RELATION |
| | | 16 | PITHECAN | PINE | MALE-FEMALE | NO RELATION |
| | | 17 | PITHECAN | KIRI | MALE-FEMALE | NO RELATION |
| | | 18 | BRAIN | PITHECAN | MALE-MALE | NO RELATION |
| | | 19 | BRAIN | PINE | MALE-FEMALE | NO RELATION |
| | | 20 | BRAIN | KIRI | MALE-FEMALE | NO RELATION |
| | | 21 | PINE | PITHECAN | FEMALE-MALE | NO RELATION |
| | | 22 | PINE | BRAIN | FEMALE-MALE | NO RELATION |
| | | 23 | PINE | KIRI | FEMALE-FEMALE | NO RELATION |
| | | 24 | KIRI | PITHECAN | FEMALE-MALE | NO RELATION |
| | | 25 | KIRI | BRAIN | FEMALE-MALE | NO RELATION |
| | | 26 | KIRI | PINE | FEMALE-FEMALE | NO RELATION |
| | | 27 | PITHECAN | BRAIN | MALE-MALE | NO RELATION |
| | | 28 | PITHECAN | PINE | MALE-FEMALE | NO RELATION |
| | | 29 | PITHECAN | KIRI | MALE-FEMALE | NO RELATION |
| | | 30 | BRAIN | PITHECAN | MALE-MALE | NO RELATION |
| | | 31 | BRAIN | PINE | MALE-FEMALE | NO RELATION |
| | | 32 | BRAIN | KIRI | MALE-FEMALE | NO RELATION |
| | | 33 | PINE | PITHECAN | FEMALE-MALE | NO RELATION |
| | | 34 | PINE | BRAIN | FEMALE-MALE | NO RELATION |
| | | 35 | PINE | KIRI | FEMALE-FEMALE | NO RELATION |
| | | 36 | KIRI | PITHECAN | FEMALE-MALE | NO RELATION |
| | | 37 | KIRI | BRAIN | FEMALE-MALE | NO RELATION |
| | | 38 | KIRI | PINE | FEMALE-FEMALE | NO RELATION |
| | | 39 | PITHECAN | BRAIN | MALE-MALE | NO RELATION |
| | | 40 | PITHECAN | PINE | MALE-FEMALE | NO RELATION |
| | | 41 | PITHECAN | KIRI | MALE-FEMALE | NO RELATION |
| | | 42 | BRAIN | PITHECAN | MALE-MALE | NO RELATION |
| | | 43 | BRAIN | PINE | MALE-FEMALE | NO RELATION |
| | | 44 | BRAIN | KIRI | MALE-FEMALE | NO RELATION |
| | | 45 | PINE | PITHECAN | FEMALE-MALE | NO RELATION |
| | | 46 | PINE | BRAIN | FEMALE-MALE | NO RELATION |
| | | 47 | PINE | KIRI | FEMALE-FEMALE | NO RELATION |
| | | 48 | KIRI | PITHECAN | FEMALE-MALE | NO RELATION |
| | | 49 | KIRI | BRAIN | FEMALE-MALE | NO RELATION |
| | | 50 | KIRI | PINE | FEMALE-FEMALE | NO RELATION |
| | | 51 | PITHECAN | BRAIN | MALE-MALE | NO RELATION |
| | | 52 | PITHECAN | PINE | MALE-FEMALE | NO RELATION |
| | | 53 | PITHECAN | KIRI | MALE-FEMALE | NO RELATION |
| | | 54 | BRAIN | PITHECAN | MALE-MALE | NO RELATION |
| | | 55 | BRAIN | PINE | MALE-FEMALE | NO RELATION |
| | | 56 | BRAIN | KIRI | MALE-FEMALE | NO RELATION |
| | | 57 | PINE | PITHECAN | FEMALE-MALE | NO RELATION |
| | | 58 | PINE | BRAIN | FEMALE-MALE | NO RELATION |
| | | 59 | PINE | KIRI | FEMALE-FEMALE | NO RELATION |
| | | 60 | KIRI | PITHECAN | FEMALE-MALE | NO RELATION |
| | | 61 | KIRI | BRAIN | FEMALE-MALE | NO RELATION |
| | | 62 | KIRI | PINE | FEMALE-FEMALE | NO RELATION |
| | | 63 | PITHECAN | BRAIN | MALE-MALE | IDENTICAL |

FIG. 62

TABLE 2(A) FOR DETERN. OF PREDICTIVE DEMO. PATTERN

| LEFT AND RIGHT CHARACTERS (SEX) | RELATION BETWEEN DELUSIVE ITEMS OF LEFT AND RIGHT CHARACTERS | RANDOM NUMBER "b" FOR PREDICTIVE DEMO. PATTERN DETERN. | DELUSIVE ITEM OF LEFT CHARACTER | DELUSIVE ITEM OF RIGHT CHARACTER | LIKELIHOOD OF "BIG HIT" |
|---|---|---|---|---|---|
| FEMALE CHARACTER AND MALE CHARACTER (FEMALE-MALE) OR MALE CHRACTER AND FEMALE CHARACTER (MALE-FEMALE) | RELATIONAL | 0 | PUDDING | | VERY HIGH |
| | | 1 | PUDDING | | |
| | | 2 | PUDDING | | |
| | | 3 | PUDDING | | |
| | | 4 | PEACH | | |
| | | 5 | PEACH | | |
| | | 6 | PEACH | | |
| | | 7 | PEACH | | |
| | | 8 | RABBIT | BUNNY | |
| | | 9 | RABBIT | BUNNY | |
| | | 10 | RABBIT | BUNNY | |
| | | 11 | RABBIT | BUNNY | |
| | | 12 | BREAD AND TEA | | |
| | | 13 | BREAD AND TEA | | |
| | | 14 | BREAD AND TEA | | |
| | | 15 | ROSE | LILY | |
| | IDENTICAL | 0 | PUDDING | PUDDING | HIGH |
| | | 1 | PUDDING | PUDDING | |
| | | 2 | PUDDING | PUDDING | |
| | | 3 | PUDDING | PUDDING | |
| | | 4 | PEACH | PEACH | |
| | | 5 | PEACH | PEACH | |
| | | 6 | PEACH | PEACH | |
| | | 7 | PEACH | PEACH | |
| | | 8 | RABBIT | RABBIT | |
| | | 9 | RABBIT | RABBIT | |
| | | 10 | RABBIT | RABBIT | |
| | | 11 | RABBIT | RABBIT | |
| | | 12 | BREAD AND TEA | BREAD AND TEA | |
| | | 13 | BREAD AND TEA | BREAD AND TEA | |
| | | 14 | BREAD AND TEA | BREAD AND TEA | |
| | | 15 | ROSE | ROSE | |
| | NO RELATION | 0 | PUDDING | HIGH-HEEL | LOW |
| | | 1 | PUDDING | | |
| | | 2 | PUDDING | BUNNY | |
| | | 3 | PUDDING | | |
| | | 4 | PEACH | LIP | |
| | | 5 | PEACH | | |
| | | 6 | PEACH | "SUKEBEI" CHAIR | |
| | | 7 | PEACH | | |
| | | 8 | RABBIT | LIP | |
| | | 9 | RABBIT | | |
| | | 10 | RABBIT | | |
| | | 11 | RABBIT | | |
| | | 12 | BREAD AND TEA | BUNNY | |
| | | 13 | BREAD AND TEA | | |
| | | 14 | BREAD AND TEA | KOKESHI DOLL | |
| | | 15 | ROSE | | |

FIG. 63

TABLE 2(B) FOR DETERM. OF PREDICTIVE DEMO. PATTERN

| LEFT AND RIGHT CHARACTERS (SEX) | RELATION BETWEEN DELUSIVE ITEMS OF LEFT AND RIGHT CHARACTERS | RANDOM NUMBER "b" FOR PREDICTIVE DEMO. PATTERN DETERN. | DELUSIVE ITEM OF LEFT CHARACTER | DELUSIVE ITEM OF RIGHT CHARACTER | LIKELIHOOD OF "BIG HIT" |
|---|---|---|---|---|---|
| FEMALE CHARACTERS (FEMALE-FEMALE) OR MALE CHARACTERS (MALE-MALE) | RELATIONAL | 0 | DUCK | | VERY HIGH |
| | | 1 | DUCK | | |
| | | 2 | DUCK | | |
| | | 3 | DUCK | | |
| | | 4 | MUSHROOM | KOKESHI DOLL | |
| | | 5 | MUSHROOM | KOKESHI DOLL | |
| | | 6 | MUSHROOM | KOKESHI DOLL | |
| | | 7 | MUSHROOM | KOKESHI DOLL | |
| | | 8 | KOKESHI DOLL | MUSHROOM | |
| | | 9 | KOKESHI DOLL | MUSHROOM | |
| | | 10 | KOKESHI DOLL | MUSHROOM | |
| | | 11 | KOKESHI DOLL | MUSHROOM | |
| | | 12 | RABBIT | BUNNY | |
| | | 13 | RABBIT | BUNNY | |
| | | 14 | RABBIT | BUNNY | |
| | | 15 | RABBIT | BUNNY | |
| | IDENTICAL | 0 | DUCK | DUCK | HIGH |
| | | 1 | DUCK | DUCK | |
| | | 2 | DUCK | DUCK | |
| | | 3 | DUCK | DUCK | |
| | | 4 | MUSHROOM | MUSHROOM | |
| | | 5 | MUSHROOM | MUSHROOM | |
| | | 6 | MUSHROOM | MUSHROOM | |
| | | 7 | MUSHROOM | MUSHROOM | |
| | | 8 | KOKESHI DOLL | KOKESHI DOLL | |
| | | 9 | KOKESHI DOLL | KOKESHI DOLL | |
| | | 10 | KOKESHI DOLL | KOKESHI DOLL | |
| | | 11 | KOKESHI DOLL | KOKESHI DOLL | |
| | | 12 | RABBIT | RABBIT | |
| | | 13 | RABBIT | RABBIT | |
| | | 14 | RABBIT | RABBIT | |
| | | 15 | RABBIT | RABBIT | |
| | NO RELATION | 0 | DUCK | | LOW |
| | | 1 | DUCK | | |
| | | 2 | DUCK | LIP | |
| | | 3 | DUCK | KOKESHI DOLL | |
| | | 4 | MUSHROOM | | |
| | | 5 | MUSHROOM | | |
| | | 6 | MUSHROOM | | |
| | | 7 | MUSHROOM | LIP | |
| | | 8 | KOKESHI DOLL | | |
| | | 9 | KOKESHI DOLL | | |
| | | 10 | KOKESHI DOLL | | |
| | | 11 | KOKESHI DOLL | BUNNY | |
| | | 12 | RABBIT | KOKESHI DOLL | |
| | | 13 | RABBIT | | |
| | | 14 | RABBIT | DUCK | |
| | | 15 | RABBIT | | |

GAMING MACHINE

BACKGROUND OF THE INVENTION

1. Field of the Invention

The present invention relates to a gaming machine such as a pachinko game machine that is provided with a variable display for displaying a varying plurality of symbols necessary for a game, and a controller, such as a microcomputer, for controlling the variable display.

2. Description of the Related Art

A ball-shooting gaming machine, such as a pachinko game machine, is provided with a symbol display that is arranged to commence display of a varying plurality of symbols when a predetermined condition is satisfied, and rewards a player when the variation of the symbols is stopped while the symbol display presents a display of a predetermined combination of symbols. In recent years, an electrical display, such as a liquid crystal display, is commonly used as the symbol display since various effects can be demonstrated therein.

Such electrical displays permit various indications or demonstrations that enhance the player's interest in the game. For example, such indications may include: a real-time indication of the number of times during a game that an advantageous open state has been attained in response to a specified combination of symbols (e.g., "big hit"); a real-time indication of the number of playing balls that entered a variable winning device; a change in a background color to indicate in an exciting way that a specified pattern of symbols corresponds to a "big hit;" the appearance of new characters that are different from the symbols that will be variably displayed; an indication of a pattern with unusual motion to indicate that the "big hit" can be obtained if one more special symbol is arranged in the display (i.e., "reach" state), thereby indicating to the player that a "big hit" may soon appear; etc.

A particularly useful demonstration for elevating the player's interest is a pattern or symbol variation display that is termed a "reach action" in the "reach state" mentioned above. When the reach action begins, the player's attention is drawn to the display with an expectation of the appearance of a "big hit." The reach action includes, for example, a change in the speed of the displayed pattern or symbol variation, a change of the duration of the symbol variation, or the like. Sometimes, the "big hit" will appear 100% of the time after a special reach action. Thus, such a reach action is predictive of the appearance of a "big hit."

The reach action on a display of a conventional gaming machine, however, may disadvantageously be but a simple indication, such as a change of speed or duration of a particular pattern or symbol variation. Since the "big hit" might not always appear, the conventional simple indication may betray the player's expectation and thereby have the contrary effect of reducing the player's interest in the game.

In addition, as mentioned above, it is known that the reach action is carried out by indicating a symbol (or a character) other than the symbols that are variably displayed. The conventional reach action is but a simple symbol indication, and does not provide any information as to the possibility of the appearance of a "big hit" (hereinafter termed likelihood of "big hit"). The player therefore easily tires of the conventional simple reach action, and the game becomes monotonous.

Reliable information relative to the appearance of a "big hit" will not give the player excessive expectation of a "big hit", and the player will not feel betrayed when a "loss" is definitely determined. If the information indicative of the probability of a "big hit" is not only simple information, but also an interesting and effective demonstration with variety, it would enhance the player's interest in the entire game.

A predictive display can be accomplished as to information indicative of not only the above-mentioned likelihood of "big hit" but also a possibility of the appearance of a "reach" action (hereinafter termed probability of development into "reach") if a demonstration with various symbols shall be performed in a period of from start of the symbol variation to establishment of a "reach" condition. Such predictive display should enhance the player's expectation to the appearance of "big hit" and the player's interest in the entire game.

Such a predictive display can enhance the player's interest and can provide more exact information of the game to the player if a combination of symbols or variation of display modes of the predictive display shall express a detailed information of the game such as the above-mentioned likelihood of "big hit", the probability of development into "reach", etc.

The predictive display has been directed to have a great variety due to an expectation of a larger effect. However, the player, who expects that the variation display will stop at a specified combination of the symbols, concentrates his or her attention on a change of display state of symbol variation. The player, except an expert player, cannot pay attention to the detail of the demonstration display that is expressed by different symbols from the variable symbols.

If information relating to a coming result of the game is indicated by a delicate change in the demonstration display, the player may not recognize the information. Thus, the object of the demonstration display cannot sometimes be accomplished. When the demonstration display is too emphasized, the player tends to pay little attention on the display of the variable symbols.

Therefore, a display mode of the demonstration that can convey easily and exactly the meaning of the display to the player will be expected when the demonstration display is diversified to increase the effect.

SUMMARY OF THE INVENTION

An object of the present invention is to provide a gaming machine having a display arrangement for displaying a plurality of predictive symbols that are arranged to have respective relationship, which can provide to a player an indication of the possibility of a transfer from a conventional game condition to a special game condition depending on the meaning of the relationship of the symbols that are displayed.

Another object of the present invention is to provide a gaming machine having a display arrangement in which an effect of the demonstration is increased by an expression having a sense of unity or perceptible relationship between the demonstration display and the variable display on the display arrangement.

In accordance with a first embodiment of the present invention, there is provided a gaming machine having a display arrangement for displaying symbols that are related to a game, and a controller that determines in response to a predetermined input signal whether or not the game condition will be transferred to a specified game condition that is advantageous to the player and controls the display arrangement to display a display mode corresponding to the result of the determination. The display mode includes a special symbol for informing a player that the game condition is transferred to the specified game condition by showing a predetermined stop state when a symbol variation is stopped, and a predictive symbol for predicting the stop state of the special symbol. The predictive symbol is provided as a plurality of symbols having respective relationships.

Therefore, it is possible to provide a predictive display such that the player can anticipate the stop mode of the special symbol, when the player recognizes the relationship.

In the gaming machine, when the meaning of the relationship of the plurality of symbols included in the predictive symbol is arranged different depending on the likelihood whether or not the game condition will be transferred to the specified game condition, the player who is aware of the relationship can anticipate the likelihood with a certainty.

In the gaming machine, when the relationship is expressed in words or movements corresponding to the plurality of different symbols, the player can easily recognize the relationship by the word or the movement.

In the gaming machine, when the plurality of symbols comprise character symbols and the relationship is expressed in mutual response of the character symbols, the realistic relationship can be expressed, thereby providing a predictive display that the player can easily recognize.

The character symbols can be arranged to respond mutually by a plurality of written letters or characters displayed together with the symbols, and the relationship can be expressed by the meaning of the words displayed by the written letters or characters. Then, the expression of the relationship can become various and interesting, and the player's interest to the game result can be increased. Moreover, since the relationship is expressed by the meaning of the words that are displayed, the player can enjoy the anticipation of the game result. Also, when the game result can be anticipated by the player, the interest of the entire game can be enhanced.

The character symbols can be arranged to respond mutually by a plurality of kinds of marks displayed together with the symbols and the relationship is expressed based on the mark or the meaning of the mark that is displayed. The player has to consider the meaning that the mark has, so that the player cannot simply anticipate the game result.

The character symbols can be arranged to respond mutually by a plurality of kinds of designs displayed together with the symbols and the relationship is expressed based on the design or the meaning of the design that is displayed. If the relationship has been established to have a high likelihood of transfer to the specified game condition, the player recognizes the design that is previously displayed, and expects to display a next design that has the relationship with the recognized design. Consequently the player is induced to pay attention to the display on the display arrangement. The player's interest can be increased by anticipation of the relationship of displayed designs.

The character symbols can be arranged to respond mutually by a plurality of kinds of sounds generated together with the symbols and the relationship is expressed based on the kind of sound that is generated. The player can recognize the relationship of the plurality of the predictive symbols that are displayed not only through eyes but also through ears. The player can easily recognize the predictive display because the sound is attractive for the player.

In the case of symbols constituting characters, the symbols can be arranged to express the relationship by body movements. The various body movements can perform various predictive displays. The body movement includes a change of facial expression or posture of the character symbols. Because the predictive display is performed in a realistic expression, the player can anticipate the game result and also pay attention to the change of the predictive display with pleasure.

In a preferred embodiment, the predictive symbol includes a predictive demonstration symbol and a "reach" demonstration symbol. The predictive demonstration symbol is for predicting the stop state of the special symbol before the special symbol is in a "reach" state. The "reach" demonstration symbol is for predicting the stop state of the special symbol during the "reach" state of the special symbol. The player can anticipate a "reach" state before it appears and can anticipate a subsequent stop state during the "reach" state.

In a preferred embodiment, the predictive symbol is displayed correlative to the special symbol and display mode is changed corresponding to the display state of the special symbol.

In a preferred embodiment, the predictive symbol is displayed correlative to the special symbol one to one. By enhancing a sense of unity between the display of the special symbol and the predictive display, the player can easily recognize the change of the special symbol or the predictive symbol.

In accordance with a second embodiment of the present invention, there is provided a gaming machine having a display arrangement for displaying symbols that are related to a game, and a controller that determines depending on a predetermined input signal whether or not the game condition will be transferred to a specified game condition that is advantageous to the player and controls the display arrangement to display a display mode corresponding to the result of the determination. The display mode includes a special symbol for informing that the game condition is converted into the specified game condition by showing a predetermined stop state when a symbol variation is stopped, and a partner symbol that is displayed in a position corresponding to a display position of the special symbol.

When the special symbol is displayed and the partner symbol is also displayed in the position corresponding to a display position of the special symbol on the display arrangement, the display mode of the special symbol and the partner symbol can create a sense of unity. If an information of the special symbol is provided by a display mode of the partner symbol, the player can easily and certainly understand the information. Even if the player concentrates attention in the special symbol, the player does never miss the information given by the partner symbol when the special symbol and the partner symbol constitute a display mode having a sense of unity. The demonstration effect in the game must be enhanced and the player's expectation to the game must be increased by the display mode.

In a preferred embodiment, the special symbol includes a plurality of symbols and the partner symbol is displayed in a position corresponding to the display position of at least one of the plurality of symbols included in the special symbol. The player has a sense of unity between the special symbol and the partner symbol, the special symbol and the partner symbol being in corresponding position. Consequently the player can easily recognize the relationship between the respective symbols and information regarding the game.

In a further preferred embodiment, the special symbol is selected from a plurality of symbols and the partner symbol is selected from a plurality of symbols. Each of the plurality of symbols included in the special symbol is displayed in each position corresponding one to one to the display position of each of the plurality of symbols included in the partner symbol. The player has a sense of unity between the special symbol and the partner symbol, display positions of these symbol when the correspond to each other. Also, the relationship among the respective symbols can be clarified as a whole display mode. Therefore, the player can easily understand the information regarding the game.

When each of the plurality of symbols as in the partner symbol is a character symbol that is variable in accompanied with the variation of the special symbol, the player pays attention to the stop state of the special symbol and also pays attention to the character symbol that is displayed corresponding to each special symbol. According to this embodiment, it is possible to perform different demonstration display for each special symbol when variation action of the special symbol is stopped, and to perform a demonstration display having a sense of unity for each special symbol.

When the variation of the character symbol is a change of facial expression or posture of the character, the facial expression or posture of the character symbol is changed corresponding to the display mode of the special symbol. Because the demonstration display is performed in a realistic expression, the player can anticipate the game result and can also pay attention to the partner symbol while enjoying the variation of the character.

In a preferred embodiment, the partner symbol is a predictive symbol that predicts the stop state of the special symbol. When the partner symbol is a predictive symbol, the display can be performed in a sense of unity because predictive symbol is correspondent with the special symbol. Therefore, even if the player pays attention to the display mode of the special symbol, the player never misses the predictive symbol and can easily recognize the predictive symbol. The player can also easily recognize the display mode of the predictive symbol that is changing accompanied with the variation of the special symbol. The player can easily anticipate the subsequent stop mode of the special symbol. Also, since the predictive symbol is changed in accompanied with the stop timing of the variation of the displayed special symbol, a sense of unity can be obtained between the stop display of the variably displayed special symbol and the predictive display. Accordingly, the player, who pays attention to the stop display of the variably displayed special symbol, can easily recognize the predictive display. When the likelihood is expressed by the changing mode of the predictive symbol, the player who is aware of the relationship between the stop timing of the variably displayed special symbol and the changing timing of the predictive symbol, will pay attention to what is displayed in response to each timing. Further, if the player is aware of the extent of the likelihood expressed by the changing mode of the predictive symbol that the player recognized, the player can expect the "big hit" with a corresponding certainty from the changing mode of the predictive symbol that is displayed. Accordingly, an effect is available to increase the player's expectation of the "big hit" in response to the changing timing of the predictive display.

Recently, pachinko game machines, so-called "variable probability machines" and "variation time shortening machines" have become popular and have increased their award ratios. The variable probability machine is provided with a variable display that performs a bonus game, a so-called "variable probability game," in which the likelihood of the "big hit" is increased during several times of games subsequent to a game that results in the "big hit" associated with a special pattern. The variation time shortening machine is provided with a variable display that is arranged to perform a bonus game, so-called a "time shortening game," in which the time of symbol variation is shortened during several times of games subsequent to a game that results in the "big hit" associated with a special pattern. In such gaming machines, it is a significant problem for the player whether he or she can play such a bonus game after the appearance of the "big hit." Usually, the transfer to a bonus game is principally established by determining whether or not the displayed stop symbols corresponds to a predetermined combination of symbols among combinations of symbols previously determined to be associated with the "big hit," i. e., the "big hit" symbols or the "big hit" pattern. For example, in the case where the displayed stop symbols correspond to a combination of "3-3-3," "5-5-5," or "7-7-7," which are among the combinations that are associated with the "big hit," the game is transferred into a bonus game. Therefore, the player, who expects that such a combination may appear on stopping of the symbol variation, tends to pay attention to the stop display during an ordinary game condition.

In an embodiment in which the changing mode of the predictive symbol is arranged to predict a stop mode of the moving display of the special symbol, the procedure of the game is arranged in the order of "start of moving display of special symbol"→"change of predictive symbol"→"stop of one of the moving displayed symbols among the special symbol". The player may have an expectation as to whether the change of the predictive symbol will lead to a "big hit," and subsequently will have the additional expectation as to whether the stopped symbols will correspond to the symbols for transferring to a variable probability game or the time shorting game. Thus, the fan of the game is further enhanced. In this embodiment, though the player moves his or her eyes in the following manner: "predictive symbol that is changed"→"symbol that is stopped", when the display position of the predictive symbol that is changed is correspondent with the display position of the symbol that is stopped, the movement of the player's eyes becomes smooth.

In particular, in a case where three variable special symbols are arranged to be displayed, and the variations or movements of the three variable special symbols are arranged to stop at different times, the second stop symbol is used to determine whether or not the "reach" state is established, and therefore the player is concerned about the second stop symbol. In this case, the likelihood indicated by the predictive symbol may sometimes include two types. First, there is the probability or likelihood of development into the "big hit" depending upon whether or not the symbol variations are stopped in the specific stop state. Second, the probability or likelihood of development into a "reach" state in which the "big hit" will be established if one more specific symbols are displayed upon stopping of the variation.

In the case where the changing mode of the predictive symbol is arranged to show the probability or likelihood of development into a "reach" state, if the procedure of the game is arranged in the order of "start of moving display of special symbol"→"stop of a first one of the symbol variations"→"stop of first one of the moving displayed symbols among the special symbol"→"change of predictive symbol"→"stop of second one of the moving displayed symbols among the special symbol", the player can understand a process for informing whether or not the "reach" is actually established after the player doubted whether the change of predictive symbol would be connected to "reach"

state, thereby increasing the player's interest in finding a relationship between the change of predictive symbol and the development into the "reach" state. In other words, the interest in what kind of predictive display needs to be executed for development of the game into the "reach" state. In addition, when the player is aware of the changing mode of the predictive symbol that tends to develop into the "reach state", the player then pays attention to the subsequent course of the game with an expectation that the possibility of development into a "reach state" will be high because the particular changing mode of the predictive symbol was executed. This expectation is established to a predetermined certainty, and hence the player's interest in the game is enhanced. In this embodiment, though the player moves his or her eyes in the following manner: "symbol that is stopped first"→"predictive symbol that is changed"→"symbol that is stopped second", when the display position of the predictive symbol that is changed is correspondent with the display position of the symbol that is stopped second, the movement of the player's eyes becomes smooth and also the player can easily understand the relation of the change of the predictive symbol and the stop result of the symbol, that is, development into the "reach" state.

In a case where three variable symbols are arranged to be displayed and two symbols among them have already stopped in a "reach" state, the third (last) stop symbol fills the role of determining whether or not "big hit" will be established. By changing the predictive symbol to indicate likelihood of development into the "big hit" during a "reach" state the player's interest is increased by finding a relationship between the predictive display and the development into the "reach state." When a known change of the predictive symbol is performed, the player will pay attention to the game with an expectation that is supported by a predetermined certainty in the appearance of the "big hit." In this case, the player moves his or her eyes in the following manner: "symbol that is stopped second"→"predictive symbol that is changed"→"symbol that is stopped last". When the display position of the predictive symbol that is changed is correspondent with the display position of the symbol that is stopped last, the movement of the player's eyes becomes smooth and also the player can easily understand the relation of the change of the predictive symbol and the stop result of the symbol movement, that is, the development into the "big hit".

The predictive display can be changed one or more times until the moving display of any one of the symbols among the special symbol is stopped and further one or more times until the moving display of any two of the symbols among the special symbol is stopped.

The predictive display can be changed one or more times until the moving display of any one of the symbols among the special symbol is stopped and further one or more times until the moving display of any three of the symbols among the special symbol is sequentially stopped.

The predictive display can be changed one or more times until the moving display of any two of the symbols among the special symbol is sequentially stopped and further one or more times until the moving display of any three of the symbols among the special symbol is sequentially stopped.

The predictive display can be changed one or more times until the moving display of any one of the symbols among the special symbol is stopped, further one or more times until the moving display of any two of the symbols among the special symbol is sequentially stopped, and further one or more times until the moving display of any three of the symbols among the special symbol is sequentially stopped. In this case, the procedure of the game is arranged in the order of "start of moving display of special symbol"→"change of predictive symbol"→"stop of a first one of the symbol variations"→"change of predictive symbol"→"stop of second one of the moving displayed symbols among the special symbol"→"change of predictive symbol"→"stop of last one of the moving displayed symbols among the special symbol". The player moves his or her eyes in the following manner: "predictive symbol that is changed"→"symbol that is stopped first"→"predictive symbol that is changed"→"symbol that is stopped second"→"predictive symbol that is changed"→"symbol that is stopped last". Because the display position of the predictive symbol that is changed is one to one correspondent with the display position of the symbol that is stopped, respectively, the movement of the player's eyes becomes smooth and consequently the player can easily understand the procedure of the game.

BRIEF DESCRIPTION OF THE DRAWING

The foregoing and other objects, features, and advantages of the invention will become more apparent from the following detailed description taken in conjunction with the accompanying drawings, in which:

FIG. 7 is a table showing ranges of random numbers to be extracted;

FIG. 8 is a table for the determination of a "big hit" correlated to random number ranges;

FIG. 9 is a table for the determination of the "big hit" symbol correlated to random numbers;

FIG. 10 is a table for the determination of the various stop symbols correlated to random numbers;

FIG. 11 is a table for the determination of "reach" demonstration for the "big hit" correlated to random numbers;

FIG. 12 is a table for the determination of "reach" demonstration for "loss" correlated to random numbers;

FIG. 13 is a table for the determination of a predictive demonstration pattern for "big hit" that is referred in "normal reach" or "jam-packed train reach";

FIG. 14 is a table for the determination of a predictive demonstration pattern for "big hit" that is referred in "chinning man reach";

FIG. 15 is a table for the determination of a predictive demonstration pattern for "loss" that is referred in "normal reach"

FIG. 16 is a table for the determination of a predictive demonstration pattern for "loss" that is referred in "chinning man reach";

FIG. 17 is a table for the determination of a predictive demonstration pattern for "loss" that is referred in "no reach";

FIG. 18 is a table showing a combination of "word predictive pattern" and "action predictive pattern" corresponding to each predictive demonstration;

FIG. 19 is a continuation of the table of FIG. 18;

FIG. 20 is a continuation of the table of FIG. 19;

FIG. 21 is a continuation of the table of FIG. 20;

FIG. 22 is a representation that illustrates an example of display mode of "action predictive pattern;"

FIG. 23 is a representation that illustrates another example of display mode of "action predictive pattern;"

FIG. 45 is a representation that illustrates examples of delusive items of left and right characters that are relational;

FIG. 46 is a representation that illustrates characters that appear in examples of the display of FIGS. 41 to 43;

FIG. 47 is a representation that illustrates combination of the left and right characters in same or different sex;

FIG. 51 is a tabular representation of an example showing the ranges of random number to be extracted in the determination procedure shown in FIGS. 48 to 50;

FIG. 52 is a "big hit" judgement table that is referred in the determination procedure shown in FIGS. 48 to 50;

FIG. 53 is a table for "reach" demonstration determination for "big hit" that is referred in the determination procedure shown in FIGS. 48 to 50;

FIG. 54 is a table for "reach" demonstration determination for "loss" that is referred in the determination procedure shown in FIGS. 48 to 50;

FIG. 55 is a table for determination of predictive demonstration pattern that is referred when "big hit" is determined and "UFO reach" is determined as the reach demonstration;

FIG. 56 is a table for determination of predictive demonstration pattern that is referred when "big hit" is determined and "present reach" is determined as the reach demonstration;

FIG. 57 is a table for determination of predictive demonstration pattern that is referred when "big hit" is determined and "sport reach" is determined as the reach demonstration;

FIG. 58 is a table for determination of predictive demonstration pattern that is referred when "loss" is determined and "UFO reach" is determined as the reach demonstration;

FIG. 59 is a table for determination of predictive demonstration pattern that is referred when "loss" is determined and "present reach" is determined as the reach demonstration;

FIG. 60 is a table for determination of predictive demonstration pattern that is referred when "loss" is determined and "sport reach" is determined as the reach demonstration;

FIG. 61 is a table for determination of predictive demonstration pattern that is referred when "loss" is determined and "no reach" is determined;

FIG. 62 is a table for determination of predictive demonstration pattern that is referred when "female-male" or "male-female" is determined as a combination of left and right characters;

FIG. 63 is a table for determination of predictive demonstration pattern that is referred when "male-male" or "female-female" is determined as a combination of left and right characters.

DETAILED DESCRIPTION

A pachinko game machine will be described herein as a specific illustrative embodiment of the invention.

Figure 1:
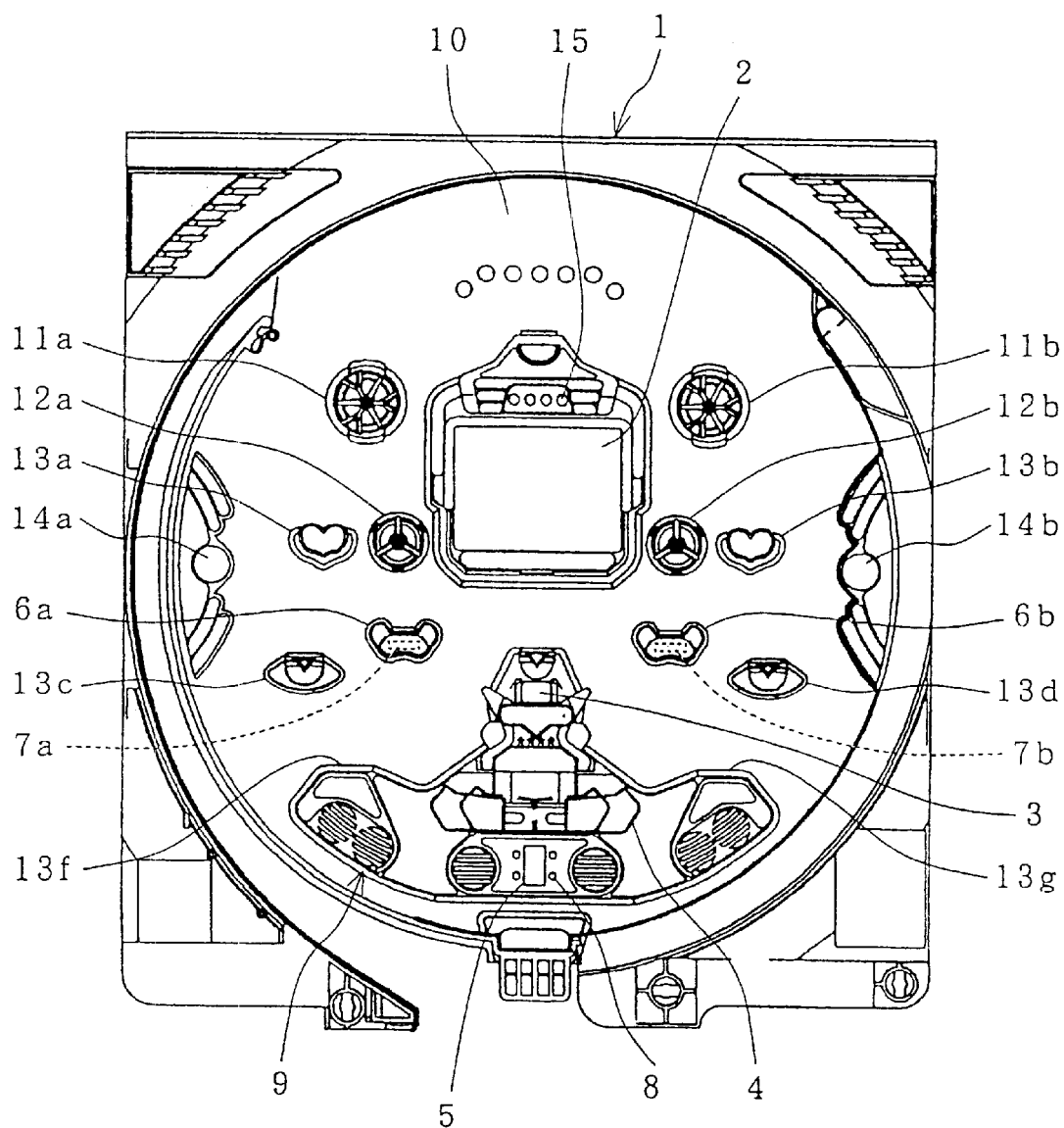
FIG. 1 is a representation of a front view of a specific illustrative embodiment of the present invention in the form of a pachinko game machine.

FIG. 1 is a front view representation of a pachinko game machine 1, showing a game board face 10. A liquid crystal display 2 functions as a display arrangement for displaying symbols that are related to the game and is substantially centrally disposed on game board face 10. The liquid crystal display is arranged to display a varying plurality of symbol images in a manner that simulates three rows of the rotatable reels of a slot machine (not shown). The variable symbol image is termed a "special symbol" hereinafter. When the special symbol is stopped showing a predetermined stop state such as "7-7-7", so-called "big hit", the game condition is transferred to the specified game condition that is advantageous to the player. The specified game condition will be described later.

The liquid crystal display 2 can also display a predictive demonstration symbol and a "reach" demonstration symbol during the moving display of the special symbol. The predictive demonstration symbol is to predict that the movement or variation of the special symbol will be stopped of a predetermined stop state or stop mode that shows transfer to the specified game condition. The "reach" demonstration symbol is displayed during a "reach state" that is a game state where the stop state that shows transfer to the specified game condition will appear when variation of a further special symbol will be stopped. These predictive demonstration symbol and "reach" demonstration symbol are predictive symbols that are expressed in various screen images.

Figure 2:
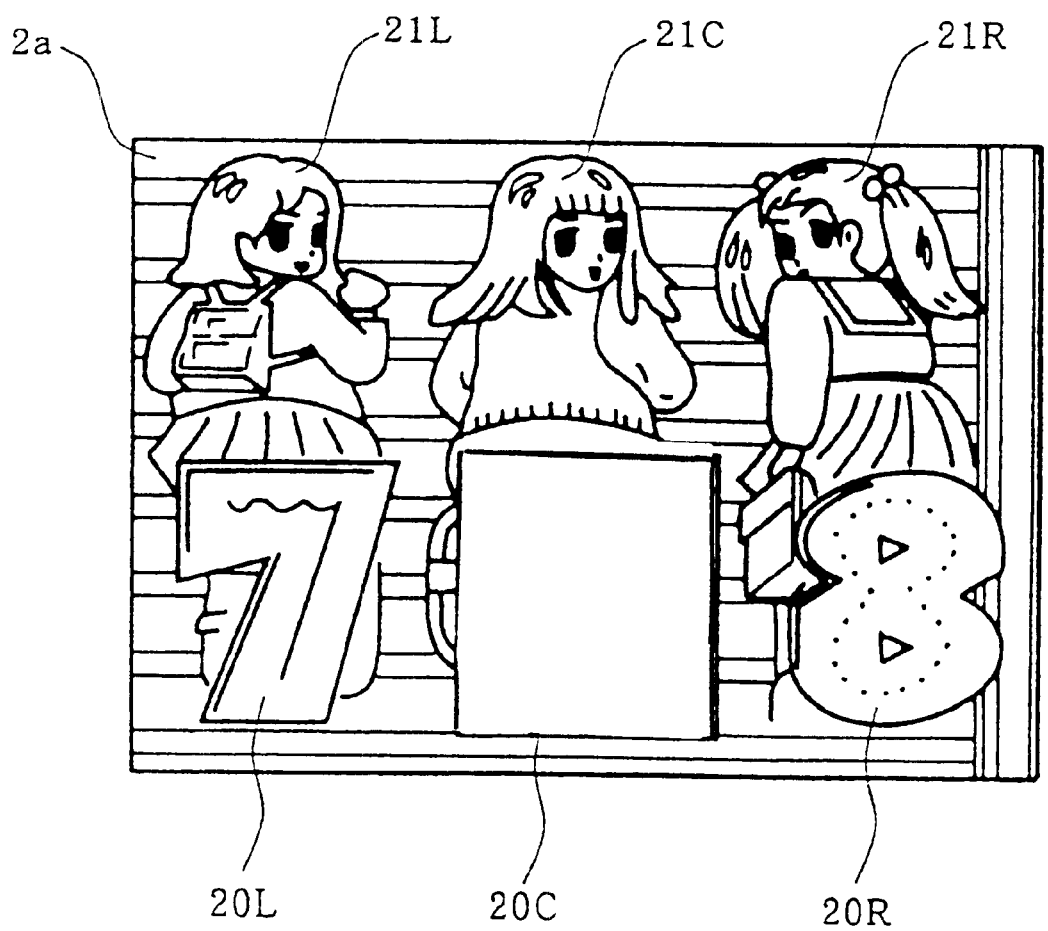
FIG. 2 is a representation of a front view of a display screen of a liquid crystal display.

In this embodiment, as shown in FIG. 2, special symbols 20L, 20C and 20R are variably displayed in a display screen 2a of the liquid crystal display 2. The predictive demonstration symbol and the "reach" demonstration symbol are also displayed in the display screen 2a. The special symbols 20L, 20C and 20R are displayed in a manner that simulates symbols on the three rows of the rotatable reels of a slot machine. The predictive demonstration symbol and the "reach" demonstration symbol can be displayed as a letter, a character, a pattern, an animation or the like. In this embodiment, three girl characters 21L, 21C and 21R that are predictive demonstration symbols are displayed in one to one correspondent with the special symbols 20L, 20C and 20R to be variably displayed.

The predictive demonstration symbol is used for predicting that a "reach" state will appear or that a stop state such as "7-7-7" will appear when the moving display of the special symbols 20L, 20C and 20R are stopped through a "reach" state. The predictive demonstration symbol can be variously changed in display mode. The predictive symbols, illustratively the three girl characters 21L, 21C and 21R can be variously changed in display mode. The change of display mode shows a mutual relationship. Likelihood of "big hit" or probability of development into "reach" is made different by the meaning of the relationship.

Specifically, the facial expressions and body movements of the characters 21L, 21C and 21R of the predictive demonstration symbol are changed in response to the moving display of the special symbols 20L, 20C and 20R. Alternately separate symbols corresponding to the characters 21L, 21C and 21R are displayed, or the characters chatter each other by words.

The meaning of such a change of the display mode of the predictive demonstration symbol is arranged to have a certain relationship among the characters 21L, 21C and 21R. Various meanings of the relationship can be expressed and are associated to different degrees of the likelihood of "big hit" or different probabilities of development into "reach", respectively. The player, who is aware of the meanings of relationship shown by changing the expression of the predictive demonstration symbol, can anticipate in some extent whether the game condition will be developed into a "reach" or whether the appearance of a "big hit" will be expectable.

When a "reach" state has been established, as a demonstration display for informing the "reach" state, a "reach" demonstration symbol that is different from the predictive demonstration symbol is displayed. The predictive demonstration symbol and the "reach" demonstration symbol will be described in detail later.

The display procedure can be realized by previously storing different various predictive symbols and "reach" demonstration symbols that are associated to respective degrees of likelihood of "big hit" or to respective probabilities of development into "reach" in a memory, e.g. a ROM shown in FIG. 3 that is described later.

Display device may be an electrical display device formed of a plurality of arranged LEDs, a CRT, a plasma display, an electro-luminescence display, or a liquid crystal display, as previously stated.

As shown in FIG. 1, a start-winning hole or starter hole 3 is disposed below liquid crystal display 2. The symbol variation displayed on liquid crystal display 2 is started when a playing ball (not shown) enters start-winning hole 3. Start-winning hole 3 constitutes a variable winning device that is convertible between a first condition that is disadvantageous to the player and a second condition that is advantageous to the player. The gaming machine is arranged to payout predetermined numbers of prize balls, illustratively 5 balls, when a playing ball enters start-winning hole 3. A playing ball (not shown) can enter start-winning hole 3 even when the variable winning device is in the first condition disadvantageous to the player, because start-winning hole 3 has sufficient capacity to permit a win even when a playing ball enters during the first condition.

Four symbol variation memory lamps 15 are disposed above liquid crystal display 2. The symbol variation memory lamps memorialize the number of winning times that a playing ball entered start-winning hole 3, which in this specific illustrative embodiment of the invention can be up to four times during symbol variation in display screen 2a. Symbol variation memory lamps 15 provide real time information of the number of times the symbol variation was successively displayed by liquid crystal display 2 to the player. More than 5 winning times are determined to be ineffective as a starting condition for the symbol variation display.

Below start-winning hole 3 is provided a big-winning hole 4 (called an "attacker") that can have a closed condition disadvantageous to the player and an open condition advantageous to the player. Big-winning hole 4 forms a door-type variable winning device, the door having an open condition that is advantageous to the player when the variation action of the symbols displayed in display screen 2a of liquid crystal display 2 is stopped with a specific symbol combination corresponding to the "big hit" being displayed. A predetermined number of prize balls, for example, 15 balls in this embodiment, are paid out when a playing ball enters big-winning hole 4. The specified game condition means a game condition where the big-winning hole 4 becomes the open condition and the period of the symbol variation on the liquid crystal display 2 is shortened for increasing the winning frequency to the start-winning hole 3.

A variable display device 5 is disposed in the lower portion of game board face 10. Variable display device 5 is arranged to start the variation display when a playing ball passes through one of variable display actuation gates 6a and 6b disposed at the left and right sides, respectively, of liquid crystal display 2. When variable display device 5 is stopped while displaying a predetermined specific symbol, start-winning hole 3 is converted into the second condition that is advantageous to the player.

Four variable display memory lamps 8 are disposed around variable display device 5. The variable display memory lamps are arranged to memorialize the number of times (up to four times) that the playing ball (not shown) passes through one of variable display actuation gates 6a or 6b. Variable display memory lamps 8 provide real time information of the number of times the variation of symbols has successively been displayed by the variable display to the player. Any more times than five are not counted and are ineffective.

The game board face 10 is further provided with windmills 11a and 11b, each having a lamp with a light emitting portion; normal windmills 12a and 12b; normal winning holes 13a, 13b, 13c, 13d, 13f, and 13g; and game board side lamps 14a and 14b. Each time a playing ball enters a normal winning hole, 15 prize balls are paid out.

Variable display device 5, start-winning hole 3, and big-winning hole 4 are integrated together with normal winning holes 13f and 13g to form, in this embodiment of the invention, a variable winning ball device 9 arranged on game board face 10.

The following is a description of a game control system for the above-described pachinko game machine. The present specific illustrative embodiment of the invention in the form of a pachinko game machine is provided with a microcomputer as a controller, whereby the entire game procedure is controlled. Such control is effected by a microcomputer 50, shown in the block diagram of FIG. 3.

Microcomputer 50 consists of a CPU 50A, a RAM 50B, a ROM 50C, and a general-purpose I/O 50D. The microcomputer can process various kinds of input signals from an input circuit 51 in accordance with a program stored in ROM 50C, and issue output signals via an output circuit 52 to any of various drive, as needed.

CPU 50A computes a variety of determination during the progress of the game, such as a determination of the symbol to be displayed when the variation display of display screen 2a is stopped (hereafter termed the "stop symbol"), as well as determinations of the display modes of the predictive symbols such as "reach" demonstration symbols and predictive demonstration symbol to be displayed. In this embodiment, CPU 50A is connected to a random number generating circuit 53 and extracts a random number generated by the random number generating circuit 53. CPU 50A executes each of the various determinations based on the value of the random number extracted. In addition to the external random number generating circuit, there may be used in certain embodiments the random number generator may be incorporated in CPU 50A in the form of a random number generator program.

In this embodiment, input circuit 51 is connected to passing ball detection switches 6a' and 6b' that generates a signal when a playing ball passes through variable display actuation gates 6a and 6b, and a starting winning switch 3' that generates a signal when a playing ball enters start-winning hole 3. Output circuit 52 is connected to variable display device 5, liquid crystal display 2, variable display memory lamps 8, symbol variation memory lamps 15, a start winning hole solenoid 30 that actuates the conversion of start-winning hole 3, and a big-winning hole solenoid 31 that actuates the conversion of big-winning hole 4, etc.

The procedure for determining the stop symbol and the display mode of the predictive demonstration symbol and the "reach" demonstration symbol that will be displayed on liquid crystal display 2 will be described below with reference to the flowcharts of FIGS. 4 to 6, and to a tables of FIGS. 7 to 23.

Figure 5:
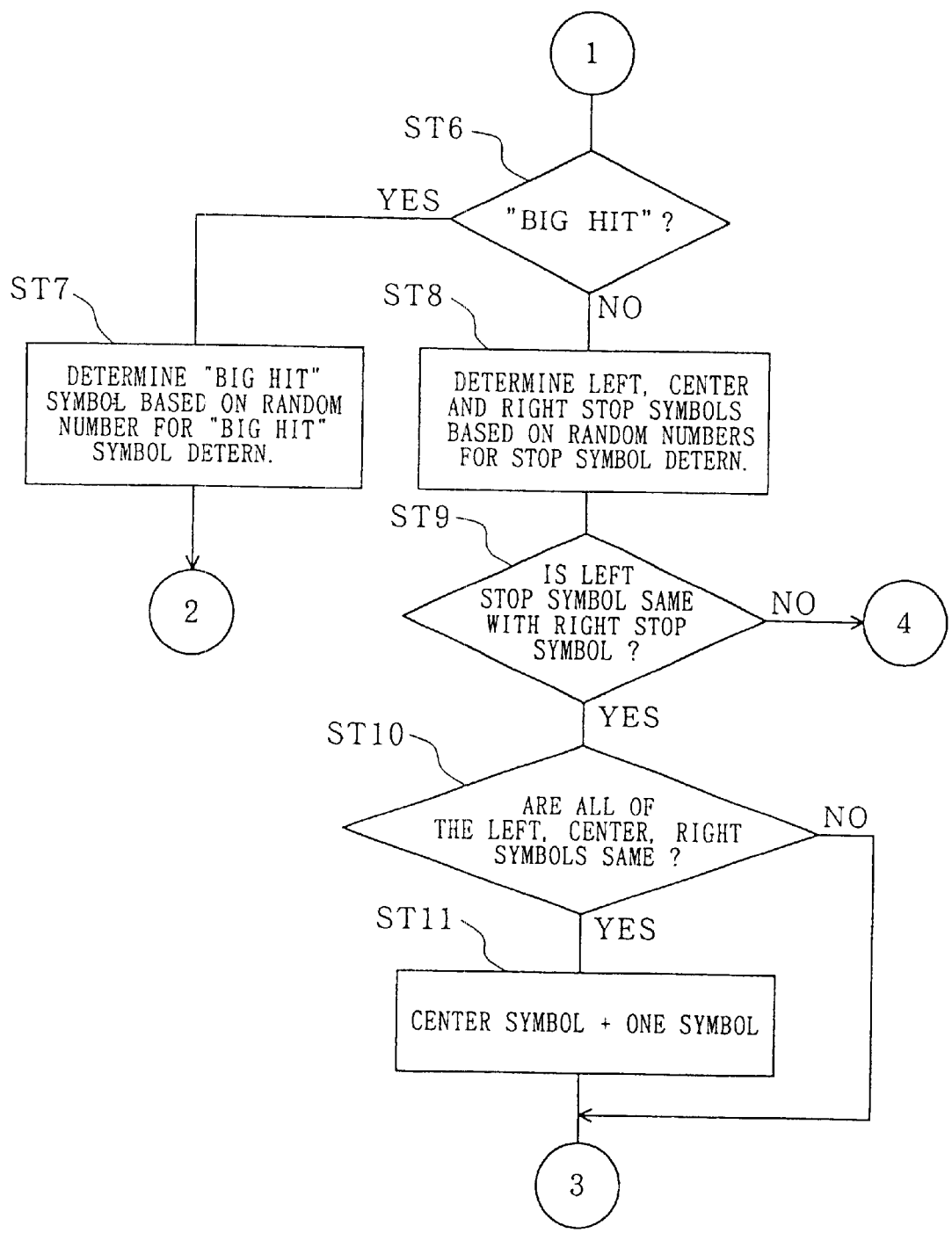
FIG. 5 is a continuation of the flowchart of FIG. 4.

When a playing ball enters start-winning hole 3, start winning switch 3' detects the ball and delivers a signal to CPU 50A (termed "STARTER ON" in flowchart of FIG. 5). The variation action of the special symbols 20L, 20C and 20R is then started on the display screen 2a of liquid crystal display 2, based on the prior determinations by microcomputer 50 of the stop symbol and the display modes of the "reach" demonstration symbol and of the predictive demonstration symbol to be displayed on the liquid crystal display 2.

FIG. 7 is a table showing the range of random numbers to be extracted. The random numbers generated by random number circuit 53 are supplied to CPU 50A.

Figure 4:
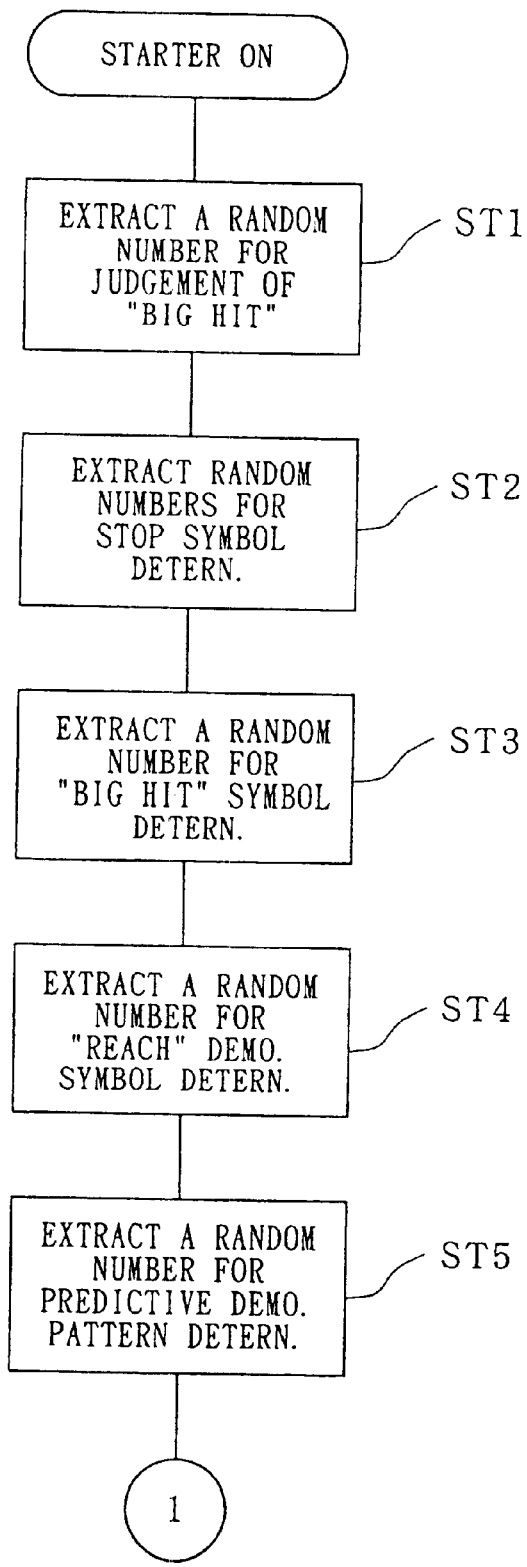
FIG. 4 is a flowchart showing a procedure for determining a display mode to be displayed by the liquid crystal display.

As shown in the flowchart of FIG. 4, when received the signal, CPU 50A extracts a random number for judgement of the "big hit" (ST1) that is used for determination of "big hit", e.g. selection of the stop symbol of the special symbols 20L, 20C and 20R to be of "big hit" or to be of "loss". The random number to be extracted is in the range from 0 to 255, as shown in FIG. 7.

CPU 50A additionally extracts random numbers that are used to determine the stop symbol in the range from 0 to 14, which are used for the determination of the three variable symbols to be stopped when "loss" is determined (ST2) (left variable symbol 2L, center variable symbol 2C, and right variable symbol 2R displayed on display screen 2a shown in FIG. 2). Then, CPU 50A extracts a random number for determination of the "big hit" symbol in the range from 0 to 14, which are used for the determination of the three variable symbols to be stopped when "big hit" is determined (ST3).

CPU 50A further extracts a random number for determination of the reach demonstration symbol in the range from 0 to 139 (ST4). CPU 50A further extracts a random number that are used in the determination of the predictive demonstration pattern in the range from 0 to 511 as shown in FIG. 7 (ST5).

Subsequently, a determination is made whether or not an executed symbol variation action should be stopped at the "big hit." This determination is based on the random number for the "big hit" that was extracted at step ST1, and is made at step (ST6) in FIG. 5.

Figure 3:
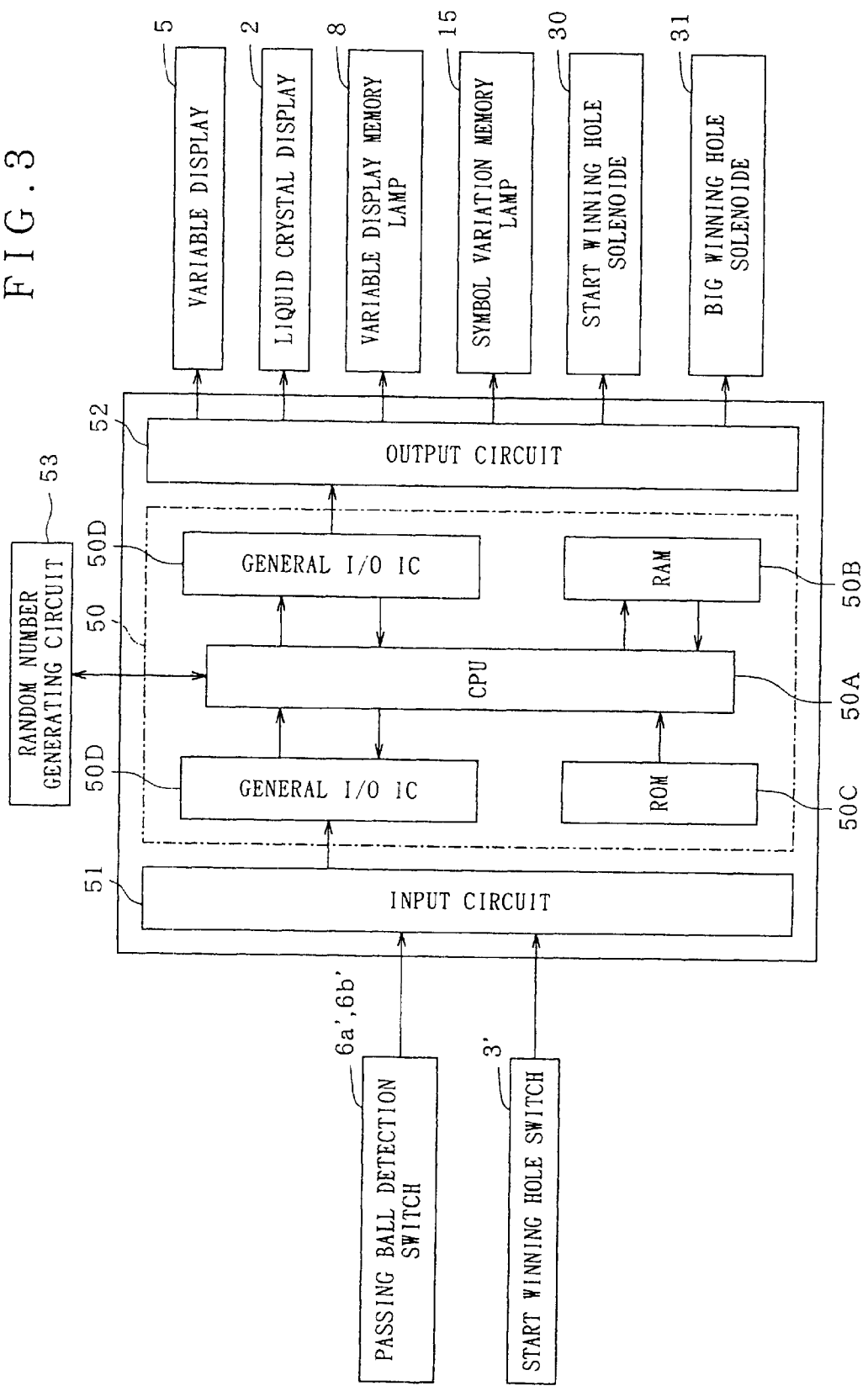
FIG. 3 is a block diagram of circuit portions of the pachinko game machine.

FIG. 8 is a table for the determination of a "big hit." ROM 50C of FIG. 3 stores a "big hit" determination table in which the random number ranges have been attributed to the "big hit." In this embodiment, the random number "7" has been predetermined to be the random number which, when extracted, will result in the "big hit."

When the determination results in the "big hit" at step ST6, then a procedure is executed at step ST7 to determine the particular "big hit" symbol that is to be displayed as the stop symbol corresponding to the "big hit" when the variation action on display screen 2a is stopped.

FIG. 9 is a table for the determination of the "big hit" symbol. In the procedure of step ST7, the "big hit" symbols to be displayed are determined from the "big hit" symbol determining table shown in FIG. 9, which are based on the random number that is extracted for determination of the "big hit" symbol extracted in the step ST3. In the table of the determination of the "big hit" symbol, 14 combinations of the special symbols are previously associated to the "big hit" and each of them is correlated to a value of the random number that is extracted for determination of the "big hit"

symbol. The table of the determination of the "big hit" symbol is stored in the ROM 50C.

For example, if the extracted random number for determination of "big hit" symbol is "6", the "big hit" stop symbols are determined to be "7-7-7." Thus, the "big hit" is determined, as are "big hit" symbols. Subsequently, the procedure of step ST12 of FIG. 6 is executed. The procedures of the step ST12 and the following steps will be described later.

In the step ST6, when the value extracted for the random number for determination of the "big hit" is a value other than "7" and consequently is determined to be a "loss" based on the table shown in FIG. 8, the stop symbols displayed on left symbol 2L, center symbol 2C, and right symbol 2R are respectively determined from the stop symbol determination table shown in FIG. 10. The determination is executed (ST8) based on the three random numbers for the determination of the stop symbol extracted in the step ST2, discussed above. In the stop symbol determination table, as shown in FIG. 10, each of 15 stop symbols is correlated to a value of the random number that is extracted for determination of the stop symbol. The table of the determination of the stop symbol is stored in the ROM 50C.

It is then checked whether the determined stop symbols of left symbol 2L and right symbol 2R are or are not same (ST9). When the two symbols are different, the procedure of step ST13 shown in FIG. 6 is executed, since any "reach demonstration" is no longer necessary. However, when the two symbols are same, it is then checked whether the determined stop symbol of center symbol 2C is or is not same as the other two symbols (ST10). If center symbol 2C is different from the other two symbols, the procedure of ST14 shown in FIG. 6 is executed. If all three stop symbols are same, the symbol that is determined for center symbol 2C is changed to a symbol that is arranged in the next position of the determined symbol (ST11) so as not to display three identical symbols as stop symbols that would be associated with "big hit" symbols, because a determination of "loss" has already been established in step ST6.

Thus, the stop symbols to be displayed on the display screen 2a are determined. Subsequently, the procedure of step ST14 of FIG. 6 is executed. The procedures of the step ST14 and the following steps will be described later.

Figure 6:
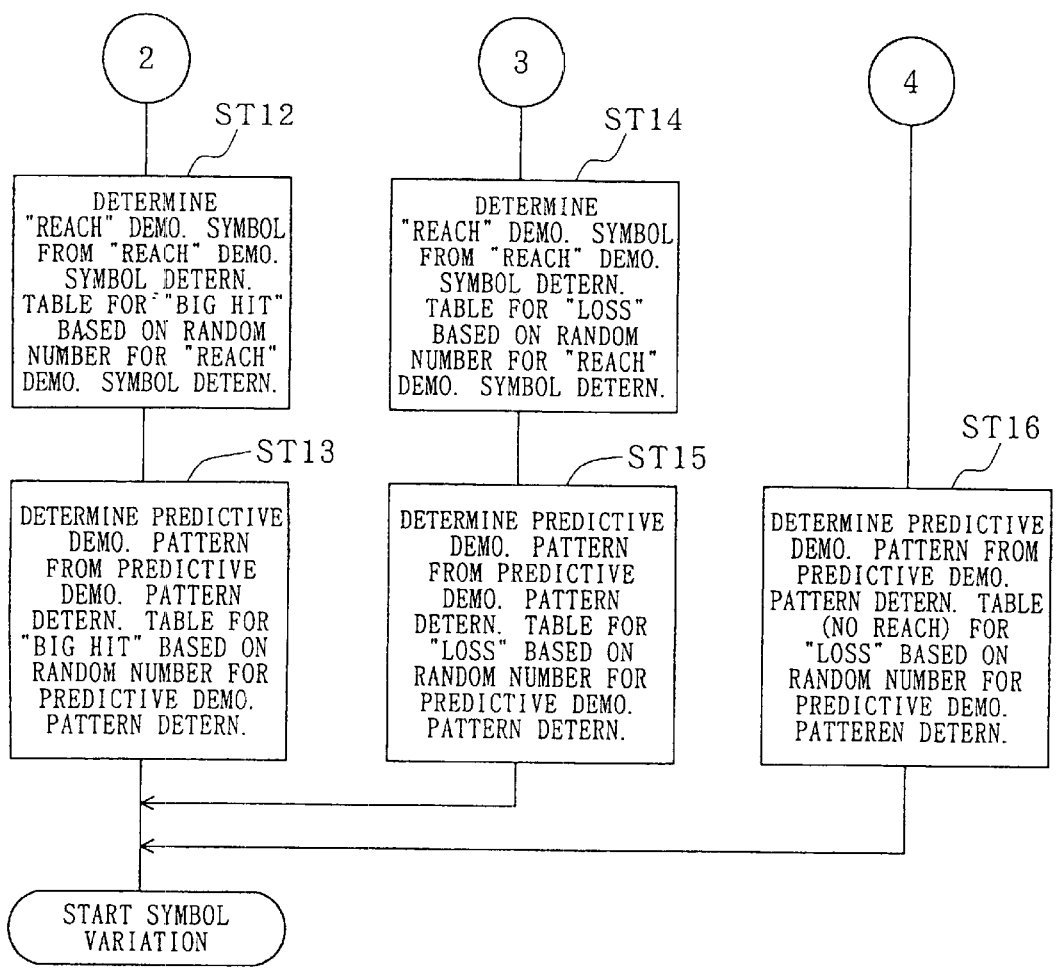
FIG. 6 is a continuation of the flowchart of FIGS. 5.

The description will be referred to FIG. 6. The procedure of the step ST12 is executed when the "big hit" is determined in the procedure of the step ST6. A "reach" demonstration symbol is determined from the table for determination of "reach" demonstration symbol for "big hit" shown in FIG. 11 based on the random number for determination of "reach" demonstration symbol for "big hit" that is extracted in the step ST4.

As shown in the table for determination of "reach" demonstration symbol for "big hit", the "reach" demonstration symbol for "big hit" includes three kinds of "reach" demonstration symbols of "normal reach", "chinning man reach" and "jam-packed train reach". Details of these "reach" demonstration symbols will be illustrated later.

The "reach" demonstration symbol to be displayed is determined in this embodiment by selecting "normal reach" when the value of the random number extracted for the "reach demonstration" is in the range of from 0 to 24; "chinning man reach" is selected when the value is in the range of from 25 to 64; and "jam-packed train reach" is selected when the value is in the range of from 65 to 139. In the table for determination of "reach" demonstration symbol for "big hit" shown in FIG. 11, the range of random number value associated to "jam-packed train reach" is established wider than the ranges of random number value associated to the other "reach" demonstration symbols and consequently the "big hit" will appear in a high probability when the "jam-packed train reach" is displayed in a "reach" state of the special symbol.

Next, in step ST 13, the predictive demonstration pattern to be displayed is determined based on the random number for determination of predictive demonstration pattern that was extracted in step ST5 mentioned above. The predictive demonstration pattern is made of a combination of a plurality of different modes of predictive demonstration symbols, which have relationship each other. The predictive demonstration pattern to be displayed is determined by referring to tables for determination of predictive demonstration pattern shown in FIGS. 13 to 17, in which each predictive demonstration pattern is associated to a range of random number value.

The ROM 50C stores the tables for determination of predictive demonstration pattern for "big hit" and for "loss", which are correlated to each kind of the "reach" demonstration symbols. For instance, when the "big hit" is determined and the "reach" demonstration symbol of "normal reach" or "jam-packed reach" is determined to be displayed, the table for determination of predictive demonstration pattern shown in FIG. 13 is selected for determination of the predictive demonstration pattern. When the "reach" demonstration symbol of "chinning man reach" is determined to be displayed, the table for determination of predictive demonstration pattern shown in FIG. 14 is selected for determination of the predictive demonstration pattern. The predictive demonstration pattern will be illustrated in detail later.

Therefore, in the procedure of step ST13, the table for determination of the predictive demonstration pattern corresponding to the "reach" demonstration symbol that is determined in the step ST12 is selected from among the tables for determination of predictive demonstration pattern for "big hit", and a predictive demonstration pattern to be displayed is determined from the selected table based on the random number that is extracted for determination of the predictive demonstration pattern.

In the procedure of step ST14, which is executed when "loss" is determined and appearance of "reach" state is determined, the table for determination of the "reach" demonstration symbol for "loss" shown in FIG. 12 is referred, and a "reach" demonstration symbol to be displayed is determined based on the random number that is extracted for determination of the "reach" demonstration symbol in step ST4.

As shown in the table for determination of the "reach" demonstration symbol for "loss" shown in FIG. 12, the "reach" demonstration symbol to be displayed is determined in this embodiment by selecting "normal reach" when the value of the random number extracted is in the range of from 0 to 4; "chinning man reach" is selected when the value is in the range of from 5 to 8. However, no "reach" demonstration symbol is displayed when the value is in the range of from 9 to 139. In the table for determination of "reach" demonstration symbol for "loss" shown in FIG. 12, the range of random number value associated to "no reach" is established wide so that the probability of appearance of "loss" shall be high.

Next, in the procedure of step ST15, the table for determination of predictive demonstration pattern for "loss" that corresponds to the "reach" demonstration symbol that is previously determined in step ST14 is selected, and the predictive demonstration pattern to be displayed is determined based on the random number for determination of predictive demonstration pattern that was extracted in step ST5 mentioned above. In this procedure, the table for determination of predictive demonstration pattern for "loss" shown in FIG. 15 is selected when the determined "reach" demonstration symbol corresponds to "chinning man reach"; the table for determination of predictive demonstration pattern for "loss" shown in FIG. 16 is selected when the determined "reach" demonstration symbol corresponds to "normal reach"; the table for determination of predictive demonstration pattern for "loss" shown in FIG. 17 is selected when the determined "reach" demonstration symbol corresponds to "no reach". A predictive demonstration pattern is determined based on the extracted random number for determination of predictive demonstration pattern by referring to each selected table.

The procedure of step ST16 is executed when the "reach" state is determined to never appear. Therefore, it is unnecessary to determine a "reach" demonstration symbol. In step ST16, the table for determination of predictive demonstration pattern for "loss" shown in FIG. 17 is selected, and a predictive demonstration pattern is determined based on the random number for determination of predictive demonstration pattern extracted in the step 5.

After these determinations have been made, the pachinko game machine 1 will start the variation action of the symbols on the liquid crystal display 2, which will display the stop symbol, the "reach" demonstration symbol, and the predictive demonstration symbol in accordance with the determinations.

Examples of the predictive demonstration pattern will be illustrated below.

The predictive demonstration pattern includes "word predictive pattern" and "action predictive pattern".

The word predictive pattern is made of a display such that the three girl characters 21L, 21C and 21R, that are predictive demonstration symbols shown in FIG. 2, chatter each other by using words. Figures, Roman letters or Japanese writing characters express the chattering by using words. A sound or a voice may express the chattering by using words.

The action predictive pattern is made of a display such that the three girl characters move their bodies, respectively. The movement of the body includes, for example, changes of facial expression and posture of the characters. In this embodiment, the action predictive pattern is usually displayed in combination with the word predictive pattern.

The predictive display pattern as mentioned above consists of 203 kinds of predetermined combinations of a word predictive pattern and an action predictive pattern as shown in tables of combinations of predictive demonstration patterns in FIGS. 18 to 21, which are stored in ROM 50C. The predictive demonstration patterns of predictive demonstration Nos. 1 to 203 shown in FIGS. 18 to 21 are respectively corresponding to predictive demonstration patterns of predictive demonstration Nos. 1 to 203 in the tables for determination of predictive demonstration pattern shown in FIGS. 13 to 17.

In the tables of combinations of predictive demonstration patterns shown in FIGS. 18 to 21, character's name of "KUMI" corresponds to left character 21L among the three girl characters; character's name of "YUMI" corresponds to central character 21C; and character's name of "AMI", corresponds to right character 21R.

The word predictive pattern is a pattern for predictive demonstration by a display such that each character looks like chattering each other by a word shown in FIGS. 18 to 21.

The action predictive patterns of A, B, C1, C2, D, E1, E2, F, G, H1, H2, I1, I2, J and K shown in FIGS. 18 to 21 respectively correspond to display patterns shown in FIGS. 22 and 23.

FIGS. 22 and 23 show illustrative action predictive patterns. The three girl characters 21L, 21C, and 21R can respectively move their bodies by the patterns. Each action predictive pattern is displayed in an animation image. The shown patterns illustrate the movement by representative three figures. Practically, ROM 50C of the microcomputer 50 shown in FIG. 3 stores all data necessary for performing the action predictive pattern.

FIG. 22 shows 7 patterns in which three figures are drawn. Each pattern shows movement of character "KUMI". The left figure corresponds to first action that is a first display mode of first step of the movement; the central figure corresponds to second action that is a second display mode of second step of the movement; and the right figure corresponds to third action that is a third display mode of third step of the movement.

Each of seven patterns of from pattern F to pattern J in FIG. 23 shows movement of character "AMI". Among them, the pattern J has four figures corresponding to four display modes of four steps because the movement is not simple. Pattern K in FIG. 23 shows movement of character "YUMI".

Thus, the image data or the like to be displayed are previously stored in ROM 50C of the microcomputer 50. However, recent improvement in quality of images requires large extent of image data. Therefore, the image data used for the demonstration display may be stored in a ROM provided separately from the ROM 50C.

In an illustrative embodiment, when the value of the extracted random number for judgement of "big hit" is 7, which is associated to "big hit", and the value of the extracted random number for determination of "reach" demonstration symbol is 20, which is associated to "normal reach", in the playing game, a predictive demonstration pattern to be displayed is determined based on the random number for determination of predictive demonstration pattern that is extracted in the step ST5 in FIG. 4 by selecting the table for determination of predictive demonstration pattern for "big hit" shown in FIG. 13. When the value of the extracted random number for determination of predictive demonstration pattern is "190", the predictive demonstration pattern corresponding to demonstration No. 27 is selected. The selected predictive demonstration No. 27 corresponds to a display in which the character "KUMI" of left character 21L performs word prediction of "えい! (EI!)" and action prediction of pattern E2, the character "AMI" of right character 21R performs word prediction of "うりゃ!(URYA!)" and action prediction of pattern H2. This display is shown in FIGS. 25 and 26.

Figure 25:
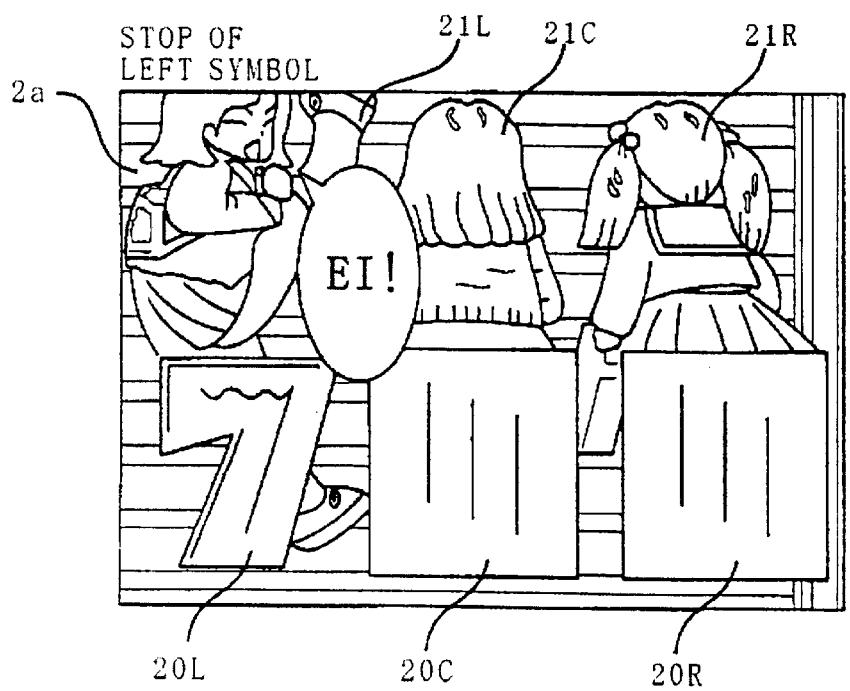
FIG. 25 is a representation that illustrates a display mode of a predictive demonstration that is displayed when the moving display of left special symbol is to be stopped.

First, FIG. 25 shows a display in which the left character "KUMI" 21L is in a posture of "turning the body right and kicking the right foot up" shown in a figure of second action of pattern E2 shown in FIG. 22 and a word prediction is expressed in Japanese writing characters of "えい! (EI!)" in an oval-shaped balloon.

Figure 26:
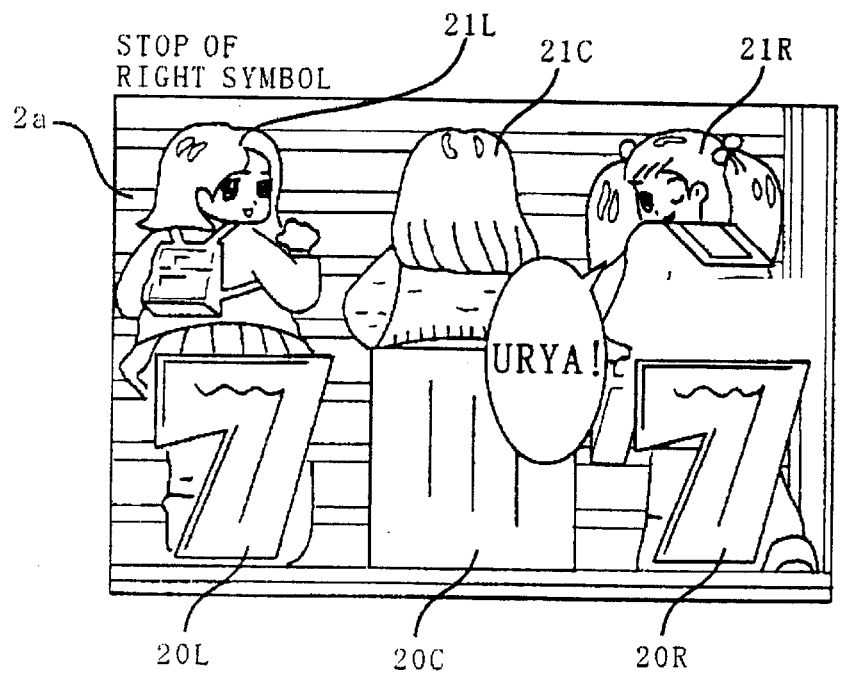
FIG. 26 is a representation that illustrates a display mode of a predictive demonstration that is displayed when the moving display of right special symbol is to be stopped.

Next, FIG. 26 shows a display in which in the right character "AMI" 21R is in a posture of "turning around with stoop and doing a wink" shown in a figure of first action of pattern H2 shown in FIG. 22 and a word prediction is expressed in Japanese writing characters of "うりゃ! (URYA!)" in an oval-shaped balloon.

As understandable from the illustrative example of the predictive demonstration pattern, the display is performed such that the characters that are predictive demonstration symbols chatter each other. The word used in chattering includes those expectable of "big hit", expressing a feeling or feelings, or those of nonsense.

Such words used in chattering can be in some cases arranged to have some relationship in its meaning. If the stop symbols of the special symbols 20L, 20C and 20R that will be subsequently appeared are arranged different depending on the presence of the relationship in the meaning of the word, effect of the predictive demonstration can be enhanced. When a high degree of likelihood of "big hit" is associated to the word predictive pattern having a relationship, the player will pay attention to the words used in chattering between the characters. The degree of likelihood of "big hit" can be made high when a predetermined word predictive pattern, even having no relationship, is displayed.

The word predictive pattern using the word of "チャンス(CHANCE)" or "ドキドキ(DOKIDOKI)" that can make the player to anticipate that "big hit" might be associated to high likelihood of "big hit".

The degree of likelihood of "big hit" can be changed depending on a mark, itself or its meaning, such as "heart mark" or "star mark" that is displayed after expression in word. For example, as predictive demonstration No. 1 in FIG. 18, when the word is followed by "heart mark", the degree of likelihood of "big hit" is made high. As predictive demonstration No. 44 in FIG. 18, when the word is followed by "broken heart mark", the degree of likelihood of "big hit" is made low.

The predictive demonstration No. 141 in FIG. 20 shows word prediction of "チャンス(CHANCE)+heart mark" for the character "KUMI" 21L that is to be displayed first. This word prediction is a display that can give the player an anticipation of "big hit". However, the word prediction of "ダメッ(DAMETT)+broken heart" for the character "AMI" 21R is arranged to be displayed next. This change in the word prediction makes the player to lose the anticipation of "big hit". Accordingly, because the player hardly anticipates how the game will be developed after the display correlated to one of the characters, the player will pay attention to changes of display modes correlated to respective characters.

In the tables for combination of predictive demonstration patterns shown in FIGS. 18 to 21, only a small numbers of predictive demonstration pattern of word prediction and action prediction are associated to the central character "YUMI" 21C. When the display of the word prediction or action prediction for the character "YUMI" is arranged to have a very high degree (e.g., 100%) of likelihood of "big hit", the player, who expects the "big hit", tends to have large interest in paying attention to the movement of character "YUMI" 21C.

Since the predictive demonstration pattern as shown in FIGS. 18 to 21 is displayed in combination of a word predictive pattern and an action predictive pattern, even if the same word predictive pattern is displayed, the action predictive pattern that is to be displayed simultaneously or subsequently can be made different, thereby creating different subsequent game result. When a showy character's movement or facial expression in the action predictive pattern is associated to a high expectation of "big hit", the demonstration display is effective for increasing the player's expectation to "big hit". Moreover, the relationship between words in the chattering by the characters can be expressed more clearly by the action predictive pattern.

Thus, if the player does not pay much attention to the word predictive patterns for the plurality of characters and action predictive patterns that are displayed simultaneously or subsequently, the player cannot understand the relationship that these predictive display have. Consequently, the player who expects "big hit" will pay attention much more to various symbols displayed on the display screen 2a. The player can obtain information for anticipating how the game is going to be in various way, and can continue his or her interest to the game for long time without tired of the game.

According to the embodiment, though variation of predictive demonstration is increased, even beginner player can easily understand the meaning of the predictive demonstration because the display is expressed in a word or movement based on experience in a daily life.

A course of change of the display on the display screen 2a will be illustrated below.

Figure 24:
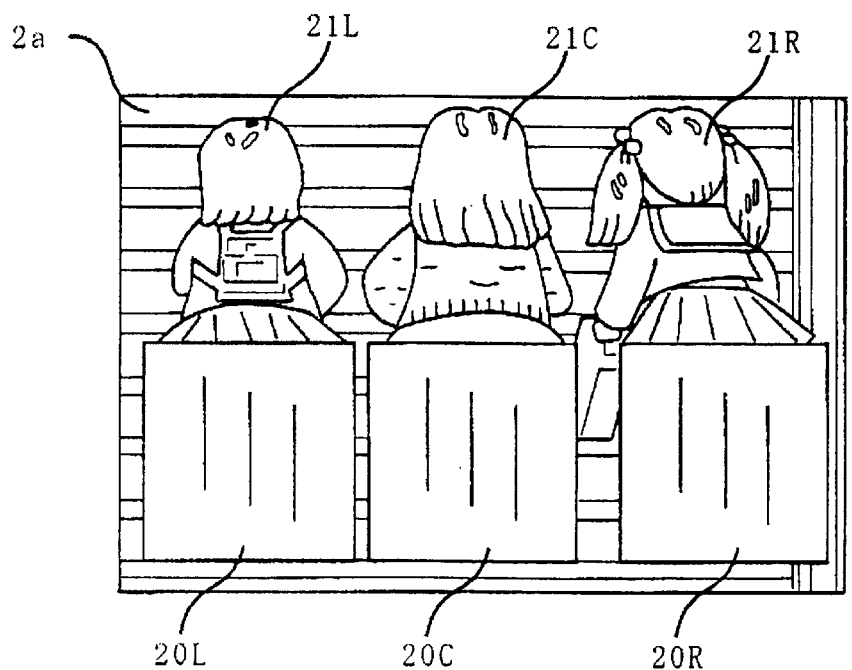
FIG. 24 is a representation that illustrates a display mode of a predictive demonstration that is displayed when moving display of special symbol is started.

FIG. 24 shows a display mode in which the special symbols 20L, 20C and 20R are moving or varied. In the display mode, the three girl characters of KUMI 21L, YUMI 21C and AMI 21R that are predictive demonstration symbols are running up the stairs of a station. The three characters are displayed in one to one correspondent positions to the special symbols 20L, 20C and 20R, specifically in back ground positions of each special symbol 20L, 20C or 20R.

Each of these three girl characters is arranged to perform demonstration display that shows meaning related to coming display state of each special symbol that is moving and displayed in the corresponding position.

Then, first predictive demonstration pattern is displayed and variation action of the left special symbol 20L is stopped. An example of the first predictive demonstration pattern is shown in FIG. 25. The character "KUMI" that is displayed in one to one correspondent position to left special symbol 20L performs action prediction of "turning the body right and kicking the right foot up" and word prediction of "えい! (EI!)".

Thereafter, second predictive demonstration pattern is displayed and then variation action of the right special symbol 20R is stopped. An example of the second predictive demonstration pattern is shown in FIG. 26. The character "AMI" that is displayed in one to one correspondent position to right special symbol 20L performs action prediction of "turning around with stoop and doing a wink" and word prediction of "うりゃ! (URYA!)".

In the embodiment, the display timing of the predictive demonstration pattern is arranged based on the stop timing of the special symbol. For example, the order of "start of moving display of special symbol"→"predictive display by the left character"→"stop of variation action of left special symbol"→"predictive display by the right character"→"stop of variation action of right special symbol" is described above. The player moves his or her eyes in the following manner: "left character"→"left stop symbol"→"right character"→"right stop symbol". The player can smoothly move his or her eyes and easily understand the progress of the game because the left character symbol is in one to one correspondent position to the left stop symbol and right character symbol is in one to one correspondent position to the right stop symbol.

The display timing of the predictive demonstration pattern is not limited to the described above but can be selected from various timings based on the respective stop displays of the special symbols that will be illustrated later with reference to FIGS. 35 to 40.

FIG. 26 shows a display in which variation action of the right special symbol 20R is stopped, whereby stop symbols of left and right special symbols 20L and 20R are same symbols "7" to establish so-called "reach" state. After the "reach" state has been established, a display is performed in which the three girl characters 21L, 21C and 21R are jumping up simultaneously with facial expressions of joy. At the same time, Japanese writing character of "リーチ (reach)" is displayed in the central portion of the display screen 2a as shown in FIG. 27.

Figure 28:
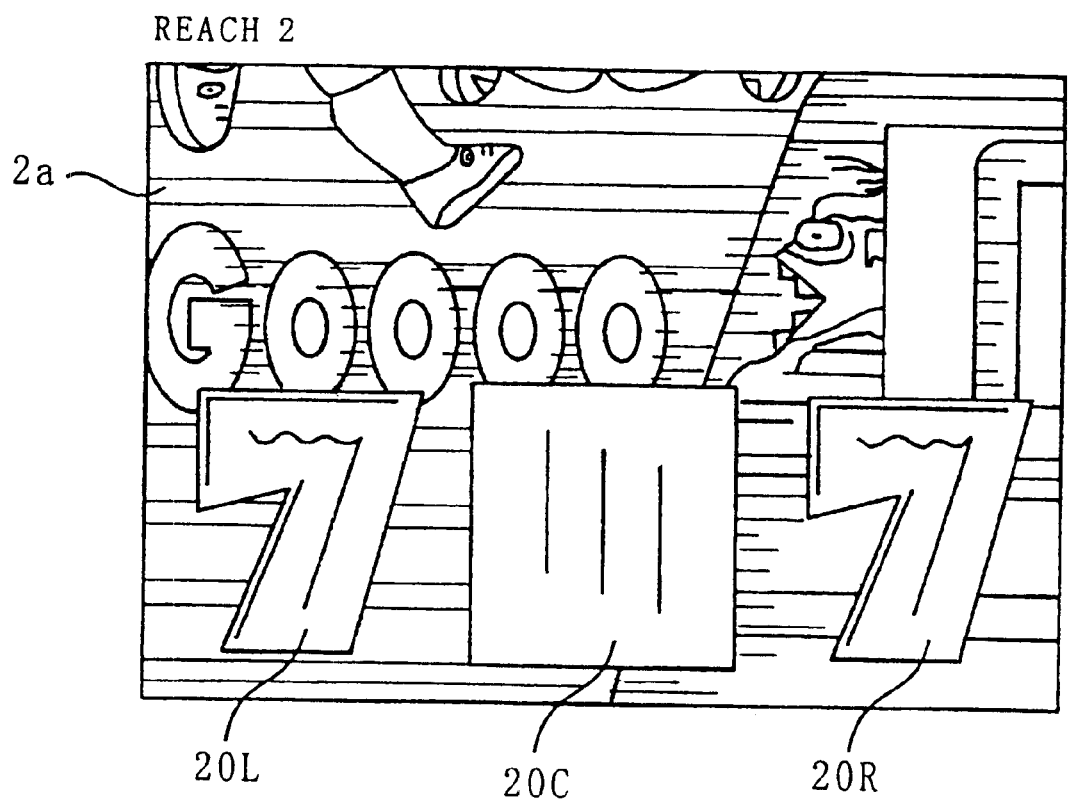
FIG. 28 is a representation that illustrates a display mode of a predictive demonstration that is displayed subsequently to the predictive display shown in FIG. 27.

Thereafter, as shown in FIG. 28, a display is performed in which a train passes too much on the display screen 2a. Subsequently, there is started a display of the "reach" demonstration pattern determined in step ST12 or ST14 of FIG. 6.

Figure 27:
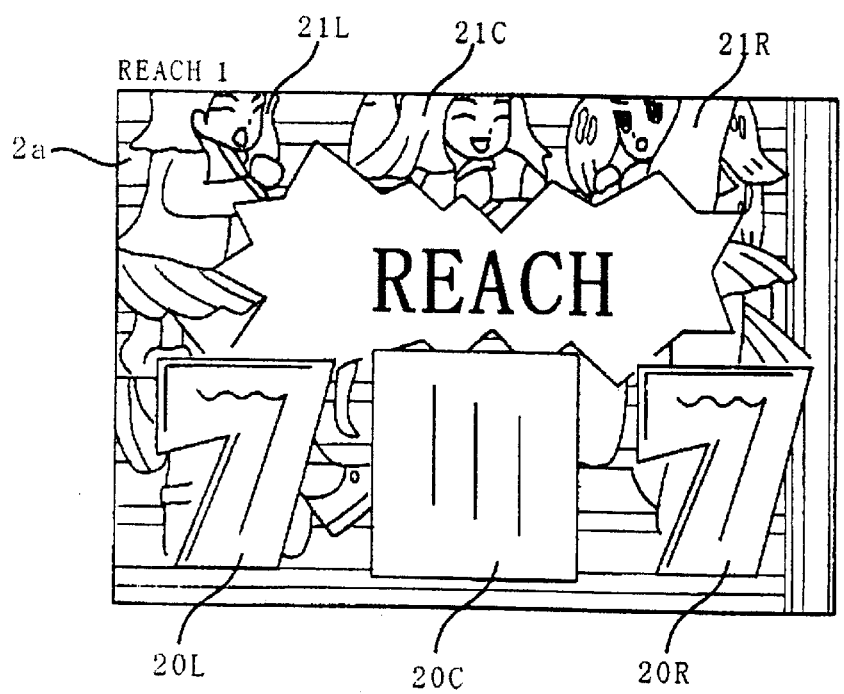
FIG. 27 is a representation that illustrates a display mode of a predictive demonstration that is displayed after the moving display of the left and the right special symbols is stopped.
Figure 29:
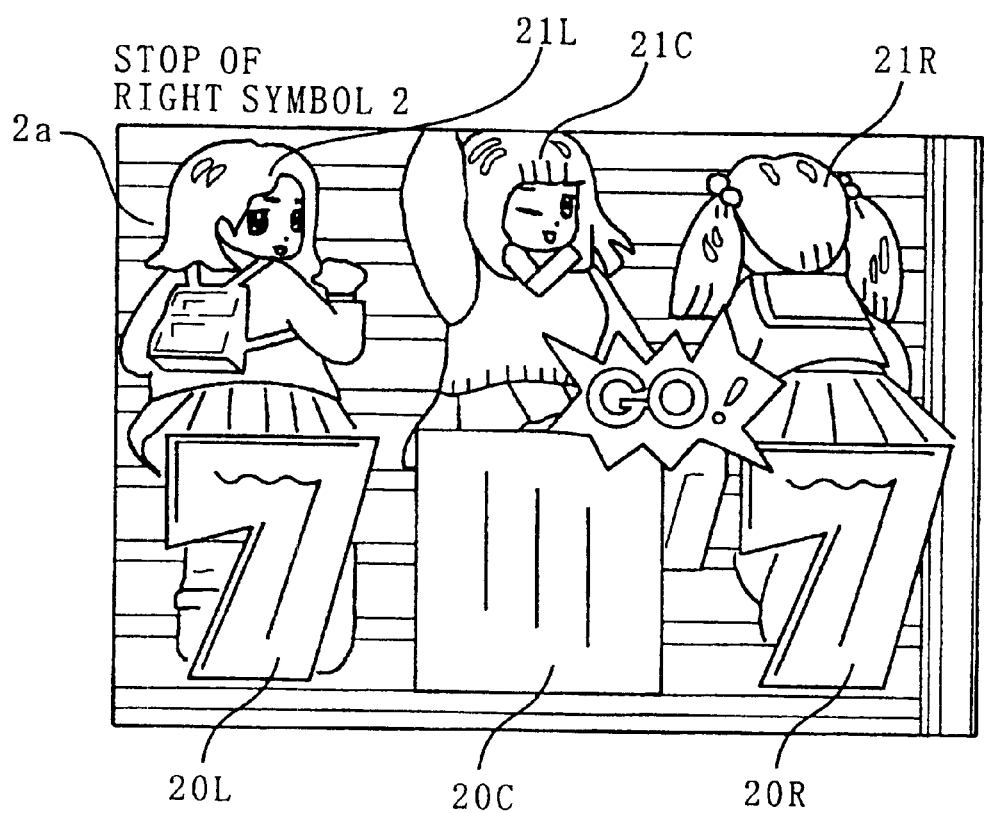
FIG. 29 is a representation that illustrates further a display mode of a predictive demonstration that is displayed when the moving display of right special symbol is to be stopped.

After the "reach" state has been established, and before the predictive demonstration shown in FIG. 27 is displayed, the predictive demonstration by the central character "YUMI" 21C is displayed in some cases. For example, as shown in FIG. 29, an action prediction such that the central character "YUMI" turns around and does a wink and a word prediction of "GO" are displayed. This predictive demonstration is performed by the character in a position that is not corresponding to the stop symbol. This is a surprising demonstration display for the player because a usual predictive demonstration is arranged to be performed by a character in a position corresponding to the stop symbol. Such a predictive demonstration is to be displayed in cases, for example, where the probability of "big hit" is high or the probability of "big hit" is 100%.

A plurality of symbol patterns for the "reach" demonstration symbol are previously stored in ROM 50C in the microcomputer 50 (FIG. 3). In this embodiment, there are provided three kinds of "reach" demonstration symbol patterns, e.g., "normal reach", "jam-packed train reach" and "chinning man reach". These are illustrated below.

Figure 30:
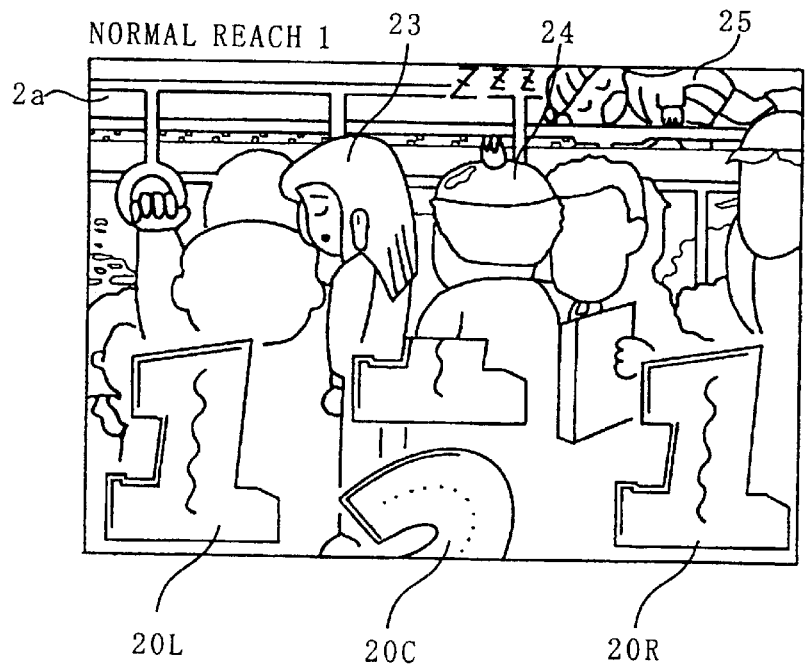
FIG. 30 is a representation that illustrates a first mode of "normal reach"
Figure 31:
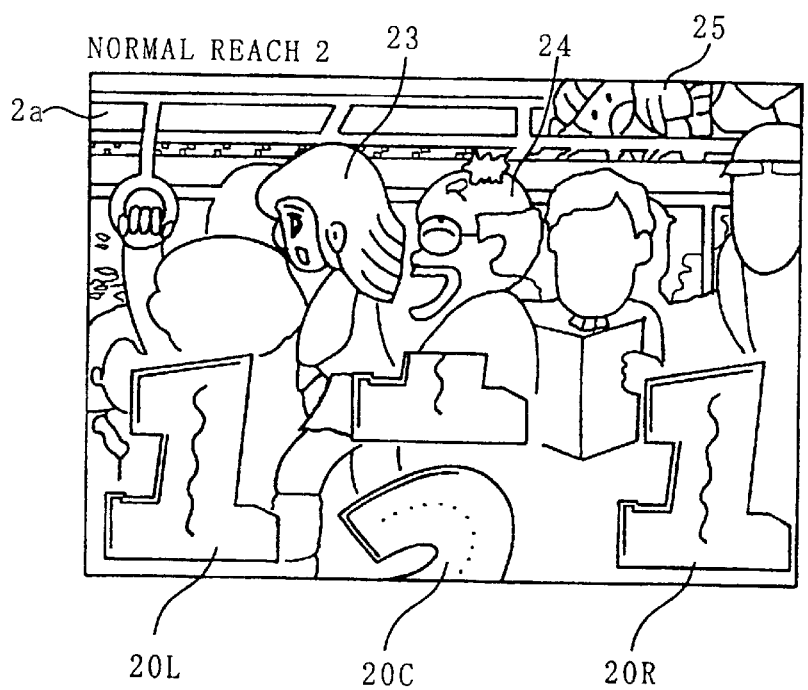
FIG. 31 is a representation that illustrates a second mode of "normal reach"

FIGS. 30 and 31 are representations that illustrate "normal reach". When a display of "reach" demonstration symbol is started, variation speed of the central special symbol 20C is changed to slow down such that the player can recognize the symbol displayed.

In "normal reach", at first, as shown in FIG. 30, a scene in a train is displayed. Subsequently, as shown in FIG. 31, there is performed a display in which a doubtful man character "DENSUKE" approaches a girl character "YUMI" 23 that is positioned at center of the screen. Thereafter, variation action of the central symbol 20C is stopped when the train jolts and stops.

Figure 32:
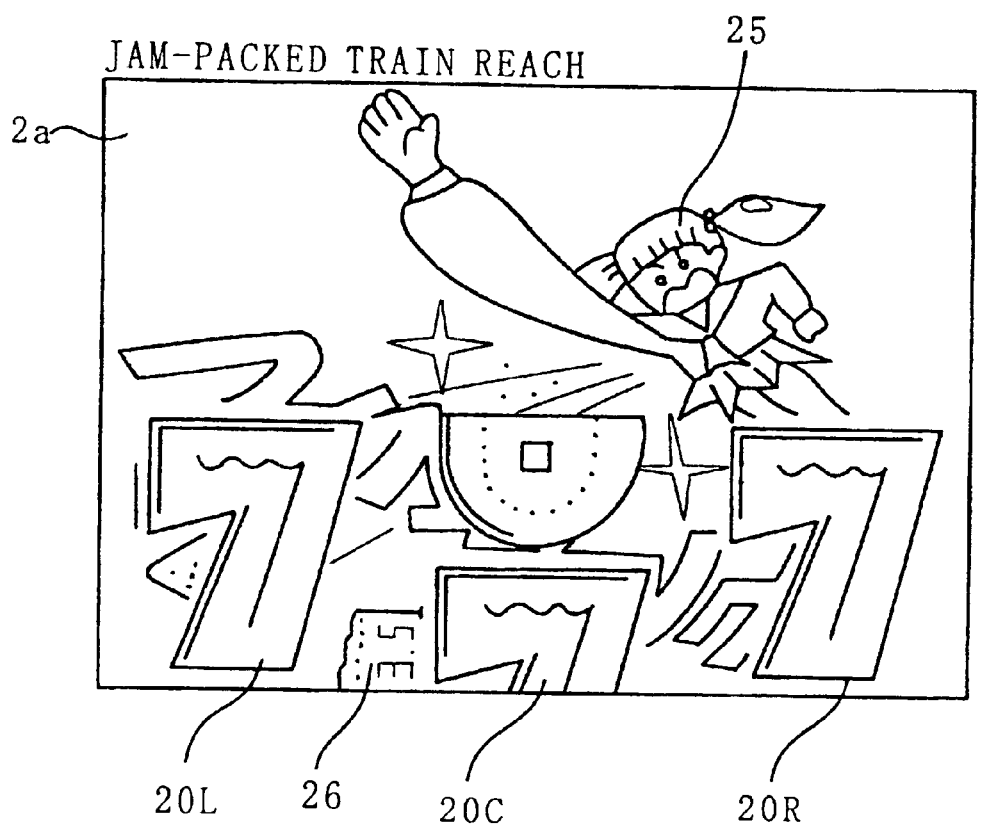
FIG. 32 is a representation that illustrates a display mode of "jam-packed train reach"

The "jam-packed train reach" is displayed subsequent to the display of "normal reach". In "jam-packed train reach", there is performed a display in which the girl character "AMI" 25, who is sleeping on the rack of the train shown in FIGS. 30 and 31, throws her pass holder 26 at the character "DENSUKE" in order to help the character "YUMI" as shown in FIG. 32.

Figure 33:
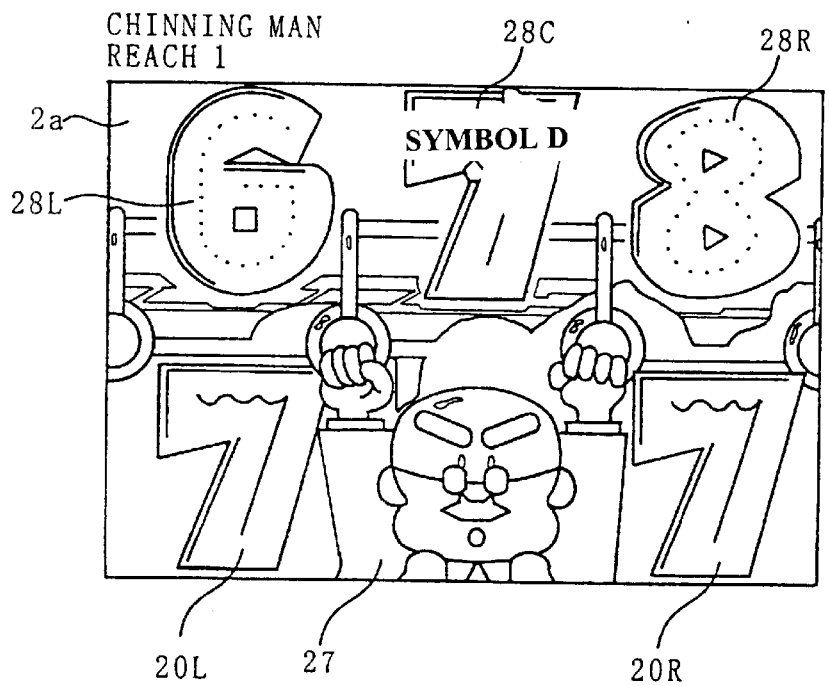
FIG. 33 is a representation that illustrates a first mode of "chinning man reach"
Figure 34:
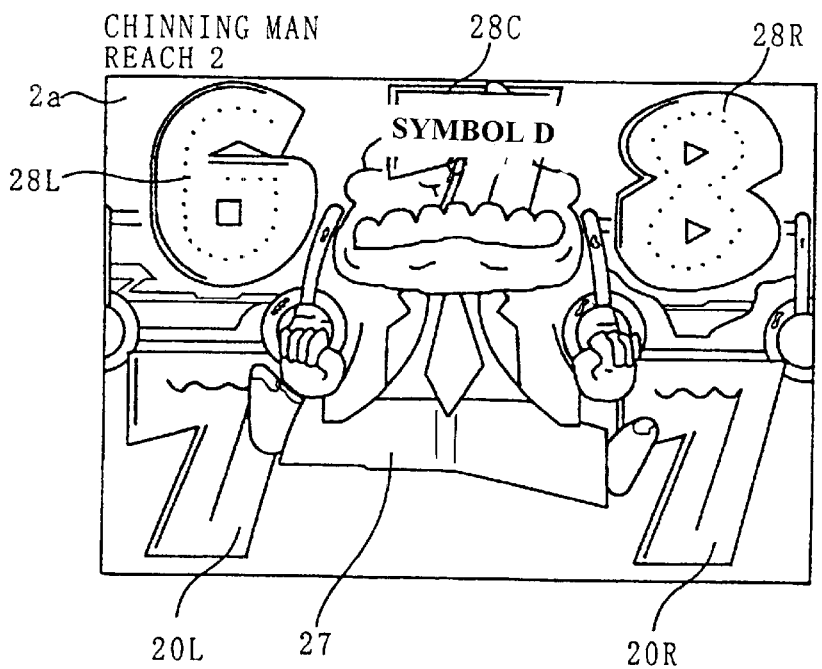
FIG. 34 is a representation that illustrates a second mode of "chinning man reach"

FIGS. 33 and 34 show "chinning man reach". At the beginning of "chinning man reach", as shown in FIG. 33, new special symbols 28L, 28C and 28R that are different from the usual special symbols are displayed in upper area of the display screen 2a and are moved slowly in a side direction.

In the example shown in FIG. 33, a "reach" state is established by two stop symbols "7" that correspond to the left and right special symbols 20L and 20R, and "big hit" will be appeared if stop symbol "7" will be displayed for the central special symbol 20C. In the "chinning man reach", character "KENKICHI" hangs the hand straps in the train at the central position that corresponds to the special symbol 20C. In the display, special symbols 28L, 28C, 28R are moved in overhead of the character "KENKICHI".

As shown in FIG. 34, when symbol "7" is displayed as the special symbol 28C in overhead of the character "KENKICHI", a display is performed in which character "KENKICHI" tries to pull down the special symbol "7" by chinning hardly.

Thereafter, if three same special symbols are displayed as stop symbols, the "big hit" is appeared, whereby the game condition is transferred to the specified game condition that is advantageous to the player.

In the embodiment described above, "reach" demonstration symbol displayed when a "reach" state is established is arranged to be performed in the position that corresponding to the special symbol 20C that is displayed in variation. Since the player pays attention to the special symbol that is moving and displayed in the central position, by performing the "reach" demonstration symbol in the central position of the screen that is corresponding to the special symbol 20C, the variation display of the special symbol 20C and the "reach" demonstration symbol can look like single display so that the player will concentrate his or her attention mush more. Moreover, the display of the "reach" demonstration symbol as mentioned above is effective to increase the player's expectation to the game result.

FIGS. 35 to 40 show timing diagrams that illustrate relations of starting and finishing timings of display of predictive demonstration pattern and starting and stopping timings of variation action of the special symbols.

There will be described an embodiment in which predictive demonstration pattern is displayed two times correlated to variation or stopping timing of the special symbols 20L, 20C and 20R. In this embodiment, predictive demonstration is performed correlated to two girl characters, e.g., any two characters among the three girl characters "KUMI" 21L, "YUMI" 21C and "AMI" 21R. The predictive demonstration pattern is displayed in a combination of "word predictive pattern" and "action predictive pattern" shown in FIGS. 18 to 21.

In this embodiment, the predictive demonstration pattern to be displayed first is associated to character "KUMI" 21L that is correlated to the left special symbol 20L and the predictive demonstration pattern to be displayed second is associated to character "AMI" 21R that is correlated to the right special symbol 20R. Five kinds of variety of timing diagrams shown in FIGS. 35 to 39 are created by the display timings of these two predictive displays.

Figure 35:
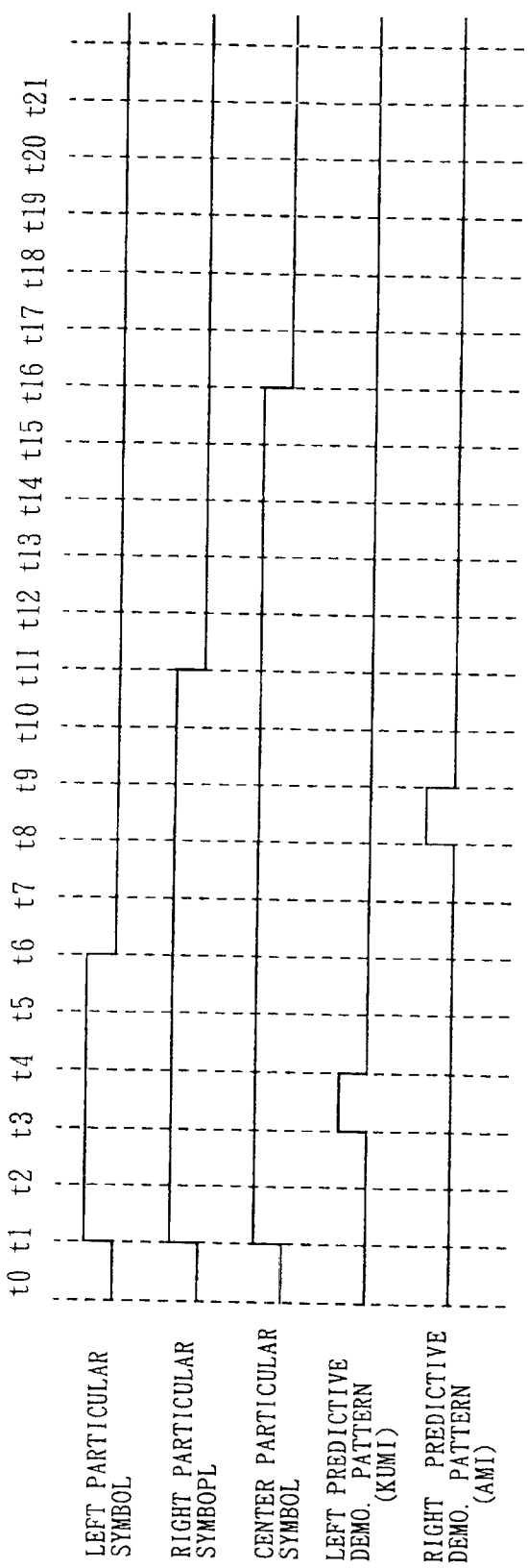
FIG. 35 is a graphical representation of a timing diagram of display timing of predictive demonstration.

The timing diagram in FIG. 35 shows an embodiment of the invention in which variation display of three special symbols is started (t1), the first demonstration pattern that is associated to character "KUMI" 21L correlated to left special symbol 20L is displayed (t3 to t4), then the variation of special symbol 20L is stopped (t6), subsequently the second predictive demonstration pattern that is associated to character "AMI" 21R correlated to right special symbol 20R is displayed (t8 to t9), and then the variation of special symbol 20R is stopped (t11).

Figure 36:
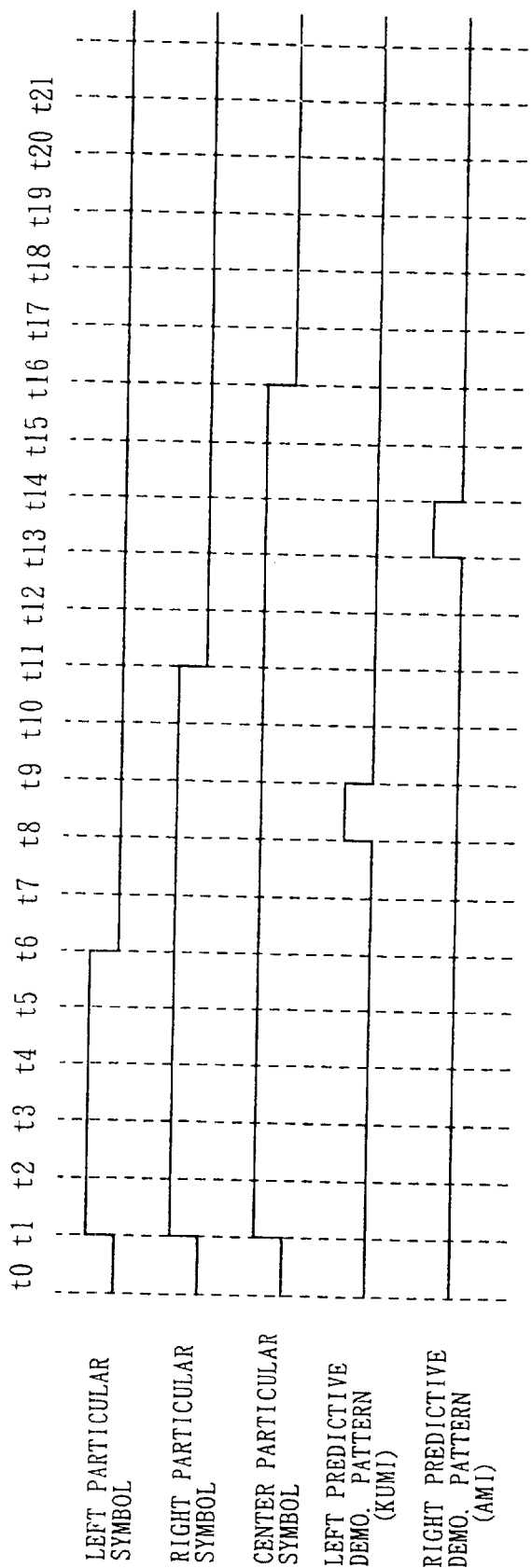
FIG. 36 is a graphical representation of a timing diagram of second example of display timing of predictive demonstration.

The timing diagram in FIG. 36 shows an embodiment of the invention in which the first demonstration pattern that is associated to character "KUMI" 21L correlated to left special symbol 20L is displayed (t8 to t9) during a period from when the variation of left special symbol is stopped (t6) to the time when the variation of right special symbol 20R is stopped (t11), and the second demonstration pattern that is associated to character "AMI" 21R correlated to right special symbol 20R is displayed (t14 to t15) during a period from when the variation of right special symbol 20R is stopped (t11) to the time when the variation of central special symbol 20C is stopped (t16).

Figure 37:
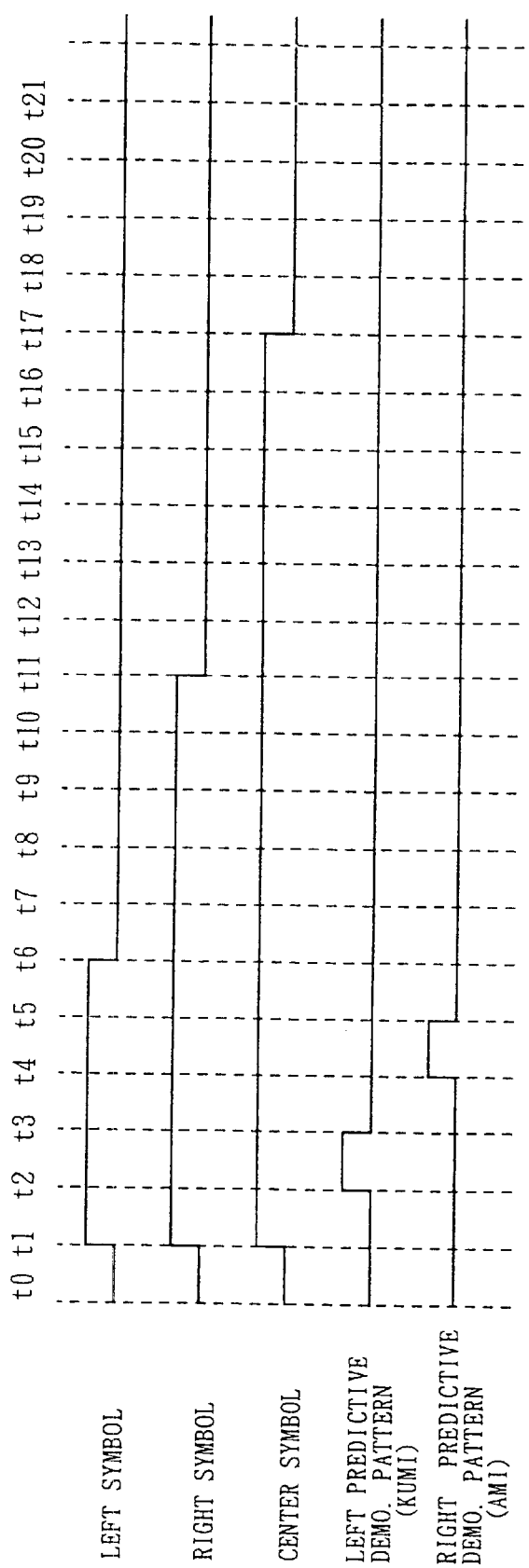
FIG. 37 is a graphical representation of a timing diagram of third example of display timing of predictive demonstration.

The timing diagram in FIG. 37 shows an embodiment of the invention in which the first demonstration pattern that is associated to character "KUMI" 21L correlated to left special symbol 20L is displayed (t2 to t3) and subsequently the second predictive demonstration pattern that is associated to character "AMI" 21R correlated to right special symbol 20R is displayed (t4 to t5) during a period from beginning of variation of all special symbols 20L, 20C and 20R, to the time when the left symbol 20L is stopped (t6).

Figure 38:
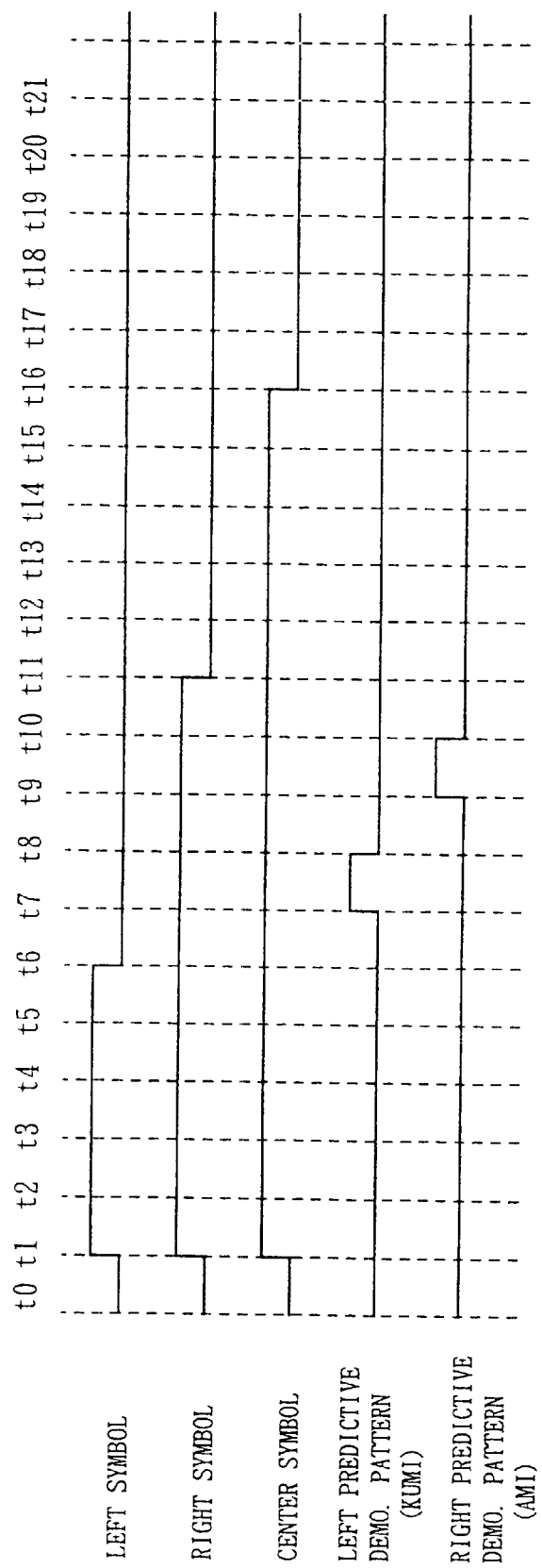
FIG. 38 is a graphical representation of a timing diagram of fourth example of display timing of predictive demonstration.

The timing diagram in FIG. 38 shows an embodiment of the invention in which the first demonstration pattern that is associated to character "KUMI" 21L correlated to left special symbol 20L is displayed (t6 to t7) and subsequently the second predictive demonstration pattern that is associated to character "AMI" 21R correlated to right special symbol 20R is displayed (t9 to t10) during a period from when the left symbol 20L is stopped (t6) to the time when the right special symbol 20R is stopped (t11).

Figure 39:
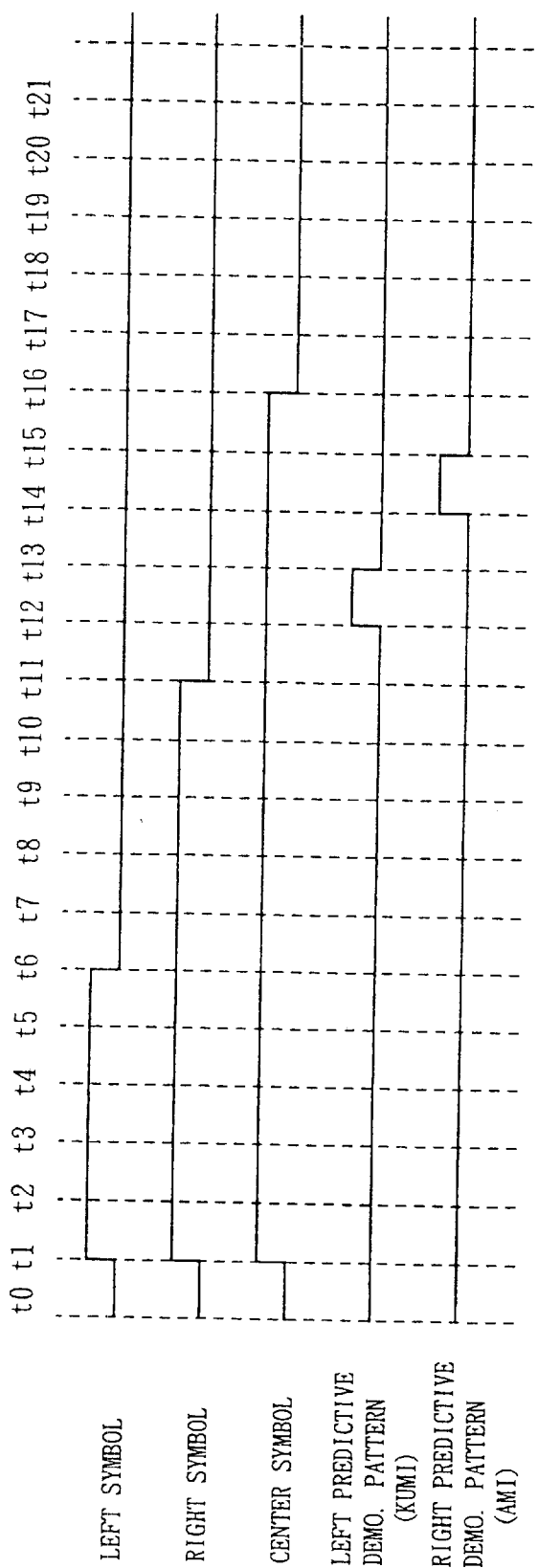
FIG. 39 is a graphical representation of a timing diagram of fifth example of stop display timing of predictive demonstration.

The timing diagram in FIG. 39 shows an embodiment of the invention in which the first demonstration pattern that is associated to character "KUMI " 21L correlated to left special symbol 20L is displayed (t12 to t13) and subsequently the second predictive demonstration pattern that is associated to character "AMI" 21R correlated to right special symbol 20R is displayed (t14 to t15) during a period from when the variation of right special symbol 20R is stopped (t11) to the time when the variation of central special symbol 20C is stopped (t16).

An embodiment in which three times of the predictive demonstration pattern are correlated to starting or stopping timing of variation of the special symbols 20L, 20C and 20R.

In this embodiment, the predictive demonstration pattern to be displayed first is associated to character "KUMI" 21L that is correlated to the left special symbol 20L, the predictive demonstration pattern to be displayed second is associated to character "AMI" 21R that is correlated to the right special symbol 20R and the predictive demonstration pattern to be displayed third is associated to character "YUMI" 21C that is correlated to the central special symbol 20C. An example of display timing of the three predictive demonstration patterns is shown in the timing diagram of FIG. 40.

Figure 40:
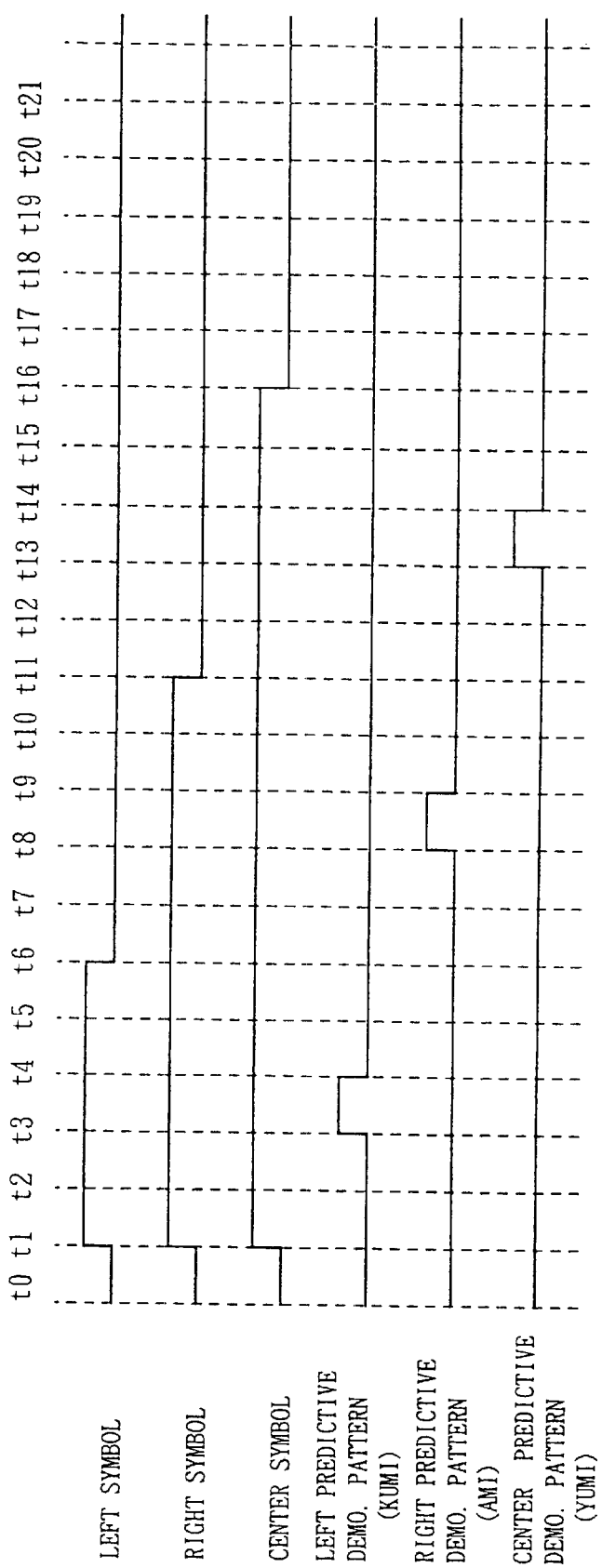
FIG. 40 is a graphical representation of a timing diagram of sixth example of display timing for predictive demonstration.

The timing diagram in FIG. 40 shows an embodiment of the invention in which variation display of three special symbols is started (t1), the first demonstration pattern is displayed (t3 to t4), then the variation of special symbol 20L is stopped (t6), subsequently the second predictive demonstration pattern is displayed (t8 to t9), then the variation of special symbol 20R is stopped (t11), further the third predictive demonstration pattern is displayed (t13 to t14) and then the variation of special symbol 20C is stopped (t16).

As illustrated above, the predictive demonstration pattern is displayed in timing correlated to starting or stopping timing of the special symbol, and hence the player can easily recognize the predictive demonstration pattern even when the player pays attention to stop display of the special symbol.

Moreover, since left character symbol is displayed in a position corresponding to the display position of left special symbol 20L and right character symbol is displayed in a position corresponding to the display position of right special symbol 20R, the player can have a sense of unity between the display state of the special symbol and the display of the predictive demonstration pattern, and can easily understand the progress of the game.

A further embodiment of indication on the liquid crystal display 2 win be illustrated below with reference to FIGS. 41 to 43 in which a course of display is shown.

Figure 41:
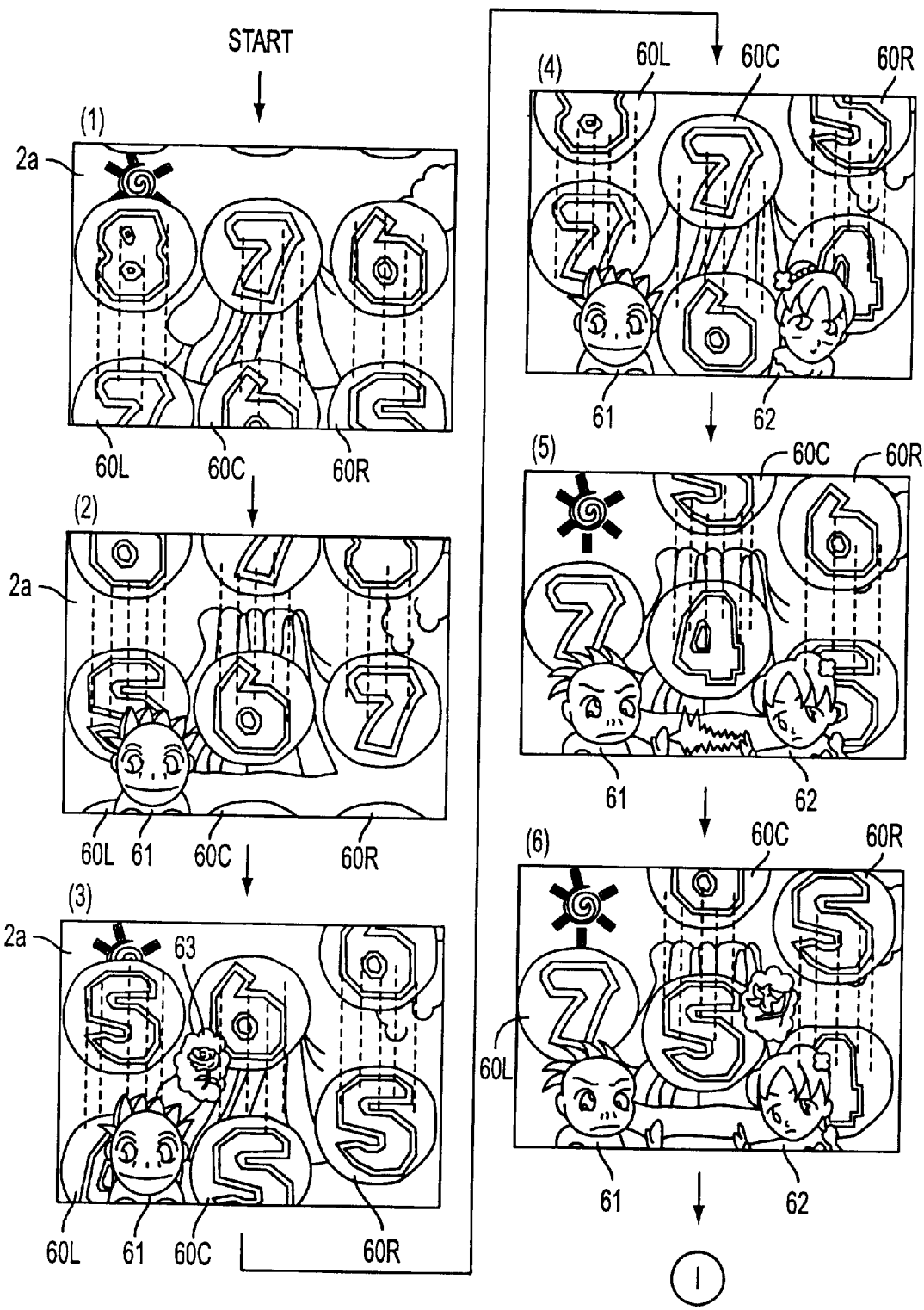
FIG. 41 is a representation that illustrates a further example of the display on the liquid crystal display that is changed sequentially.

When a game is started on the liquid crystal display 2, special symbols 60L, 60C, and 60R are displayed in variation as shown in FIG. 41(1). After a predetermined period of time is passed, a character "PITHECAN" 61 appears in front of the moving left special symbol 60L by overlapping as shown in FIG. 41 (2).

Thereafter, a balloon 63 in which a picture of "rose" is drawn is displayed in overhead of character "PITHECAN" 61 as shown in FIG. 41 (3). The content in the balloon 63 shows a delusive item that the character "PITHECAN" 61 imagines in his head. In this display, he imagines "rose".

A character "PINE" 62 appears in front of the moving right special symbol 60R by overlapping as shown in FIG. 41 (4). At the same time, variation of left special symbol 60L stops. The left stop symbol is "7" in this display.

Then, there is displayed a state where the delusion content of character "PITHECAN" 61 is communicated to character "PITHECAN" 62 by telepathy as shown in FIG. 41 (5).

Thereafter, a balloon 64 in which a picture of "lily" is drawn is displayed in overhead of character "PINE"62 as shown in FIG. 41 (6). The content in the balloon 63 shows what character "PINE"62 has received from character "PITHECAN" 61 by telepathy. In this display, she imagines "lily".

Then, left and right characters 61 and 62 disappear and, at the same time, variation of right special symbol 60R stops. The right stop symbol is "7" as same as left stop symbol in this display as shown in FIG. 42 (7).

Figure 42:
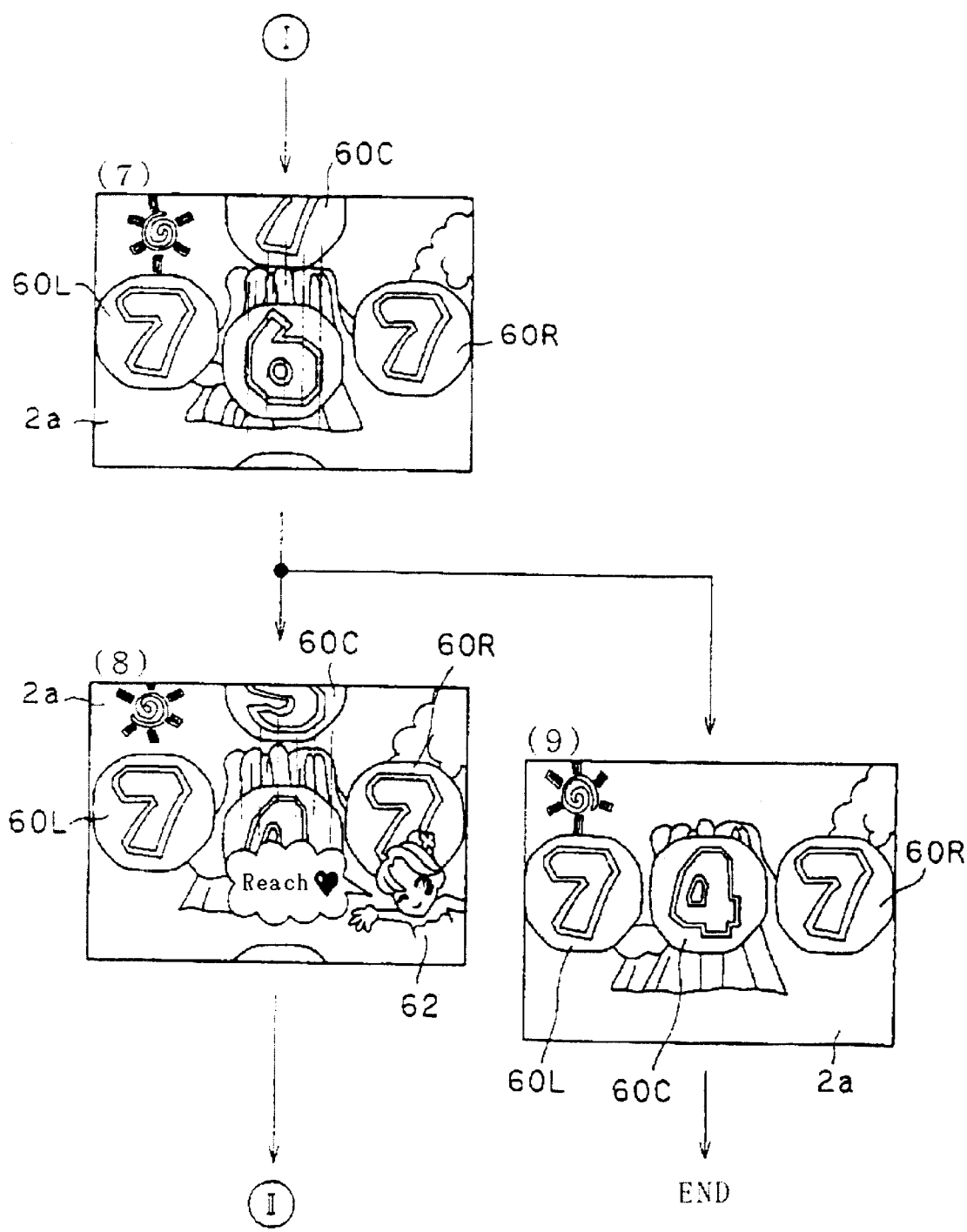
FIG. 42 is a continuation of change of the display on the liquid crystal display of FIG. 41.

Subsequently, character "PINE" 62 appears again by overlapping with the stop symbol 60R together with indication of "リーち(reach)" as shown in FIG. 42 (8). This indication is for advising that "reach" state is established because left and right stop symbols are same symbols and that a "reach" demonstration display win be performed subsequently. If the display as shown in FIG. 42 (8) does not appear and subsequent "reach" demonstration display is not performed, the game will result in "loss" as shown in FIG. 42 (9) because the stop symbol of central special symbol 60C will be different from the stop symbols of the left and right special symbols 60L and 60R when variation of central special symbol 60C will be stopped.

When the display as shown in FIG. 42 (8) is performed, a "reach" demonstration display is then performed. In this embodiment, illustratively three kinds of "reach" demonstration patterns of "UFO reach", "present reach" and "sport reach" are provided that will be illustrated later (FIG. 44).

Figure 43:
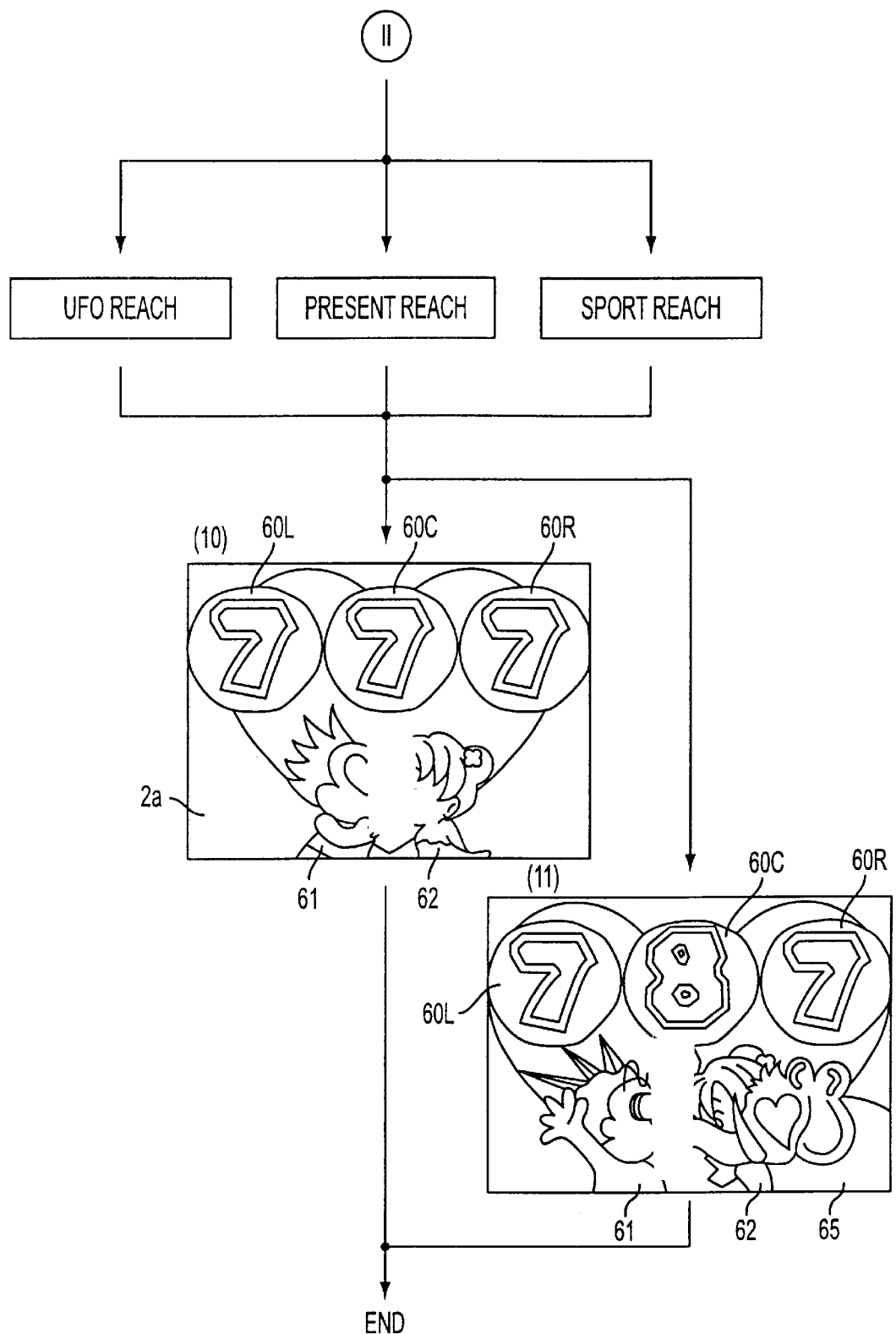
FIG. 43 is a continuation of change of the display on the liquid crystal display of FIG. 43.

After the "reach" demonstration display has been performed, in the case of "big hit", there is performed a display in which a big heart mark appears in the background and character "PITHECAN" 61 and character "PINE" 62 kiss as shown in FIG. 43 (10). In the case of "loss", there is performed a display in which a big broken heart mark appears in the background and character "PITHECAN" 61 and a character "MAMMOTH" 63 kiss as shown in FIG. 43 (11). FIG. 43 (11) shows a display mode of "loss" that is indicated after "present reach" has been performed.

Figure 44:
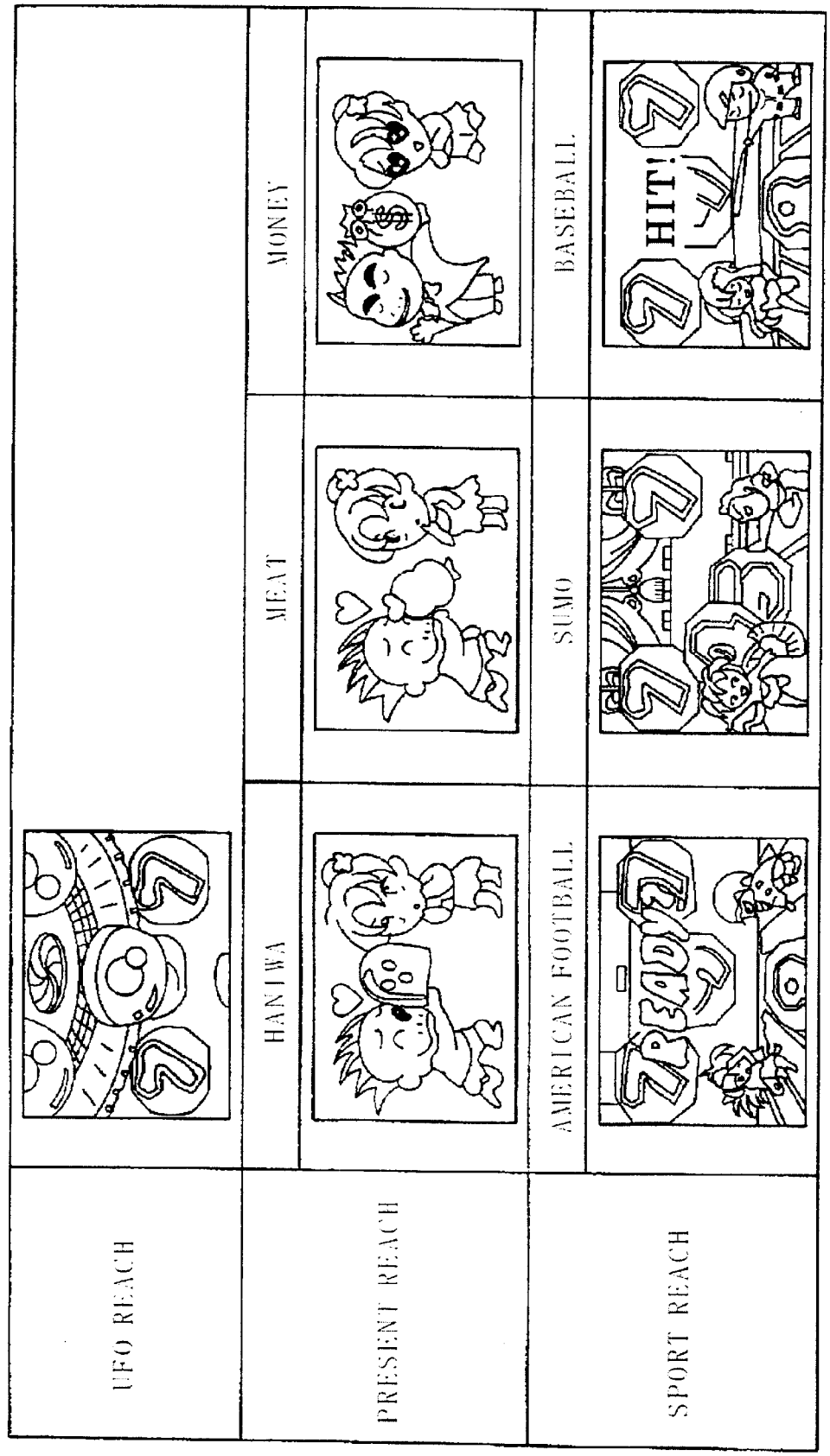
FIG. 44 is a representation that illustrates respective display of "UFO reach", "present reach" and "sport reach"

FIG. 44 shows "reach" demonstration patterns.

The "UFO reach" is a display in which UFO appears in overlapping the stop symbols of special symbols 60L, 60C, and 60R, in the "reach" state where left and right stop symbols 60L and 60R are same symbols as shown in FIG. 44.

The "present reach" is a display in which character "PITHECAN" 61 presents "HANIWA", "MEAT" or "MONEY" to character "PINE" 62. The likelihood of the "big hit" is arranged to be changed depending on the kind of good that character "PITHECAN" 61 presents to character "PINE" 62.

The "sport reach" is a display in which character "PECAN" 61 plays "AMERICAN FOOTBALL", "SUMO" or "BASEBALL". The likelihood of the "big hit" is arranged to be changed depending on the kind of the sport that character "PITHECAN" 61 plays.

When the display is performed in the course mentioned above, the likelihood of the "big hit" or the probability of development into "reach" is arranged to be changed depending on kind of sex of the character who appears in left or right side and kind of combination of the delusive items or contents that are pictured in balloons and that are imagined by the characters.

FIG. 45 shows illustrative examples of relational delusive items. In the embodiment illustrated above, "rose" that character "PITHECAN" 61 imagines and "lily" that character "PINE" 62 received as a delusive item or content by telepathy from the character "PITHECAN" 61 are displayed, and these delusive items of "rose" and "lily" are relational because these belong to the same category of "flower".

As shown in FIG. 45, examples of relational items are those having same or similar shape such as "pudding" and "bust", "peach" and "hip", "rabbit" and "head decoration of bunny girl", "duck" and "bedpan", "mushroom" and "kokeshi doll", those having same or similar appellation such as "bread (pan in Japanese) and tea" and "panty", those belonging to same or similar category such as "lily" and "rose", etc.

As mentioned above, when the delusive items or contents of left and right characters are relational, the degree of likelihood of "big hit" is arranged high.

Each character that appears in left or right side is arranged to be male or female. In this embodiment, character "PITHECAN" and character "BRAIN" are male characters and character "PINE" and character "KIRI" are female characters as shown in FIG. 46.

FIG. 47 shows examples of combinations of sex of the characters that appear in the lift and right sides. For example, when sex of both characters to appear in left and right sides is male, character "PITHECAN" and character "BRAIN" appear alternatively in left and right sides. When sex of both characters to appear in left and right sides is female, character "PINE" and character "KIRI" appear alternatively in left and right sides. When sex of a character to appear in left side is male and sex of a character to appear in right side is female, character "PITHECAN" or character "BRAIN" appears in left side and character "PINE" or character "KIRI" appears in right side. When sex of a character to appear in left side is female and sex of a character to appear in right side is male, character "PINE" or character "KIRI" appears in left side and character "PITHECAN" or character "BRAIN" appears in right side.

The delusive item or content of each character or likelihood of "big hit" can be made different depending on the combination of sex of characters to appear in left and right sides.

Next, the operation procedure for determinations of stop symbols and various characters and display modes of "reach" demonstration as predictive demonstration patterns that will be displayed by the liquid crystal display 2 will be described below with reference to flowcharts of FIGS. 48 to 50 and tables of FIGS. 51 to 63.

Figure 48:
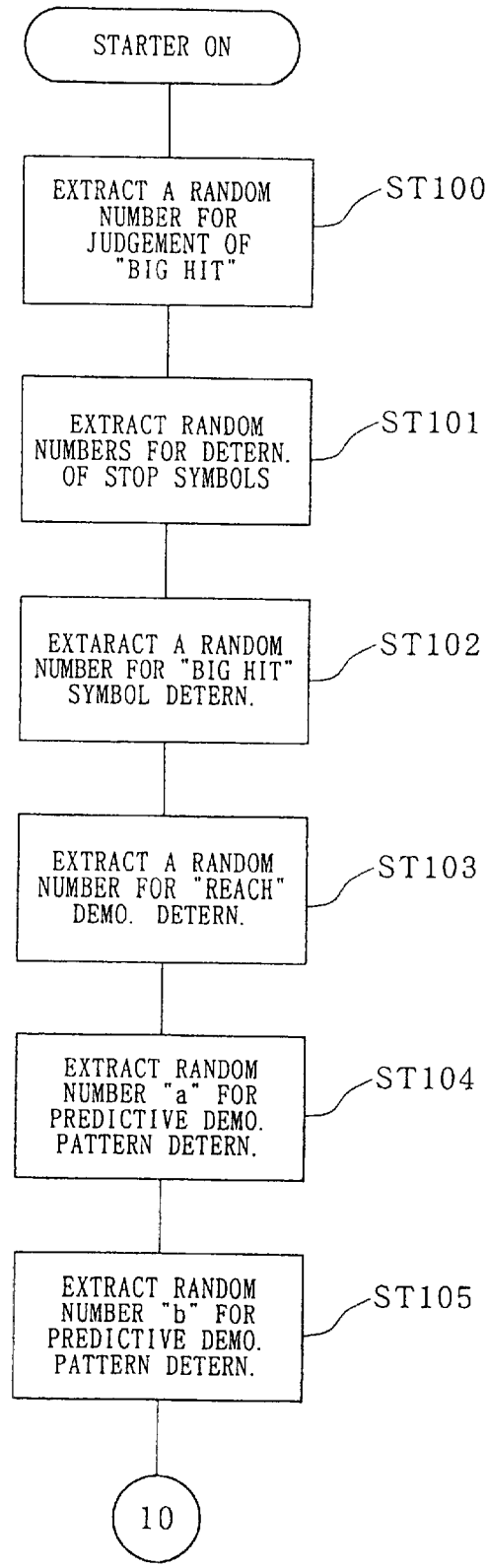
FIG. 48 is a flowchart showing an operation procedure of determination of the display illustrated in FIGS. 41 to 43 that is performed by the liquid crystal display.
Figure 49:
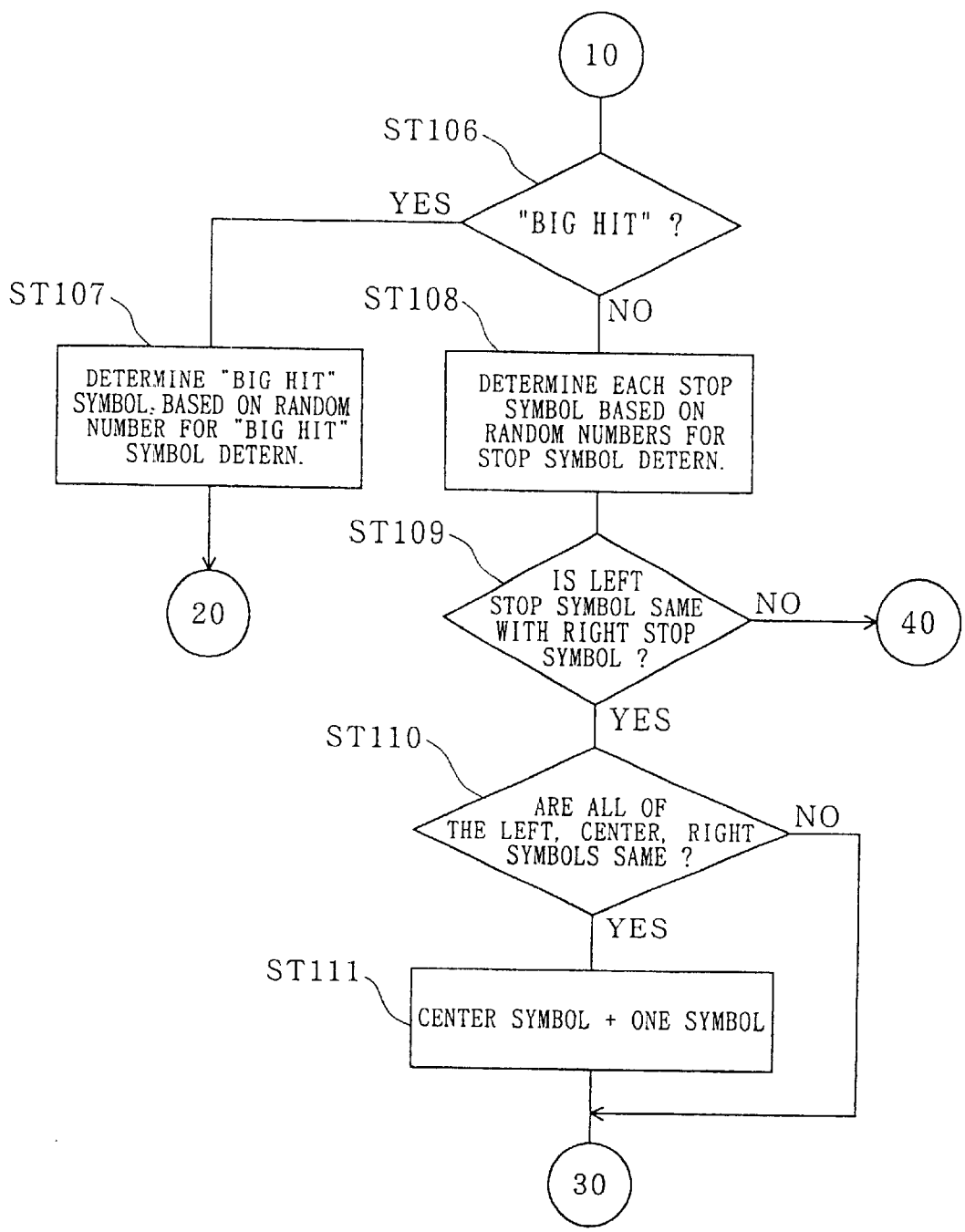
FIG. 49 is a continuation of the flowchart of FIG. 48.

When a playing ball enters start-winning hole 3, start winning switch 3' detects the ball and delivers a signal to CPU 50A (termed "STARTER ON" in the flowchart of FIG. 48). The variation action of the special symbols 60L, 60C and 60R is then started on the display screen 2a of liquid crystal display 2, based on the prior determinations by microcomputer 50 of the stop symbol and the display modes of the "reach" demonstration and of the predictive demonstration to be displayed by the liquid crystal display 2.

The random numbers generated by random number circuit 53 are supplied to CPU 50A. As shown in the flowchart of FIG. 48, when received the signal, CPU 50A extracts a random number for judgement of the "big hit" (ST100) that is used for determination of "big hit", e.g. selection of the stop symbol of the special symbols 60L, 60C and 60R to be of "big hit" or to be of "loss". The random number to be extracted is in the range from 0 to 255, as shown in FIG. 51.

CPU 50A additionally extracts random numbers that are used to determine the stop symbol in the range from 0 to 14, which are used for the determination of the three variable symbols to be stopped when "loss" is determined (ST101). Then, CPU 50A extracts a random number for determination of the "big hit" symbol in the range from 0 to 14, which are used for the determination of the three variable symbols to be stopped when "big hit" is determined (ST102).

CPU 50A further extracts a random number for determination of the "reach" demonstration pattern (ST103). CPU 50A further extracts random numbers "a" and "2" for determination of predictive demonstration patterns that are used in the determination of the predictive demonstration pattern by the above-mentioned characters (ST104 and ST105). The random number for determination of the "reach" demonstration pattern is extracted in the range from 0 to 139, the random number "a" for determination of predictive demonstration pattern is extracted in the range from 0 to 63, and the random number "b" for determination of predictive demonstration pattern is extracted in the range from 0 to 15 as shown in FIG. 51.

Subsequently, a determination is made whether or not an executed symbol variation action should be stopped at the "big hit." This determination is based on the random number for the "big hit" that was extracted at step ST100, and is made at step (ST106) in FIG. 49.

FIG. 52 is a table for "big hit" judgement. ROM 50C of FIG. 3 stores a "big hit" determination table in which the random number ranges have been attributed to the "big hit." In this embodiment, the random number "7" has been predetermined to be the random number which, when extracted, will result in the "big hit."

When the determination results in the "big hit" at step ST106, then a procedure is executed at step ST107 to determine the particular "big hit" symbol that is to be displayed as the stop symbol corresponding to the "big hit" when the variation action on display screen 2a is stopped.

In the procedure of step ST107, the "big hit" symbols to be displayed are determined from the above-illustrated "big hit" symbol determining table (FIG. 9) based on the random number for determination of the "big hit" symbol extracted in the step ST102.

For example, if the extracted random number for determination of "big hit" symbol is "6", the "big hit" stop symbols are determined to be "7-7-7." Thus, the "big hit" is determined, as are "big hit" symbols. Subsequently, the procedure of step ST112 of FIG. 50 is executed. The procedures of the step ST112 and the following steps will be described later.

In the step ST106, when the value extracted for the random number for determination of the "big hit" is a value other than "7" and consequently is determined to be a "loss" based on the "big hit" judgement table shown in FIG. 52, the stop symbols displayed on left symbol 60L, center symbol 60C, and right symbol 60R are respectively determined from the above-illustrated stop symbol determination table (FIG. 10). The determination is executed (ST108) based on the three random numbers for the determination of the stop symbol extracted in the step ST101.

It is then checked whether the determined stop symbols of left symbol 60L and right symbol 60R are or are not same (ST109). When the two symbols are different, the procedure of step ST116 shown in FIG. 50 is executed, since any "reach demonstration" is no longer necessary. However, when the two symbols are same, it is then checked whether the determined stop symbol of center symbol 60C is or is not same as the other two symbols (ST110). If center symbol 60C is different from the other two symbols, the procedure of ST114 shown in FIG. 50 is executed. If all three stop symbols are same, the symbol that is determined for center symbol 60C is changed to a symbol that is arranged in the next position of the determined symbol (ST111). The procedures of the step ST114 and the following steps will be described later.

Figure 50:
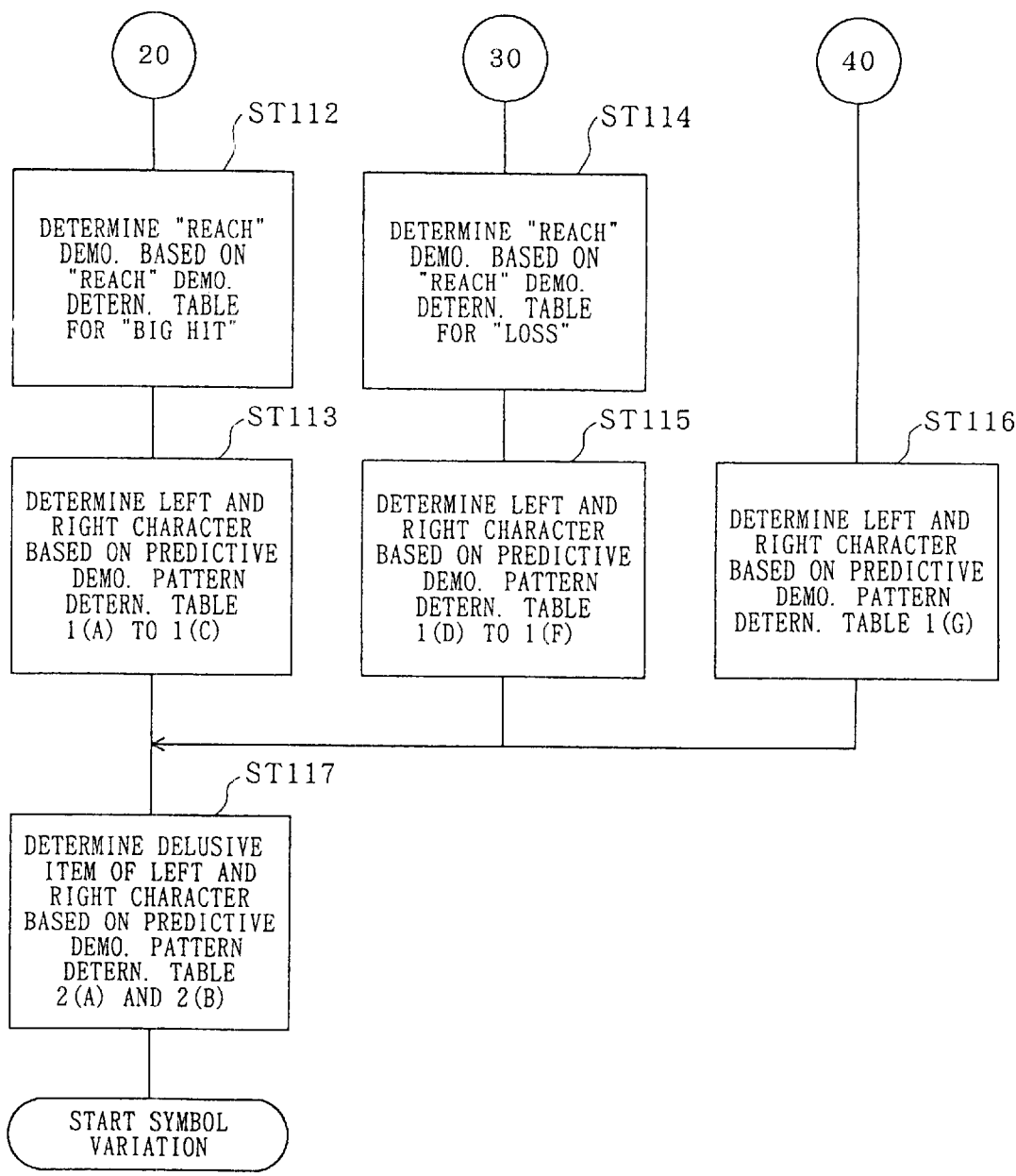
FIG. 50 is a continuation of the flowchart of FIG. 49.

The description will be continued with reference to FIG. 50. The procedure of step ST112 is executed when the "big hit" is determined in the procedure of the step ST106. In the procedure of step 112, a "reach" demonstration is determined from the table for determination of "reach" demonstration for "big hit" shown in FIG. 53 based on the random number for determination of "reach" demonstration for "big hit" that is extracted in the step ST103.

As shown in the table for determination of "reach" demonstration for "big hit" of FIG. 53, the "reach" demonstration for "big hit" includes three kinds of "reach" demonstration patterns of "UFO reach", "present reach" and "sport reach".

The "reach" demonstration to be displayed is determined in this embodiment by selecting "UFO reach" when the value of the random number extracted for determining the "reach demonstration" is in the range of from 0 to 24; "present reach" is selected when the value is in the range of from 25 to 64; and "sport reach" is selected when the value is in the range of from 65 to 139. In the table for determination of "reach" demonstration for "big hit" shown in FIG. 53, the range of random number value associated to "sport reach" is established wider than the ranges of random number value associated to the other "reach" demonstration patterns and consequently the "big hit" will appear in a high degree of expectation when the "sport reach" is displayed in a "reach" state of the special symbol.

Next, in the procedure of step ST 113, a first condition of the predictive demonstration pattern to be displayed is determined based on the determination result of the "reach" demonstration of step 112 as well as the random number "a" for determination of predictive demonstration pattern that was extracted in step ST104 mentioned above. In this step ST 113, there are determined kinds of characters to be displayed left and right as predictive display patterns in the display screen 2a and delusive items for the left and right characters to be identical, relational or non-relational.

The determination of the first condition of the predictive demonstration pattern is executed with reference to tables 1(A) to 1(G) for determination of predictive demonstration pattern shown in FIGS. 55 to 61, in which each predictive demonstration pattern is associated to a range of random number value.

The determination in step ST 113 is executed with reference to the tables 1(A) to 1(C) for determination of predictive demonstration pattern because "big hit" has been determined. For instance, when the "UFO reach" is determined to be displayed, the first condition of predictive demonstration pattern to be displayed is determined based the random number "a" extracted for determining the predictive demonstration pattern with reference to the table 1(A) for determination of predictive demonstration pattern shown in FIG. 55. Similarly to the above, when the "present reach" or "sport reach" is determined to be displayed, the first condition of predictive demonstration pattern to be displayed is determined based the random number "a" extracted for determining the predictive demonstration pattern with reference to the table 1(B) or table 1(C) for determination of predictive demonstration pattern shown in FIG. 56 or 57, respectively.

In the procedure of step ST106, which is executed when "loss" is determined and appearance of "reach" state is determined, the table for determination of the "reach" demonstration for "loss" shown in FIG. 54 is referred, and a "reach" demonstration to be displayed is determined based on the random number that is extracted for determination of the "reach" demonstration in step ST103 (ST 114). Subsequently, the first condition of predictive demonstration pattern to be displayed is determined based the random number "a" extracted for determining the predictive demonstration pattern in the step ST 104 and the "reach" demonstration determined in step ST114 (ST115). The determination in step ST 115 is executed with reference to the tables 1(D) to 1(G) for determination of predictive demonstration pattern shown in FIGS. 58 to 61 because "loss" has been determined.

Specifically, when the "UFO reach" is determined to be displayed, the first condition of predictive demonstration pattern to be displayed is determined with reference to the table 1(D) for determination of predictive demonstration pattern shown in FIG. 58. Similarly to the above, when the "present reach" or "sport reach" is determined to be displayed, the first condition of predictive demonstration pattern to be displayed is determined with reference to the table 1(E) or table 1(F) for determination of predictive demonstration pattern shown in FIG. 59 or 60, respectively.

When "loss" is determined in step ST 106 and "reach" state is determined not to be appeared, the first condition of predictive demonstration pattern to be displayed is determined based the random number "a" extracted for determining the predictive demonstration pattern in the step ST104 with reference to the table 1(G) for determination of predictive demonstration pattern shown in FIG. 61 (ST116).

Then, the delusive items for the left and right characters are determined in the determined first condition based on the random number "b" extracted in the step ST105 (ST117). This determination is executed with reference to the table 2(A) for determination of predictive demonstration pattern of FIG. 62 or to the table 2(B) for determination of predictive demonstration pattern of FIG. 63.

In the first condition of the predictive demonstration pattern determined in step ST113, 115 or 116, if the combination of characters is made of different sex, e.g., female-male or male-female, the table 2(A) for determination of predictive demonstration pattern of FIG. 62 is referred and if the combination of characters is made of same sex, e.g., male-male or female-female, the table 2(B) for determination of predictive demonstration pattern of FIG. 63 is referred. Moreover, since the determination whether the left and right delusive items are or are not relational, or identical has been executed in step ST113, 115 or 116, the delusive items or contents that the left and right characters will imagine, respectively, are determined based on the random number "b" for determination of predictive demonstration pattern extracted in the step ST105.

Illustratively, when "big hit" is determined in step ST106 (FIG. 49), "UFO reach" is determined in step ST112 (FIG. 50), the table 1(A) for determination of predictive demonstration pattern is referred in step ST112 in FIG. 55, the random number "a" for determination of predictive demonstration pattern extracted is "0", "BRAIN" is selected as left character and "PITHECAN" is selected as right character. Accordingly the combination of the characters is made of "male-male" and the delusive items for left and right characters are determined to be relational. In the subsequent step ST117, the table 2(B) for determination of predictive demonstration pattern in FIG. 63 is referred because the combination of the left and right characters is made of male-male. When the random number "b" for determination of predictive demonstration pattern extracted is "1", "duck" is determined as the delusive item for the left character and "bedpan" is determined as the delusive item for the right character.

Relational delusive items for left and right characters, for example, as shown in table 2(A) for determination of predictive demonstration pattern in FIG. 62, "pudding" and "bust", "peach" and "hip", "rabbit" and "head decoration of bunny girl", "bread (pan in Japanese) and tea" and "panty", "rose" and "lily", are arranged to have a very high degree of likelihood of "big hit".

Identical delusive items for left and right characters, for example, as shown in table 2(A) for determination of predictive demonstration pattern in FIG. 62, "pudding" and "pudding", "peach" and "peach", "rabbit" and "rabbit", "bread (pan in Japanese) and tea" and "bread (pan in Japanese) and tea", "rose" and "rose", are arranged to have a high degree of likelihood of "big hit" but lower degree than those of the relational delusive items.

Non-relational delusive items for left and right characters, for example, as shown in table 2(A) for determination of predictive demonstration pattern in FIG. 62, "pudding" and "high-heel", "peach" and "lip", "rabbit" and "lip", "bread (pan in Japanese) and tea" and "head decoration of bunny girl", "rose" and "hip", etc. are arranged to have a low degree of likelihood of "big hit" and lower degree than those of the identical items.

Respective tables 1(A), 1(B) and 1(C) for determination of the predictive demonstration pattern of FIGS. 55, 56 and 57 contain the relational delusive items of left and right characters in a larger ratio than the identical delusive items. When the left and right character's delusive items are relational, the likelihood of "big hit" is high.

When the left and right character's delusive items have no relation, the degree of likelihood of "big hit" becomes 0%, and probability of development into "reach" becomes 0% because non-relational delusive items are only contained in table 1(G) for determination of the predictive demonstration pattern shown in FIG. 61 that is referred in the case where the "loss" is determined in "big hit" judgement and "no reach" is established.

When the left and right character's delusive items are relational, a "reach" state is essentially appeared because any relational items are not contained in table 1(G) for determination of the predictive demonstration pattern shown in FIG. 61 that is referred in a case of "no reach". Consequently, the probability of development into "reach" is 100% when the left and right character's delusive items are relational. On the other hand, when the left and right character's delusive items are identical, a "reach" state is not appeared in some cases because identical items are also contained in the table 1(G) for determination of the predictive demonstration pattern shown in FIG. 61.

As mentioned above, the information of the probability of development into "reach" or likelihood of "big hit" can variously be changed based on the relationship between the left and right character's delusive items. Consequently, the player who recognizes the left character's delusive item that is previously displayed will expect that a right character's delusive item relational to the left character's delusive item may be displayed, and will pay attention to the indication on the display screen 2a.

The player's interest can be added by anticipation what kind of relationship, for example, appellation, shape, or category the character's delusive items will be expressed by.

Thus, information of the likelihood of "big hit" that is changed in accompanied with the progress of the game on the display screen 2a can be indicated by various display modes, and hence the interest of the entire game can be enhanced.

It is to be understood that the above embodiments are directed to the pachinko game machine, which is a specific illustrative embodiment of the invention. However, the present invention can be applied to the other gaming machines, such as a slot machine, a television gaming machine having an electric display device and another display device as well.

What is claimed is:

1. A gaming machine comprising a display arrangement for displaying symbols related to a game, and a controller for determining in response to a predetermined input signal whether or not said game is transferred to a specified game condition that is advantageous to a player and for controlling said display arrangement to display a display mode corresponding to result of said determination, in which said display mode includes a special symbol for informing that said game condition is transferred to said specified game condition by showing a predetermined stop state when a symbol variation is stopped, and a predictive symbol for predicting said stop state of said special symbol, said predictive symbol being a plurality of symbols having respective relationships.

2. The gaming machine according to claim 1, wherein when said respective relationships are different depending on likelihood whether or not said game condition is transferred to said specified game condition.

3. The gaming machine according to claim 1, wherein said relationship is expressed in words or movements corresponding to said plurality of symbols.

4. The gaming machine according to claim 1, wherein said plurality of symbols are character symbols and said relationship is expressed in mutual response of said character symbols.

5. The gaming machine according to claim 4, wherein said character symbols are arranged to respond mutually by a plurality of written letters that are displayed together with said character symbols and said relationship is expressed by meaning of word displayed by said written letters.

6. The gaming machine according to claim 4, wherein said character symbols are arranged to respond mutually by a plurality of marks that are displayed together with said character symbols and said relationship is expressed by said displayed marks or meaning thereof.

7. The gaming machine according to claim 4, wherein said character symbols are arranged to respond mutually by a plurality of picture designs displayed together with them and said relationship is expressed by said displayed designs or meaning thereof.

8. The gaming machine according to claim 4, wherein said character symbols are arranged to respond mutually by a plurality of sounds generated together with them and said relationship is expressed by said sounds generated.

9. The gaming machine according to claim 4, wherein said character symbols are arranged to express said relationship by their own movements.

10. The gaming machine according to claim 9, wherein said movement includes a change of facial expression or posture of said character symbols.

11. The gaming machine according to claim 1, wherein said predictive symbol includes a predictive demonstration symbol for predicting said stop state of said special symbol before said special symbol become a "reach" state, and a "reach" demonstration symbol for predicting said stop state of said special symbol during said "reach" state of said special symbol.

12. The gaming machine according to claim 1, wherein said predictive symbol is displayed correlative to said special symbol and display mode is changed corresponding to said display state of the special symbol.

13. The gaming machine according to claim 12, wherein said predictive symbol is displayed correlative to said special symbol one by one.

14. A gaming machine comprising a display arrangement for displaying symbols related to a game, and a controller for determining in response to a predetermined input signal whether or not said game is transferred to a specified game condition that is advantageous to a player and for controlling said display arrangement to display a display mode corresponding to result of said determination, in which said display mode includes a special symbol for informing that said game condition is transferred to said specified game condition by showing a predetermined stop state when a symbol variation is stopped, and a partner symbol that is displayed in a position corresponding to a display position of said special symbol.

15. The gaming machine according to claim 14, wherein said special symbol includes a plurality of symbols and said partner symbol is displayed in a position corresponding to said display position of one of said plurality of symbols included in said special symbol.

16. The gaming machine according to claim 14, wherein said special symbol includes a plurality of symbols and said partner symbol includes a plurality of symbols, each of said plurality of symbols included in said special symbol being displayed in each position corresponding one by one to said display position of each of said plurality of symbols included in said partner symbol.

17. The gaming machine according to claim 14, wherein each of said plurality of symbols included in said partner symbol is a character symbol that is variable in accompanied with said variation of said special symbol.

18. The gaming machine according to claim 17, wherein variation of said character symbol is a change of facial expression or posture of said character.

19. The gaming machine according to claim 14, wherein said partner symbol is a predictive symbol for predicting said stop state of said special symbol.

20. The gaming machine according to claim 19, where said predictive symbol is changed one or more times until said moving display of any one of said symbols among said special symbol is stopped.

21. The gaming machine according to claim 19, where said predictive symbol is changed one or more times until said moving display of any two of said symbols among said special symbol is stopped.

22. The gaming machine according to claim 19, where said predictive symbol is changed one or more times until said moving display of any three of said symbols among said special symbol is stopped.

23. The gaming machine according to claim 19, where said predictive symbol is changed one or more times until said moving display of any one of said symbols among said special symbol is stopped and further one or more times until said moving display of any two of said symbols among said special symbol is sequentially stopped.

24. The gaming machine according to claim 19, where said predictive symbol is changed one or more times until said moving display of any one of said symbols among said special symbol is stopped and further one or more times until said moving display of any two of remaining symbols among said special symbol is sequentially stopped.

25. The gaming machine according to claim 19, where said predictive symbol is changed one or more times until said moving display of any two of said symbols among said special symbol is sequentially stopped and further one or more times until said moving display of any three of said symbols among said special symbol is sequentially stopped.

26. The gaming machine according to claim 19, where said predictive symbol is changed one or more times until said moving display of any one of said symbols among said special symbol is stopped, further one or more times said moving display of any two of said symbols among said special symbol is sequentially stopped, and further one or more times until said moving display of any three of said symbols among said special symbol is sequentially stopped.

* * * * *